US007937740B2

(12) United States Patent
Shusman

(10) Patent No.: US 7,937,740 B2
(45) Date of Patent: May 3, 2011

(54) METHOD AND APPARATUS FOR INTERACTIVE PROGRAMMING USING CAPTIONING

(75) Inventor: Chad W. Shusman, West Conshohocken, PA (US)

(73) Assignee: MediaIP, Inc., Rydal, PA (US)

( * ) Notice: Subject to any disclaimer, the term of this patent is extended or adjusted under 35 U.S.C. 154(b) by 0 days.

(21) Appl. No.: 12/211,714

(22) Filed: Sep. 16, 2008

(65) Prior Publication Data
US 2009/0089840 A1     Apr. 2, 2009

Related U.S. Application Data

(63) Continuation of application No. 10/222,461, filed on Aug. 16, 2002, now abandoned.

(51) Int. Cl.
*H04N 7/16*     (2006.01)
(52) U.S. Cl. ............... 725/135; 725/50; 725/13
(58) Field of Classification Search ........... 725/13, 725/24, 25, 45, 46, 136, 50
See application file for complete search history.

(56) References Cited

U.S. PATENT DOCUMENTS

| | | |
|---|---|---|
| 3,493,674 A | 2/1970 | Houghton |
| 3,947,624 A | 3/1976 | Miyake |
| 3,947,972 A | 4/1976 | Freeman |
| 4,107,735 A | 8/1978 | Frohbach |
| 4,205,343 A | 5/1980 | Barrett |
| 4,305,131 A | 12/1981 | Best |
| 4,308,554 A | 12/1981 | Percy et al. |
| 4,337,483 A | 6/1982 | Guillou |
| 4,355,372 A | 10/1982 | Johnson et al. |
| 4,377,870 A | 3/1983 | Anderson et al. |
| 4,393,404 A | 7/1983 | Cox et al. |
| 4,486,779 A | 12/1984 | Marti |
| 4,546,382 A | 10/1985 | McKenna et al. |
| 4,566,030 A | 1/1986 | Nickerson et al. |
| 4,567,511 A | 1/1986 | Smith et al. |
| 4,569,026 A | 2/1986 | Best |

(Continued)

FOREIGN PATENT DOCUMENTS

DE        4201696        7/1993
(Continued)

OTHER PUBLICATIONS

Van Tassel, Joan M., Digital TV over Broadband Harvesting Bandwidth; Copyright 2001.
(Continued)

*Primary Examiner* — Brian T Pendleton
*Assistant Examiner* — Olugbenga Idowu
(74) *Attorney, Agent, or Firm* — Christie, Parker & Hale, LLP

(57) ABSTRACT

A method and system for the creation of interactive programming using captions. A caption and program information extractor monitors a broadcast media signal having captions and program information encoded in the broadcast media signal. The captions and program information are extracted and stored in a content database. A moderator accesses the content database to retrieve captions and for a program specified by the program information. The moderator uses the services of a moderator server to generate interactive programming from the captions and the moderator's own comments. The interactive programming is transmitted to a plurality of viewers who interact with the interactive programming by entering viewer comments. The viewer comments are received by the moderator along with additional captions and new interactive programming is generated using the viewer comments, additional captions, and additional moderator commentary.

14 Claims, 43 Drawing Sheets

U.S. PATENT DOCUMENTS

| | | | |
|---|---|---|---|
| 4,573,072 A | 2/1986 | Freeman |
| 4,578,700 A | 3/1986 | Roberts et al. |
| 4,600,921 A | 7/1986 | Thomas |
| 4,602,279 A | 7/1986 | Freeman |
| 4,626,904 A | 12/1986 | Lurie |
| 4,630,108 A | 12/1986 | Gomersall |
| 4,644,509 A | 2/1987 | Kiewit et al. |
| 4,646,145 A | 2/1987 | Percy et al. |
| 4,658,290 A | 4/1987 | McKenna et al. |
| 4,684,980 A | 8/1987 | Rast et al. |
| 4,689,619 A | 8/1987 | O'Brien, Jr. |
| 4,695,879 A | 9/1987 | Weinblatt |
| 4,750,036 A | 6/1988 | Martinez |
| 4,829,569 A | 5/1989 | Seth-Smith et al. |
| 4,847,698 A | 7/1989 | Freeman |
| 4,847,699 A | 7/1989 | Freeman |
| 4,847,700 A | 7/1989 | Freeman |
| 4,866,770 A | 9/1989 | Seth-Smith et al. |
| 4,876,592 A | 10/1989 | Von Khorn |
| 4,890,321 A | 12/1989 | Seth-Smith et al. |
| 4,905,080 A | 2/1990 | Watanabe et al. |
| 4,918,516 A | 4/1990 | Freeman |
| 4,924,303 A | 5/1990 | Brandon et al. |
| 4,926,255 A | 5/1990 | Von Khorn |
| 4,930,011 A | 5/1990 | Kiewit |
| 4,943,963 A | 7/1990 | Waechter et al. |
| 4,953,022 A | 8/1990 | Bugg |
| 4,989,233 A | 1/1991 | Schakowsky et al. |
| 4,991,011 A | 2/1991 | Johnson et al. |
| 5,008,750 A | 4/1991 | Gomikawa |
| 5,014,125 A | 5/1991 | Pocock et al. |
| 5,036,389 A | 7/1991 | Morales |
| 5,038,211 A | 8/1991 | Hallenbeck |
| 5,038,212 A | 8/1991 | Van Den Hombergh et al. |
| 5,063,610 A | 11/1991 | Alwadish |
| 5,073,931 A | 12/1991 | Audebert et al. |
| 5,081,680 A | 1/1992 | Bennett |
| 5,101,267 A | 3/1992 | Morales-Garza |
| 5,103,038 A | 4/1992 | Chen et al. |
| 5,108,115 A | 4/1992 | Berman et al. |
| 5,120,076 A | 6/1992 | Luxenberg et al. |
| 5,155,762 A | 10/1992 | Croquet et al. |
| 5,157,491 A | 10/1992 | Kassatly |
| 5,177,604 A | 1/1993 | Martinez |
| 5,189,630 A | 2/1993 | Barstow et al. |
| 5,191,410 A | 3/1993 | McCalley et al. |
| 5,200,823 A | 4/1993 | Yoneda et al. |
| 5,214,792 A | 5/1993 | Alwadish |
| RE34,340 E | 8/1993 | Freeman |
| 5,251,324 A | 10/1993 | McMullan, Jr. |
| 5,260,778 A | 11/1993 | Kauffman et al. |
| 5,260,788 A | 11/1993 | Takano et al. |
| 5,319,455 A | 6/1994 | Hoarty et al. |
| 5,340,317 A | 8/1994 | Freeman |
| 5,375,160 A | 12/1994 | Guidon et al. |
| 5,381,477 A | 1/1995 | Beyers, II et al. |
| 5,382,970 A | 1/1995 | Kiefl |
| 5,388,197 A | 2/1995 | Rayner |
| 5,390,027 A | 2/1995 | Henmi et al. |
| 5,410,359 A | 4/1995 | Odijk et al. |
| 5,420,923 A | 5/1995 | Beyers, II et al. |
| 5,438,355 A | 8/1995 | Palmer |
| 5,446,490 A | 8/1995 | Blahut et al. |
| 5,465,384 A | 11/1995 | Bejan et al. |
| 5,490,207 A | 2/1996 | Schorr |
| 5,497,185 A | 3/1996 | Dufresne et al. |
| 5,519,780 A | 5/1996 | Woo et al. |
| 5,524,195 A | 6/1996 | Clanton, III et al. |
| 5,530,469 A | 6/1996 | Garfinkle |
| 5,532,732 A | 7/1996 | Yuen et al. |
| 5,537,141 A | 7/1996 | Harper et al. |
| 5,537,408 A | 7/1996 | Branstad et al. |
| 5,539,471 A | 7/1996 | Myhrvold et al. |
| 5,539,658 A | 7/1996 | McCullough |
| 5,539,822 A | 7/1996 | Lett |
| 5,543,818 A | 8/1996 | Scott |
| 5,557,724 A | 9/1996 | Sampat et al. |
| 5,563,648 A | 10/1996 | Manand et al. |
| 5,583,563 A | 12/1996 | Wanderscheid et al. |
| 5,585,858 A | 12/1996 | Harper et al. |
| 5,585,865 A | 12/1996 | Amano et al. |
| 5,589,892 A | 12/1996 | Knee et al. |
| 5,596,373 A | 1/1997 | White et al. |
| 5,604,542 A | 2/1997 | Dedrick |
| 5,623,613 A | 4/1997 | Rowe et al. |
| 5,632,007 A | 5/1997 | Freeman |
| 5,635,979 A | 6/1997 | Kostreski et al. |
| 5,638,113 A | 6/1997 | Lappington et al. |
| 5,654,763 A | 8/1997 | Bruckner et al. |
| 5,682,196 A | 10/1997 | Freeman |
| 5,689,799 A | 11/1997 | Dougherty et al. |
| 5,694,163 A | 12/1997 | Harrison |
| 5,703,795 A | 12/1997 | Mankovitz |
| 5,715,400 A | 2/1998 | Reimer |
| 5,721,583 A | 2/1998 | Harada et al. |
| 5,724,091 A | 3/1998 | Freeman et al. |
| 5,761,606 A | 6/1998 | Wolzien |
| 5,768,539 A | 6/1998 | Metz et al. |
| 5,774,664 A | 6/1998 | Hidary et al. |
| 5,778,181 A | 7/1998 | Hidary et al. |
| 5,781,228 A | 7/1998 | Sposato |
| 5,802,284 A | 9/1998 | Karlton et al. |
| 5,812,642 A | 9/1998 | Leroy |
| 5,812,931 A | 9/1998 | Yuen |
| 5,818,440 A | 10/1998 | Allibhoy et al. |
| 5,819,036 A | 10/1998 | Adams et al. |
| 5,822,530 A | 10/1998 | Brown |
| 5,848,352 A | 12/1998 | Dougherty et al. |
| 5,859,670 A | 1/1999 | Van Gestel |
| 5,860,023 A | 1/1999 | Tognazzini |
| 5,861,881 A | 1/1999 | Freeman et al. |
| 5,896,382 A | 4/1999 | Davis et al. |
| 5,900,905 A | 5/1999 | Shoff et al. |
| 5,903,262 A | 5/1999 | Ichihashi et al. |
| 5,903,816 A | 5/1999 | Broadwin et al. |
| 5,905,537 A | 5/1999 | Van Gestel |
| 5,929,850 A | 7/1999 | Broadwin et al. |
| 5,931,908 A | 8/1999 | Gerba et al. |
| 5,974,449 A | 10/1999 | Chang et al. |
| 5,977,962 A | 11/1999 | Chapman et al. |
| 5,982,445 A | 11/1999 | Eyer et al. |
| 5,987,504 A | 11/1999 | Toga |
| 5,993,314 A | 11/1999 | Dannenberg et al. |
| 5,995,134 A | 11/1999 | Hayashi |
| 5,996,006 A | 11/1999 | Speicher |
| 5,996,022 A | 11/1999 | Krueger et al. |
| 6,005,561 A | 12/1999 | Hawkins et al. |
| 6,005,565 A | 12/1999 | Legall et al. |
| 6,005,601 A | 12/1999 | Ohkura et al. |
| 6,005,602 A | 12/1999 | Matthews, III |
| 6,006,256 A | 12/1999 | Zdespski et al. |
| 6,014,689 A | 1/2000 | Budge |
| 6,018,768 A | 1/2000 | Ullman et al. |
| 6,049,823 A | 4/2000 | Hwang |
| 6,067,107 A | 5/2000 | Travaille et al. |
| 6,072,532 A | 6/2000 | Chieh et al. |
| 6,093,026 A | 7/2000 | Walker et al. |
| 6,097,441 A | 8/2000 | Allport |
| 6,134,531 A | 10/2000 | Trewitt et al. |
| 6,141,678 A | 10/2000 | Britt, Jr. |
| 6,151,626 A | 11/2000 | Tims et al. |
| 6,167,432 A | 12/2000 | Jiang |
| 6,175,378 B1 | 1/2001 | Maillard |
| 6,195,530 B1 | 2/2001 | Smith et al. |
| 6,195,692 B1 | 2/2001 | Hsu |
| 6,198,509 B1 | 3/2001 | Dougherty et al. |
| 6,204,885 B1 | 3/2001 | Kwoh |
| 6,209,100 B1 | 3/2001 | Robertson et al. |
| 6,211,869 B1 | 4/2001 | Loveman et al. |
| 6,223,213 B1 | 4/2001 | Cleron et al. |
| 6,275,989 B1 | 8/2001 | Broadwin et al. |
| 6,477,579 B1 | 11/2002 | Kunkel et al. |
| 7,174,453 B2 * | 2/2007 | Lu ..................... 713/154 |
| 7,222,163 B1 * | 5/2007 | Girouard et al. ......... 709/219 |
| 2001/0001160 A1 | 5/2001 | Shoff et al. |
| 2001/0002852 A1 | 6/2001 | Kwoh |
| 2001/0003214 A1 * | 6/2001 | Shastri et al. ............ 725/109 |

| | | | | | | |
|---|---|---|---|---|---|---|
| 2001/0004743 A1 | 6/2001 | Krueger et al. | | WO | WO 00/33578 A1 | 6/2000 |
| 2001/0047516 A1 | 11/2001 | Swain et al. | | WO | WO 00/44173 | 7/2000 |
| 2002/0133816 A1* | 9/2002 | Greene et al. ............... 725/13 | | WO | WO 00/51310 | 8/2000 |
| 2003/0078972 A1* | 4/2003 | Tapissier et al. ............ 709/204 | | WO | WO 00/54506 | 9/2000 |
| 2003/0208755 A1* | 11/2003 | Zimmerman ................ 725/34 | | WO | WO 00/56066 A1 | 9/2000 |
| 2005/0262542 A1* | 11/2005 | DeWeese et al. ............ 725/106 | | WO | WO 00/56067 | 9/2000 |

FOREIGN PATENT DOCUMENTS

| | | | | | |
|---|---|---|---|---|---|
| EP | 0314572 A2 | 5/1989 | WO | WO 00/60865 | 10/2000 |
| EP | 0402809 A3 | 12/1990 | WO | WO 00/63817 | 10/2000 |
| EP | 0620669 A1 | 10/1994 | WO | WO 00/64150 | 10/2000 |
| EP | 0858225 A1 | 8/1998 | WO | WO 00/64172 | 10/2000 |
| EP | 0873772 A1 | 10/1998 | WO | WO 00/70783 | 11/2000 |
| EP | 0917333 A1 | 5/1999 | WO | WO 00/72141 A2 | 11/2000 |
| EP | 0954179 A2 | 11/1999 | WO | WO 00/74338 A2 | 12/2000 |
| EP | 0982943 A2 | 3/2000 | WO | WO 00/76215 A1 | 12/2000 |
| EP | 1087565 A2 | 3/2001 | WO | WO 00/78033 A2 | 12/2000 |
| EP | 1089201 A1 | 4/2001 | WO | WO 00/78043 A1 | 12/2000 |
| EP | 1091582 A2 | 4/2001 | WO | WO 00/78050 A1 | 12/2000 |
| EP | 1111926 A2 | 6/2001 | WO | WO 01/01232 | 1/2001 |
| EP | 1119192 A2 | 7/2001 | WO | WO 01/01270 A1 | 1/2001 |
| EP | 1124173 A2 | 8/2001 | WO | WO 01/01677 A1 | 1/2001 |
| GB | 2348346 | 9/2000 | WO | WO 01/01684 A1 | 1/2001 |
| WO | WO 96/05699 A1 | 2/1996 | WO | WO 01/01690 A1 | 1/2001 |
| WO | WO 96/19074 | 6/1996 | WO | WO 01/05152 A1 | 1/2001 |
| WO | WO 96/27982 | 9/1996 | WO | WO 01/06784 A1 | 1/2001 |
| WO | WO 97/01245 | 1/1997 | WO | WO 01/09714 A2 | 2/2001 |
| WO | WO 97/02699 | 1/1997 | WO | WO 01/10115 A1 | 2/2001 |
| WO | WO 97/18673 | 5/1997 | WO | WO 01/10118 A1 | 2/2001 |
| WO | WO 97/28502 | 8/1997 | WO | WO 01/11887 A1 | 2/2001 |
| WO | WO 97/29458 | 8/1997 | WO | WO 01/12279 A2 | 2/2001 |
| WO | WO 97/31479 | 8/1997 | WO | WO 01/15437 A1 | 3/2001 |
| WO | WO 97/33434 | 9/1997 | WO | WO 01/16856 A1 | 3/2001 |
| WO | WO 97/34419 | 9/1997 | WO | WO 01/18678 A2 | 3/2001 |
| WO | WO 97/47143 | 12/1997 | WO | WO 01/19084 A1 | 3/2001 |
| WO | WO 98/00974 | 1/1998 | WO | WO 01/20468 A1 | 3/2001 |
| WO | WO 98/00975 | 1/1998 | WO | WO 01/20499 A1 | 3/2001 |
| WO | WO 98/17064 | 4/1998 | WO | WO 01/24027 A1 | 4/2001 |
| WO | WO 98/21664 | 5/1998 | WO | WO 01/24036 A1 | 4/2001 |
| WO | WO 98/22880 | 5/1998 | WO | WO 01/25940 A1 | 4/2001 |
| WO | WO 98/26595 | 6/1998 | WO | WO 01/26369 A1 | 4/2001 |
| WO | WO 98/41020 | 9/1998 | WO | WO 01/33833 A1 | 5/2001 |
| WO | WO 98/48566 | 10/1998 | WO | WO 01/33847 A1 | 5/2001 |
| WO | WO 99/04342 | 1/1999 | WO | WO 01/33858 A1 | 5/2001 |
| WO | WO 99/08390 | 2/1999 | WO | WO 01/37557 A1 | 5/2001 |
| WO | WO 99/14948 | 3/1999 | WO | WO 01/39494 A1 | 5/2001 |
| WO | WO 99/30497 | 6/1999 | WO | WO 01/39501 A1 | 5/2001 |
| WO | WO 99/30500 | 6/1999 | WO | WO 01/43357 A2 | 6/2001 |
| WO | WO 99/49390 | 9/1999 | WO | WO 01/44914 A1 | 6/2001 |
| WO | WO 99/49658 | 9/1999 | WO | WO 01/45313 A2 | 6/2001 |
| WO | WO 99/52036 | 10/1999 | WO | WO 01/45406 A1 | 6/2001 |
| WO | WO 99/60789 | 11/1999 | WO | WO 01/45413 A1 | 6/2001 |
| WO | WO 99/62248 | 12/1999 | WO | WO 01/46843 A2 | 6/2001 |
| WO | WO 99/63757 | 12/1999 | WO | WO 01/47262 A2 | 6/2001 |
| WO | WO 99/66726 | 12/1999 | WO | WO 01/49032 A1 | 7/2001 |
| WO | WO 99/66727 | 12/1999 | WO | WO 01/50309 A2 | 7/2001 |
| WO | WO 99/66732 | 12/1999 | WO | WO 01/50742 A1 | 7/2001 |
| WO | WO 00/04707 | 1/2000 | WO | WO 01/50753 A1 | 7/2001 |
| WO | WO 00/05885 | 2/2000 | WO | WO 01/50758 A2 | 7/2001 |
| WO | WO 00/07336 | 2/2000 | WO | WO 01/54407 A1 | 7/2001 |
| WO | WO 00/08855 | 2/2000 | WO | WO 01/56292 A1 | 8/2001 |
| WO | WO 00/13415 | 3/2000 | WO | WO 01/56293 A1 | 8/2001 |
| WO | WO 00/13416 | 3/2000 | WO | WO 01/58150 A2 | 8/2001 |
| WO | WO 00/14965 | 3/2000 | WO | WO 01/59964 A2 | 8/2001 |
| WO | WO 00/16209 | 3/2000 | WO | WO 01/60071 A2 | 8/2001 |
| WO | WO 00/16544 | 3/2000 | WO | WO 01/60072 A2 | 8/2001 |
| WO | WO 00/18114 | 3/2000 | WO | WO 01/63929 A1 | 8/2001 |
| WO | WO 00/21297 | 4/2000 | WO | WO 01/69369 A1 | 9/2001 |
| WO | WO 00/24198 | 4/2000 | WO | WO 01/69940 A1 | 9/2001 |
| WO | WO 00/27115 | 5/2000 | WO | WO 01/73525 A2 | 10/2001 |
| WO | WO 00/28432 | 5/2000 | | | |
| WO | WO 00/28739 | 5/2000 | | | |
| WO | WO 00/31973 | 6/2000 | | | |
| WO | WO 00/33561 | 6/2000 | | | |
| WO | WO 00/33565 | 6/2000 | | | |

OTHER PUBLICATIONS

International Search Report for International Application No. PCT/US03/11534 which was filed on Apr. 15, 2003.

* cited by examiner

Using TalkShow.Com's queue filter, the moderator can view questions in a descending order of relevance based on keywords ans closeness to the show's topic.

METHOD AND APPARATUS FOR INTERACTIVE PROGRAMMING USING CAPTIONING

CROSS-REFERENCE TO RELATED APPLICATIONS

This patent application is a continuation application of U.S. patent application Ser. No. 10/222,461, filed Aug. 16, 2002, now abandoned entitled "METHOD AND APPARATUS FOR INTERACTIVE PROGRAMMING USING CAPTIONING," which is related to U.S. patent application Ser. No. 11/323,575, filed on Dec. 29, 2005, entitled "METHOD AND APPARATUS FOR INTERACTIVE VIDEO ON DEMAND" (which is a continuation application of U.S. patent application Ser. No. 10/414,863, filed on Apr. 15, 2003, entitled "METHOD AND APPARATUS FOR INTERACTIVE VIDEO ON DEMAND") and U.S. patent application Ser. No. 10/335,200, filed Jan. 18, 2006, entitled "METHOD AND APPARATUS FOR INTERNET-BASED INTERACTIVE PROGRAMMING" (which is continuation application of U.S. patent application Ser. No. 10/123,618, filed Apr. 15, 2002, entitled "METHOD AND APPARATUS FOR INTERNET-BASED INTERACTIVE PROGRAMMING"), the contents of all of which are incorporated by reference as if stated fully herein.

BACKGROUND OF THE INVENTION

This invention pertains generally to the field of interactive programming and more specifically to creating interactive programming using captions from television programs.

Some television programs include captioning information created by the television program broadcaster. The captions are encoded into the television signal and broadcast to a viewer's television where the captions are extracted from the television signal and displayed on the viewer's television screen. The captions are intended for the hearing impaired and contain textual representations of the auditory components of a television broadcast. While intended for the hearing-impaired, captions are used in a variety of situations. For example, the captions may be used in lieu of the audio components of the television signal so that viewers can still watch television in environments where the noise levels are very high, for example in a gymnasium.

The captioning for a television program include a textual representation of the entire contents of the television program since the captions are intended as a complete replacement for the audio components of a television program. This aspect of captions makes the captions useful for a variety of other purposes. For example, the captions can be used to create transcriptions of a television program for archival purposes. In addition, the captions provide a compact representation of the complete television program. Finally, a description or metadata may be generated for a television program using the caption information. These different uses for captioning data make captioning an attractive source of information and content for people desiring to form special interest groups or communities around particular television programs. For example, a commentator may want to create a talkshow to explore news items included in a televised news report. Such a talkshow would allow viewers and a commentator to fully explore news items within the context of a news broadcast.

Therefore, a need exists for an interactive program generation tool allowing the creation of a talkshow from captioning data. Such a tool should be lightweight, meaning it does not require a lot of processing resources to run, and should be able to generate interactive programming for a variety of different display devices. The present invention meets such a need.

SUMMARY OF THE INVENTION

In one aspect of the invention, a caption and program information extractor monitors a broadcast media signal having captions and program information encoded in the broadcast media signal. A caption and program information extractor monitors a broadcast media signal having captions and program information encoded in the broadcast media signal. The captions and program information are extracted and stored in a content database. A moderator accesses the content database to retrieve captions and for a program specified by the program information. The moderator uses the services of a moderator server to generate interactive programming from the captions and the moderator's own comments. The interactive programming is transmitted to a plurality of viewers who interact with the interactive programming by entering viewer comments. The viewer comments are received by the moderator along with additional captions and new interactive programming is generated using the viewer comments, additional captions, and additional moderator commentary.

In one aspect of the invention, a method for generating an interactive program for transmission over a communications network is provided. A caption and program information extractor extracts captions and program information from a broadcast media signal and puts the captions and program information in a content database. A moderator server is coupled through the communications network to a moderator client and a plurality of viewer clients. The moderator server receives moderator comments and edited viewer comments from the moderator client through the communications network and gets captions and program information from the content database. The moderator server then generates interactive programming using the moderator comments, edited viewer comments, program information, and captions and transmits the interactive programming to the viewer clients through the communications network.

In another aspect of the invention, the moderator server receives viewer comments from the viewer clients and transmits the viewer comments to the moderator client through the communications network.

In another aspect of the invention, the communications network used is a virtual private network.

In another aspect of the invention, the viewers rate an interactive program by further including an interactive program rating signal in the viewer comment signals. In response, a moderator may transmit a viewer exclusion signal specifying a viewer client to the moderator server and the moderator server generates the interactive programming using the viewer exclusion signal to exclude viewer comments received from the specific viewer client. In addition, the moderator may transmit a viewer invitation signal corresponding to a specific viewer client to the moderator server and the moderator server generates viewer interactive programming using the viewer invitation signal to include viewer comments from the specific viewer client on a virtual stage.

In another aspect of the invention, an apparatus is provided for generating an interactive program for transmission over a television broadcast network and a communications network. The apparatus includes a content database, a caption and program information extractor coupled to a broadcast media signal source and the content database, and a moderator server coupled to a moderator client, the content database, and the television broadcast network. The moderator server includes a processor and a memory operably coupled to the processor. Program instructions stored in the memory are executed by the processor to implement the features of an interactive programming generation system. The program instructions include: receiving moderator comments and edited viewer comments by the moderator server from the moderator client; getting captions and program information by the moderator server from the content database; generating viewer interactive programming using the moderator comments, edited viewer comments, program information, and captions; and transmitting the interactive programming by the moderator server to viewer televisions through the television broadcast network.

In another aspect of the invention, the moderator server is further coupled to a plurality of viewer clients through the communications network. The program instructions further include receiving viewer comments by the moderator server from viewer clients through the communications network and transmitting the viewer comments by the moderator server to the moderator client through the communications network.

In another aspect of the invention, an apparatus for generating an interactive program for transmission over a television broadcast network is provided. The apparatus includes a content database and a caption and program information extractor coupled to a broadcast media signal source. The caption and program information extractor extracts captions and program information from a broadcast media signal and puts the captions and program information in the content database. A moderator server is coupled to a moderator client through the communications network and coupled to the content database. The moderator server is further coupled to the television broadcast network. The moderator server includes programming instructions for generation of interactive programming from the captions and program information. The moderator server receives moderator comments and edited viewer comments from the moderator client through the communications network and gets captions and program information from the content database. The moderator server then generates interactive programming using the moderator comments, edited viewer comments, program information, and captions and transmits the interactive programming to viewer televisions through the television broadcast network. In another aspect of the invention the moderator server is further coupled to a telephony network and viewers communicate with the moderator server through the telephony network.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
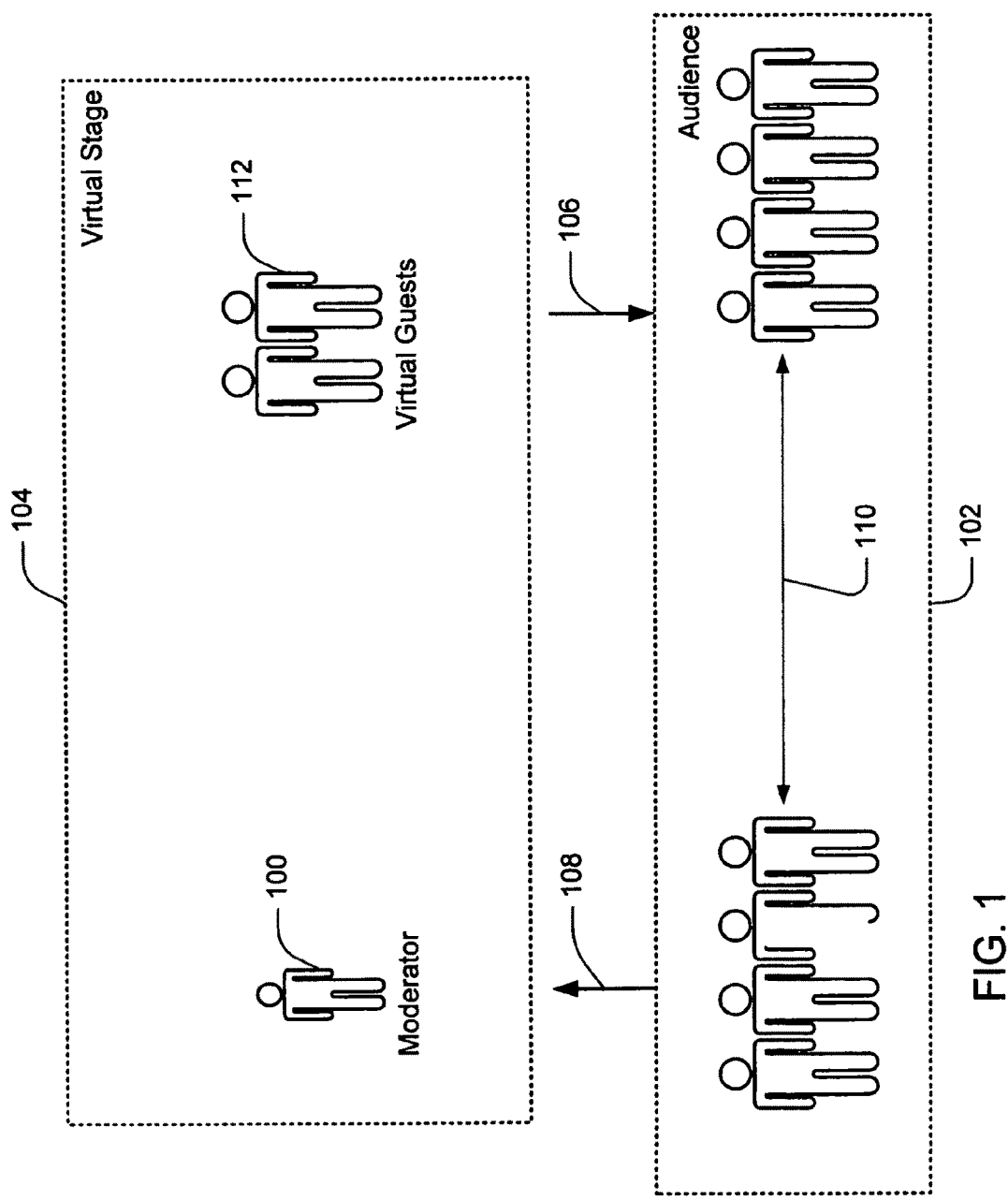
FIG. 1 is a conceptual diagram of a system for creating an interactive program incorporating participant interactions in accordance with an exemplary embodiment of the present invention.

FIG. 1 is a conceptual diagram of a system for creating an interactive program incorporating participant interactions in accordance with an exemplary embodiment of the present invention. A moderator 100 hosts an interactive program, such as a broadcast program with a talk show format, that is transmitted to an audience having a plurality of viewers 102. The interactive program takes place on a virtual stage 104 where the moderator generates interactive programming for transmission to the viewers. The moderator transmits the interactive program 106 to the viewers. The viewers may passively watch the interactive program or may become active participants by generating their own comments 108 that are transmitted back to the moderator. The moderator edits or filters the participant comments and retransmits the edited participant comments as part of the interactive program. The viewers may communicate with each other during the interactive program by exchanging audience interactive messages 110 between themselves.

The moderator controls the content of the interactive program in a variety of ways. The moderator introduces the initial topic or content for audience interaction. For example, the moderator may introduce a topical event such as a news story and then ask for participant comments. The moderator may also use previously prepared content such as a non-interactive program that is transmitted to the audience in order to elicit audience member responses and engage viewers. The moderator can invite virtual guests 112 from the audience onto the virtual stage. While on the virtual stage, the virtual guests exchange interactive messages directly with the moderator rather than with other audience members or participants. The moderator may also exclude a participant or viewer from the audience. Additionally, the moderator may generate additional interactive programming for use by the audience such as polls so that the audience can participate in the interactive program by selecting responses to a question from a list of answers. The results of the participant responses are aggregated for inclusion in the interactive program.

In one system for creating an interactive program incorporating participant interactions in accordance with an exemplary embodiment of the present invention, the interactive programs are talk shows hosted by independent moderators and delivered to an audience via the Internet. This system allows a moderator to be recognized as an expert or respected voice in a particular field while building a community of viewer participants interested in that particular field. The system allows the moderator to create a controlled and moderated environment where the moderator directs the flow of information and has complete control over the medium. The system is cost-effective because no special hardware or training is needed to operate the system. The system features a customizable Web-based interface for moderators and viewers to use in creating customized collaborative interactive programs.

Figure 2:
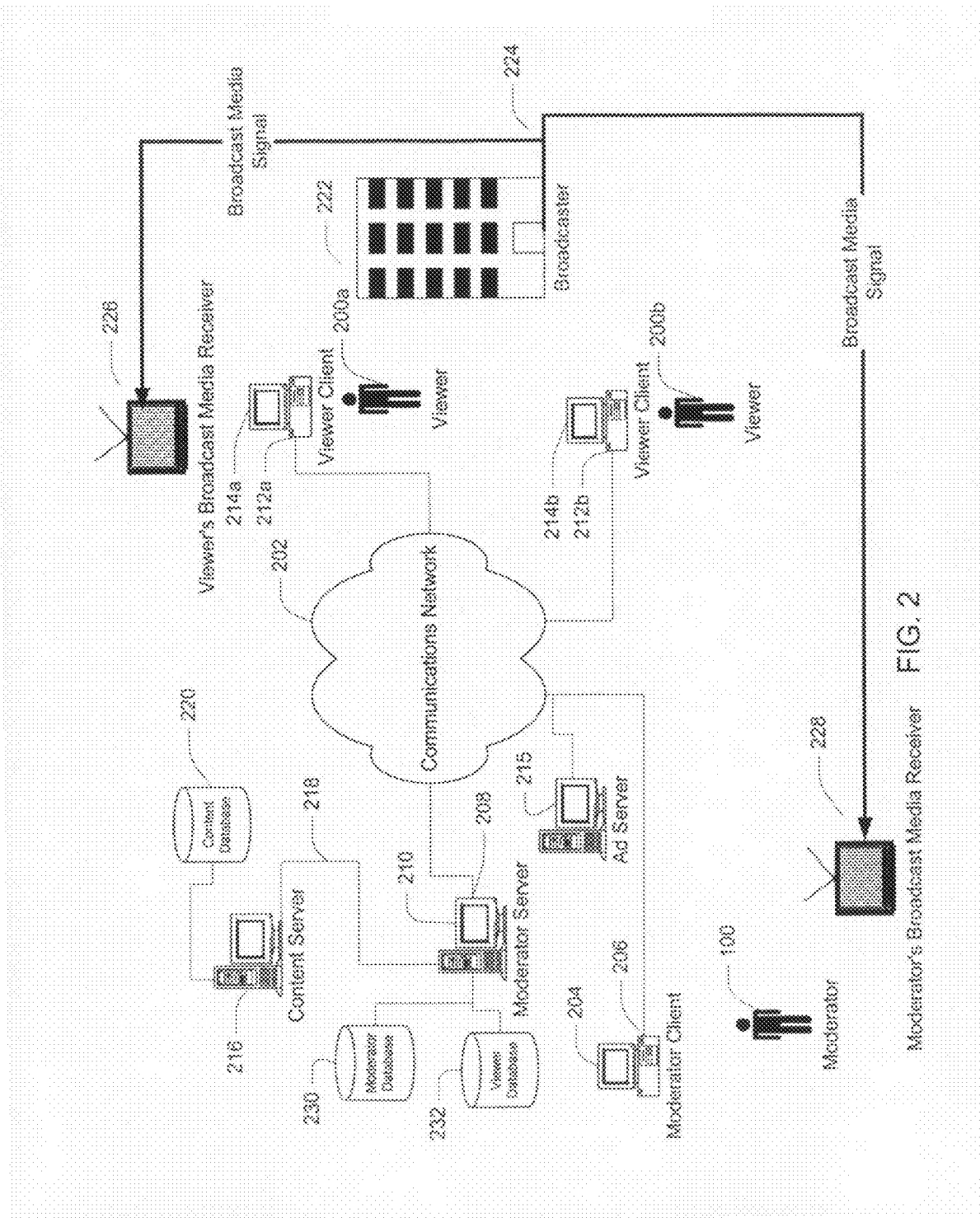
FIG. 2 is a deployment diagram of a system for creating an interactive program in accordance with an exemplary embodiment of the present invention.

FIG. 2 is a deployment diagram of a system for creating an interactive program incorporating participant interactions in accordance with an exemplary embodiment of the present invention. A moderator 100 transmits an interactive program to a plurality of viewers, as exemplified by viewers 200a and 200b, via a communications network 202 such as the Internet. The moderator uses a moderator client 204 to transmit moderator signals over communications link 206 and communications link 208 to a moderator server 210. The moderator server uses the moderator signals to generate an interactive program that is transmitted over communication link 208 and communications links 212a and 212b to a plurality of viewer clients as exemplified by viewer clients 214a and 214b. The viewers become participants by responding to the interactive program by generating and transmitting to the moderator server a plurality of participant comment signals using the viewer clients. The participant comment signals encode the participants' commentary about the interactive program. The moderator server receives the participant comment signals and retransmits them to the moderator client where the moderator edits the participant comment signals. The moderator generates new moderator signals that are transmitted to the moderator server along with the edited participant comment signals. The moderator server uses the moderator signals and the edited user comment signals to generate additional interactive program signals that are transmitted to the viewers' clients. The process of receiving participant comment signals, editing the user comment signals, and generating new interactive program signals is repetitively performed in order to generate an interactive program incorporating viewer interactions.

In a system for creating an interactive program incorporating viewer interactions in accordance with an exemplary embodiment of the present invention, the moderator server is operably coupled to content server 216 via a communications link 218. The content server hosts a content source such as content database 220 including content suitable for broadcast by the moderator server. Such content may include past broadcast programs that the moderator is using as a topic for further discussion within the audience. The moderator instructs the moderator server to request and receive content signals from the content server and the moderator server generates an interactive program including the content signals. In this way, non-interactive content may be enhanced with an interactive component thus leveraging non-interactive content by creating an interactive program using content without an interactive component. In another embodiment of enhanced content, the content is synchronized with the interactive component and the content is transmitted to the viewer client from a server other than the moderator server in a program synchronous fashion.

In a system for creating an interactive program incorporating viewer interactions in accordance with an exemplary embodiment of the present invention, the moderator server hosts software facilities for the moderator to use in generating an interactive program. The moderator server is operably coupled to a moderator database 230 including moderator information describing the type of interactive program the moderator produces and the moderator's interactive program broadcast schedule. The moderator information may be used to automatically generate a dynamic programming guide thus helping viewers find the moderator's interactive program. In addition, the moderator server records viewer interaction data describing the amount, timing, and type of viewer interactions with the moderator's produced interactive programming. The moderator may access the viewer interaction data to generate reports regarding the moderator's interactive programming.

In a system for creating an interactive program incorporating viewer interactions in accordance with an exemplary embodiment of the present invention, the moderator server hosts a viewer database 232 including viewer profile information. Viewer profile information includes information about viewer preferences and viewer notification requests. The viewer preferences are used by the moderator server to suggest interactive programming generated by a moderator which may match the viewer's stated preferences. The viewer notification requests are used by the moderator server to generate viewer notifications that are transmitted to a viewer in order to notify a viewer when a specific interactive program is about to be broadcast.

In one embodiment of a viewer notification generation process in accordance with the present invention, the privacy of the viewer is protected by not allowing the moderator access to viewer profiles. For example, the moderator may initiate a notification process but the moderator is never allowed to see to which viewers the notifications are sent. In addition, any viewership reports generated on behalf of a moderator use aggregate data for the viewers so that the viewers' identifications are not associated with the individual viewership reports.

In a system for creating an interactive program incorporating viewer interactions in accordance with an exemplary embodiment of the present invention, the audience and moderator comment on a broadcast program over which the moderator has minimal control. In this embodiment, a broadcaster 222 transmits a broadcast media signal 224 received by a viewer's broadcast media receiver 226 and a moderator's broadcast media receiver 228. In this embodiment, the moderator and the audience watch the broadcast program and exchange commentary about the broadcast program over the communications network as described above. In this way, non-interactive programming can be supplemented with an interactive component. Exemplary broadcast programs include broadcasts of real-time events, such as sporting events or breaking news stories, and pre-recorded programming such entertainment programs or documentaries.

Figure 3:
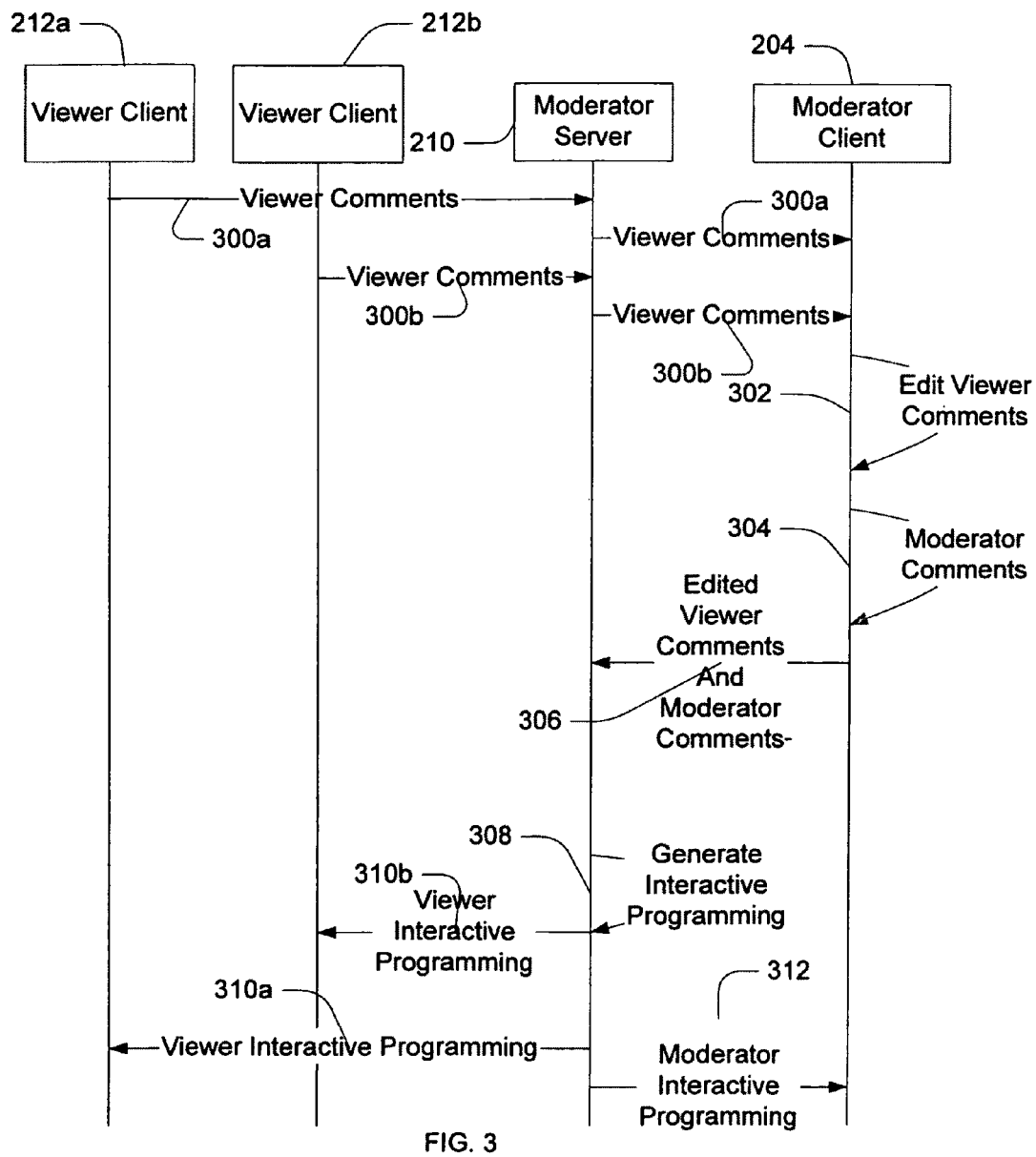
FIG. 3 is a sequence diagram of the operations within a system for creating an interactive program in accordance with an exemplary embodiment of the present invention.

FIG. 3 is a sequence diagram of a process within a system for creating an interactive program incorporating viewer interactions in accordance with an exemplary embodiment of the present invention. A moderator server 210 receives participant comments 300*a* and 300*b* from a plurality of viewer clients as exemplified by viewer clients 212*a* and 212*b*. The moderator server transmits the participant comments, 300*a* and 300*b*, to a moderator client 204. A moderator uses the moderator client to edit (302) the participant comments and generate (304) moderator comments. The edited participant comments and the moderator comments 306 are transmitted to the moderator server along with other moderator control signals generated by the moderator such as a viewer invitation signal for indicating a viewer to invite to a virtual stage or a viewer exclusion signal for excluding a viewer that is not behaving properly. The moderator server uses the moderator comments and the edited participant comments to generate (308) viewer interactive programming, 310*a* and 310*b*, that is transmitted to the plurality of viewer clients and moderator interactive programming 312 that is transmitted to the moderator client. The process is repeated indefinitely to generate an interactive program with the plurality of viewers interacting with the viewer interactive programming and the moderator using the moderator interactive programming to moderate the generation process.

In one embodiment of a system for creating an interactive program in accordance with an exemplary embodiment of the present invention, the interactive programming generated by the moderator server is stored in a moderator database (for example moderator database 230 of FIG. 2) for archival purposes. The interactive programming can be indexed and cataloged for generation of an archive listing describing the archived interactive programming. A viewer can then request archived interactive programming for viewing at a later time for "on-demand" viewing.

In one embodiment of a system for creating an interactive program in accordance with an exemplary embodiment of the present invention, a viewer can initiate the creation of an archive for an interactive program. As the interactive program is produced and transmitted to the viewer, the interactive program signals are stored for the viewer's own use. For example, a viewer can initiate the creation of an archive for a short period of time so that the viewer can leave the interactive program and rejoin the interactive program and be able to view the portions of the interactive program that the viewer missed. As another example, the viewer can create a personal archive of past interactive programs in a manner similar to a personal video recorder.

In another system for creating an interactive program in accordance with an exemplary embodiment of the present invention, the communications network is the Internet and the viewer clients and a moderator client are Web browsers. The moderator server receives moderator and participant comment signals in the form of POST requests and generates the interactive program as an interactive electronic document written in a document markup language such as Hyper Text Markup Language (HTML) or extensible Markup Language (XML) that is transmitted to the viewer clients. The viewer clients parse the electronic document and generate viewer displays using the instructions in the electronic document. The viewers respond to the viewer displays by entering text and selecting elements from the viewer displays. These viewer interactions are transmitted to the moderator server by the viewer's clients in subsequent POST messages. The moderator receives a different set of interactive moderator electronic documents that implement a moderator user interface enabling the moderator to control the operations of the moderator server.

In one system for creating an interactive program in accordance with an exemplary embodiment of the present invention, the system is deployed using the Microsoft® TV platform which is a standards-based, client and server software middleware system for deploying interactive programming. The platform includes a client software application hosted by a set-top-box and a server software application operably coupled by a communications network. The client software application includes a Web browser that can be used much like a conventional Web browser and an application programming interface for building native applications that are hosted by the set-top-box. The server includes several management functions including t-commerce and client management applications.

In another system for creating an interactive program in accordance with an exemplary embodiment of the present invention, the interactive programming generated by the moderator server further includes "click-through" style banner ads for selection by a viewer. If a viewer selects a click-through banner ad, the viewer's interaction with the banner ad is recorded in a moderator database in order to generate click-through activity related to the interactive programming. The banner ads may come either from the moderator server or an ad server not affiliated with the moderator server.

Figure 37:
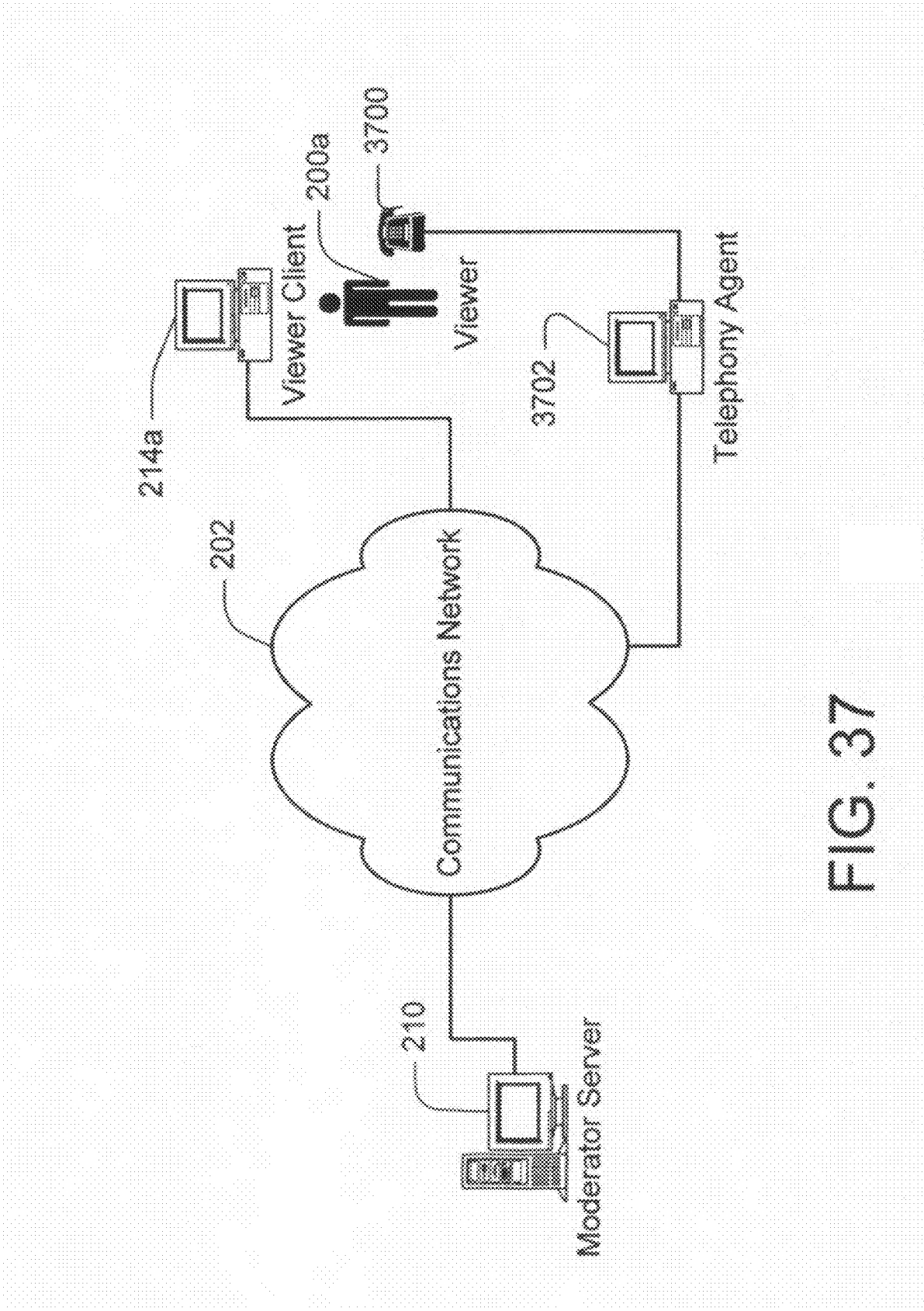
FIG. 37 is a deployment diagram for a telephony system for delivery of an interactive program in accordance with an embodiment of the present invention.

FIG. 37 is a deployment diagram for a telephony system for delivery of an interactive program in accordance with an embodiment of the present invention. A previously described moderator server 210 is operably coupled via a communications network 202 to previously described viewer client 214a. A viewer 200a, views an interactive program by accessing the moderator server using the viewer client. To participate, the viewer uses a telephone device 3700 to connect to a telephony agent 3702 operably coupled to the moderator server via the communications network. In operation, the viewer uses the telephone to dial up the telephony agent. The telephony agent receives audio signals and converts the audio signals to text signals that are transmitted to the moderator server via the communications network. In turn, the moderator server reroutes the textual component signals of an interactive program to the telephony agent. The telephony agent receives the textual component signals and converts the textual component signals into audio signals for transmission to the viewer via the telephone.

In another interactive program creation system in accordance with an embodiment of the present invention, a viewer downloads and installs a custom client plug-in that allows a viewer a built-in microphone on the viewer client. Using a control panel, participants direct their questions or comments to either the virtual stage or the audience interactive message area. The spoken words are digitized by the viewer client, analyzed, translated into text form, and transmitted via the communications link to the moderator server. The question or comment then appears in the interactive program. The plug-in allows viewers to participate in an interactive program in a traditional, voice-based way if they choose to.

In another interactive program creation system in accordance with an embodiment of the present invention, the spoken words are not translated to text. Instead, the digitized voice is transmitted directly over the communications link to the moderator server such as in Voice over Internet Protocol (VoIP) transmissions.

Figure 38:
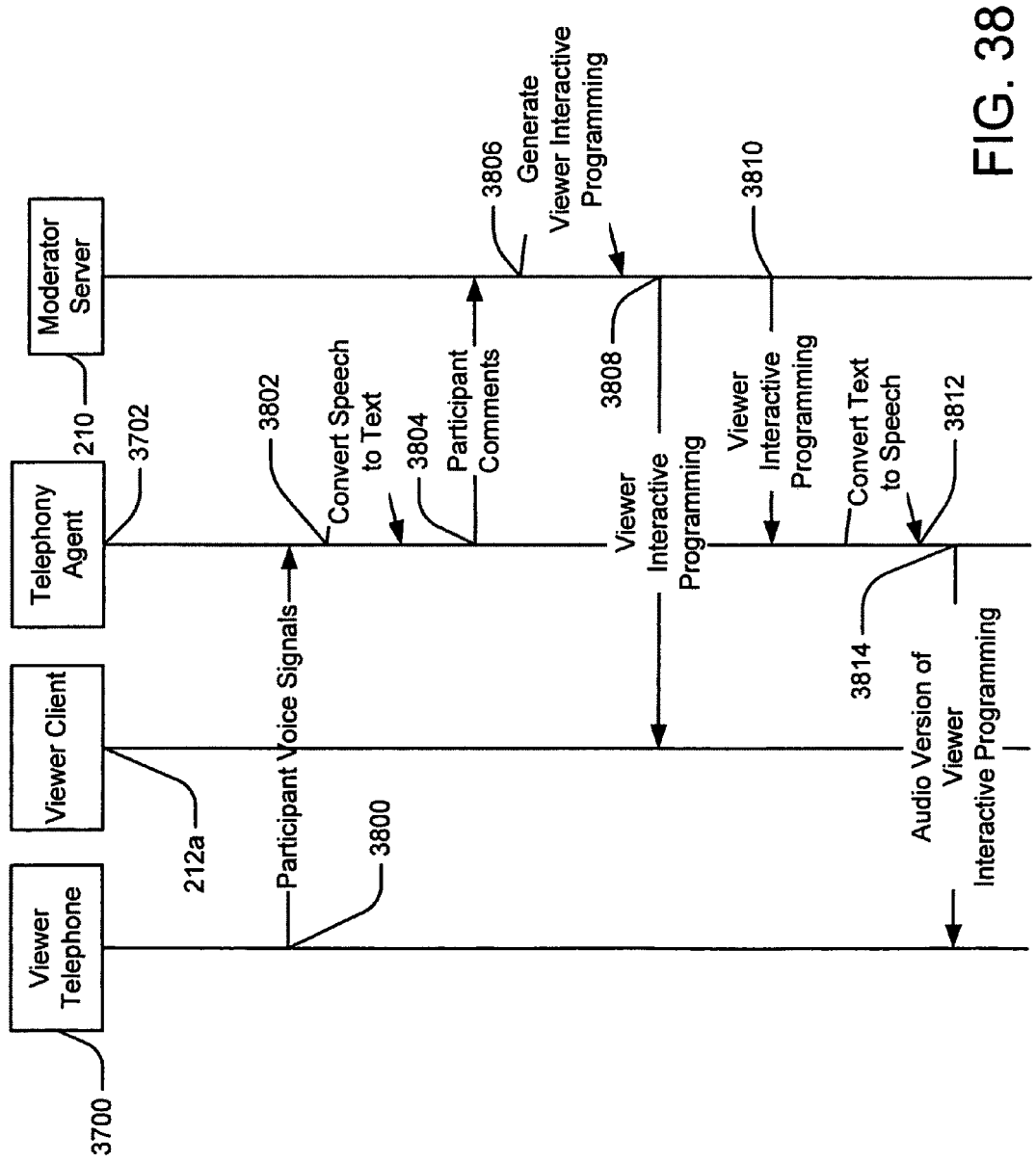
FIG. 38 is a sequence diagram for a telephony process as used by a telephony system for delivery of an interactive program in accordance with an embodiment of the present invention.

FIG. 38 is a sequence diagram for a telephony process as used by a telephony system for delivery of an interactive program in accordance with an embodiment of the present invention. A viewer uses a telephone device 3700 to send participant voice signals to a telephony agent 3702. The telephony agent converts 3802 the participant voice signals to text in a speech-to-text conversion process. The textual participant comments 3804 are transmitted to the moderator server. The textual participant comments are used to generate 3806 viewer interactive programming signals 3808 in a to-be-described process. The moderator server transmits the viewer interactive programming signals to the viewer client and transmits a second set of viewer interactive programming signals 3810 to the telephony agent. The telephony agent converts (3812) the textual portions of the viewer interactive programming to signals for an audio version of the viewer interactive programming 3814 in a text to speech conversion process. In this way, a viewer can participate in an interactive program using a telephone device for the generation of viewer interaction signals.

In another telephony process as used by a telephony system for delivery of an interactive program in accordance with an embodiment of the present invention, the video components of the interactive program are dispensed with and the participant interacts with the textual components of the interactive program using the telephone device. In this way, an interactive program can be created by a moderator with only textual or audio and textual components that is accessible to a participant using only a telephone device.

Figure 40:
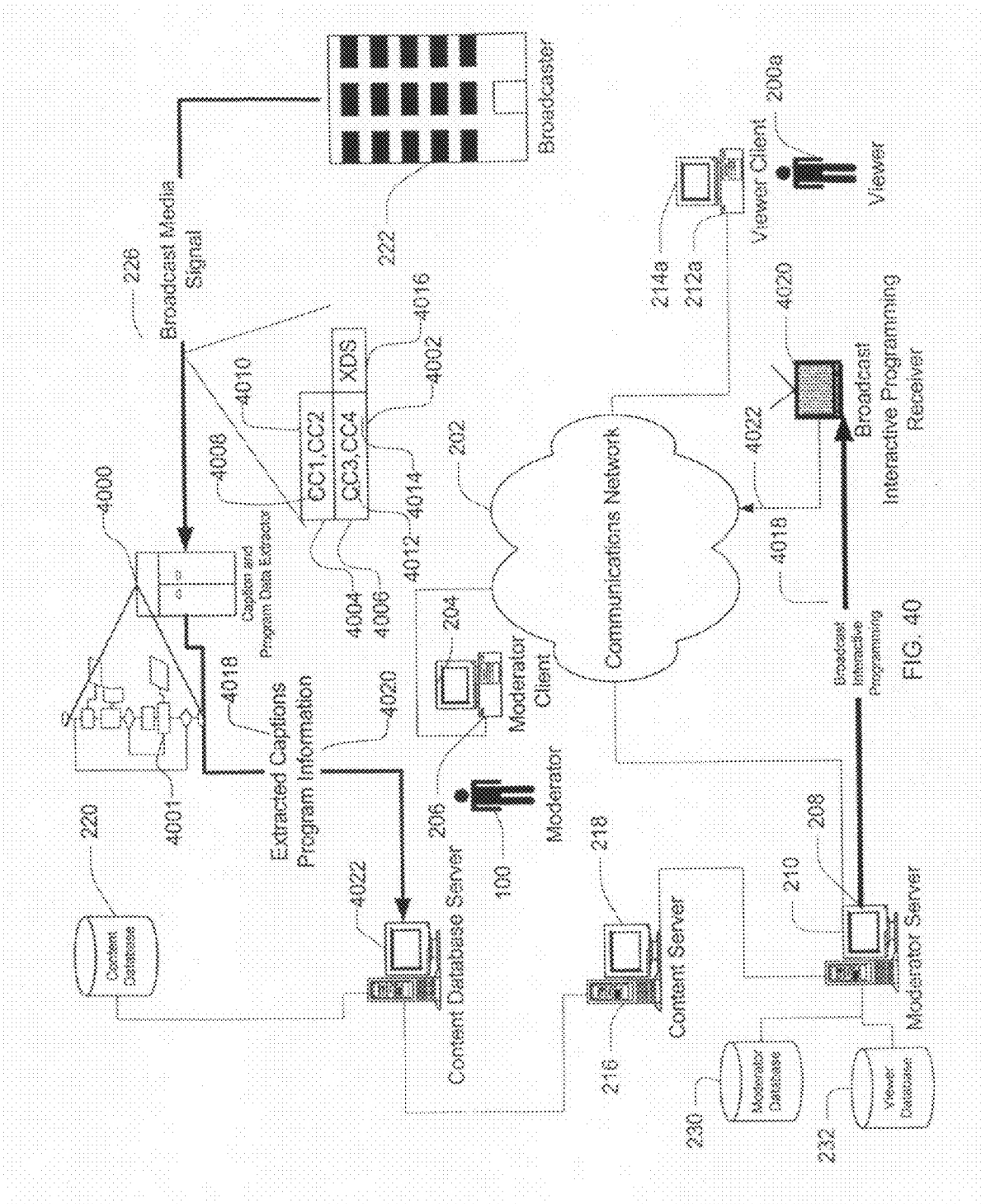
FIG. 40 is a block diagram of a system for extracting closed captioning from a broadcast signal in accordance with an exemplary embodiment of the present invention.

FIG. 40 is a deployment diagram of a system for extracting closed captioning from a broadcast signal in accordance with an exemplary embodiment of the present invention. A broadcaster 222 transmits a broadcast media signal 226 that is received by a caption and program information extractor 4000. The caption and program information extractor includes programming instructions 4001 that identify captioning and program information encoded in the broadcast media signal and extracts the captions and program information for storage in a database. The broadcast media signal includes captioning information 4002 encoded in the signal such as within line 21 of a vertical blanking interval (VBI) of a television signal. The captioning information is encoded in the broadcast media signal by a broadcaster in order to serve hearing-impaired viewers of the broadcast media signal. As such, the captioning information includes a transcription of the speech portion of a broadcast program. For example, a talkshow with captioning may include a transcript of the questions asked by a host of a guest and the responses of the guest to the host's questions.

The captioning information is included as several text streams in the broadcast media signal. In one embodiment of a broadcast media signal in accordance with an exemplary embodiment of the present invention, the captioning information includes a field 1 4004 and a field 2 4006. Field 1 includes a first captioning information 4008 and a second captioning information 4010 text stream. Field 2 includes a third captioning information 4012 and a fourth captioning information 4014 text string as well as extended Data Service (XDS) information 4016 encoded in a series of packets. The fields are described in table 1a and table 1b below.

TABLE 1a

Field 1 Packets

| Name* | Field | Data Channel | Description |
|---|---|---|---|
| CC1 | 1 | 1 | Primary Synchronous Caption Service |
| CC2 | 1 | 2 | Special Non-Synchronous Use Captions |
| T1 | 1 | 1 | First Text Service |
| T2 | 1 | 2 | Second Text Service |

TABLE 1b

Field 2 Packets

| Name* | Field | Data Channel | Description |
|---|---|---|---|
| CC3 | 2 | 1 | Secondary Synchronous Caption Service |
| CC4 | 2 | 2 | Special Non-Synchronous Use Captions |
| T3 | 2 | 1 | Third Text Service |
| T4 | 2 | 2 | Fourth Text Service |
| XDS | | | extended Data Services |

There are several different classes of XDS packets encapsulating information about a broadcast program. For example, defined XDS packet classes include Current Class (information about the current program such as the title, length, rating, elapsed time, audio services, caption services, and aspect ratio), Future Class (the same information for an upcoming program), Channel Information Class (information such as the network name, station call letters, native channel number and tape delay), Miscellaneous Class (containing the time of day and the local time zone) and Public Service Class (severe weather warnings). In addition, Reserved and Undefined Classes are set aside for future expansion and proprietary applications.

For each Class, there are two groups of similar packet types. Bit 6 is used as an indicator of these two groups. When bit 6 of the Type character is set to 0 the packet only describes information relating to the channel that carries the signal. This is known as an In-Band packet. When bit 6 of the Type character is set to 1, the packet only contains information for another channel. This is known as an Out-of-Band packet.

The Current Class includes a Program Identification Number (Scheduled Start Time) packet including four characters that define the program start time and date relative to Coordinated Universal Time (UTC). This is non-character-based data so bit #6 is always set to one. The format of the characters is identified in Table 2.

TABLE 2

| Character | B6 | b5 | b4 | b3 | B2 | B1 | b0 |
|---|---|---|---|---|---|---|---|
| Minute | 1 | m5 | m4 | m3 | m2 | m1 | m0 |
| Hour | 1 | D | h4 | h3 | h2 | h1 | h0 |

TABLE 2-continued

| Character | B6 | b5 | b4 | b3 | B2 | B1 | b0 |
|---|---|---|---|---|---|---|---|
| Date | 1 | L | d4 | d3 | d2 | d1 | d0 |
| Month | 1 | Z | T | m3 | m2 | m1 | m0 |

The minute field has a valid range of 0 to 59, the hour field from 0 to 23, the date field from 1 to 31, the month field from 1 to 12. The "T" bit is used to indicate a program that is routinely tape delayed (for mountain and pacific time zones). The D, L, and Z bits are ignored by the decoder when processing this packet. (The same format utilizes these bits for time setting.) The T bit is used to determine if an offset is necessary because of local station tape delays. A separate packet of the Channel Information Class indicates the amount of tape delay used for a given time zone. When all characters of this packet contain all Ones, it indicates the end of the current program. A change in received Current Class Program Identification Number is interpreted by XDS receivers as the start of a new current program.

A Length/Time-in-Show packet is composed of 2, 4 or 6 non-character-based informational characters. It is used to indicate the scheduled length of the program as well as the elapsed time for the program. The first two informational characters are used to indicate the program's length in hours and minutes. The second two informational characters show the current time elapsed by the program in hours and minutes. The final two informational characters extend the elapsed time count with seconds. The informational characters are encoded as indicated in Table 3.

TABLE 3

| Character | B6 | b5 | b4 | b3 | B2 | B1 | b0 |
|---|---|---|---|---|---|---|---|
| Length—(m) | 1 | m5 | m4 | m3 | m2 | m1 | m0 |
| Length—(h) | 1 | h5 | h4 | h3 | h2 | h1 | h0 |
| ET—(m) | 1 | m5 | m4 | m3 | m2 | m1 | m0 |
| ET—(h) | 1 | h5 | h4 | h3 | h2 | h1 | h0 |
| ET—(s) | 1 | s5 | s4 | s3 | s2 | s1 | s0 |
| Null | 0 | 0 | 0 | 0 | 0 | 0 | 0 |

The minute second fields have a valid range of 0 to 59, and the hour fields from 0 to 63. The sixth character is a standard null.

The Program Name packet contains a variable number, 2 to 32, of Informational characters that define the program title. Each character is in the range of 20 h to 7 Fh. The variable size of this packet allows for efficient transmission of titles of any length.

A complete definition of a XDS packets may be found in *Recommended Practice for Line 21 Data Service*, Electronics Industries Association, EIA-608 (drafts Oct. 12, 1992 and Jun. 17, 1993), the subject matter of which is hereby incorporated by reference as if fully stated herein. An exemplary device suitable for extraction of captions and XDS packets from a television signal is an ATI-TV ISA television tuner sold by ATI technologies Inc. of Markham, Ontario Canada. The device includes software for monitoring television signals and extracting captioning to create a program transcription.

The caption and program information extractor extracts the captioning information 4018 from the broadcast media signal along with program information 4020 from the concurrently transmitted XDS packets and stores the captioning information and program information in a content database 220 serviced by a content database server 4022. The content database server is coupled to the previously described content server 216.

A moderator server 210 receives captioning information from the content server and transmits the captions to a moderator client 204 over communications link 208 and communications link 206. A moderator 100 uses the moderator client to edit the captioning information and adds moderator commentary to the edited captioning information thus creating moderated programming content using the captioning information as source material. The moderator client transmits the edited captioning information and moderator commentary to the moderator server where the moderator server creates interactive programming for transmission to a plurality of viewer clients, as exemplified by viewer client 214*a*, via a communications network 202 such as the Internet and communications link 212*a*. A plurality of viewers, as exemplified by viewer 200*a*, view and interact with the interactive programming using a viewer client.

In one embodiment of a caption and program data extractor in accordance with an exemplary embodiment of the present invention, other components of the broadcast media signal are extracted and stored in the content database. For example, the caption and program data extractor may extract video frames from the broadcast media signal on either a regular or random interval and store the captured frames along with the captioning information and program information. As another example, the caption and program data extractor may extract portions of an audio component and store the portions in the content database. These additional components of the broadcast media signal are associated with the captioning and programming information in the content database so that the additional components may be recalled and used to augment the captioning information when generating interactive programming.

In one system for extracting closed captioning from a broadcast signal in accordance with an exemplary embodiment of the present invention, the extracted captions are compressed before they are stored. As the captions are textual information, many compression tools may be used. In one system, the compression tool used is the Lempel-Ziv-Oberhumer (LZO) compression tool authored by Markus Franz Xaver Johannes Oberhumer. Source code for the compression tool is available at http://www.oberhumer.com/opensource/lzo/. LZO is a lossless block compression technique with decompression requiring no memory resources. As the decompression step does not require any memory resources, decompression may be performed on hosts with limited memory such as set top boxes used with televisions as displays.

Figure 44:
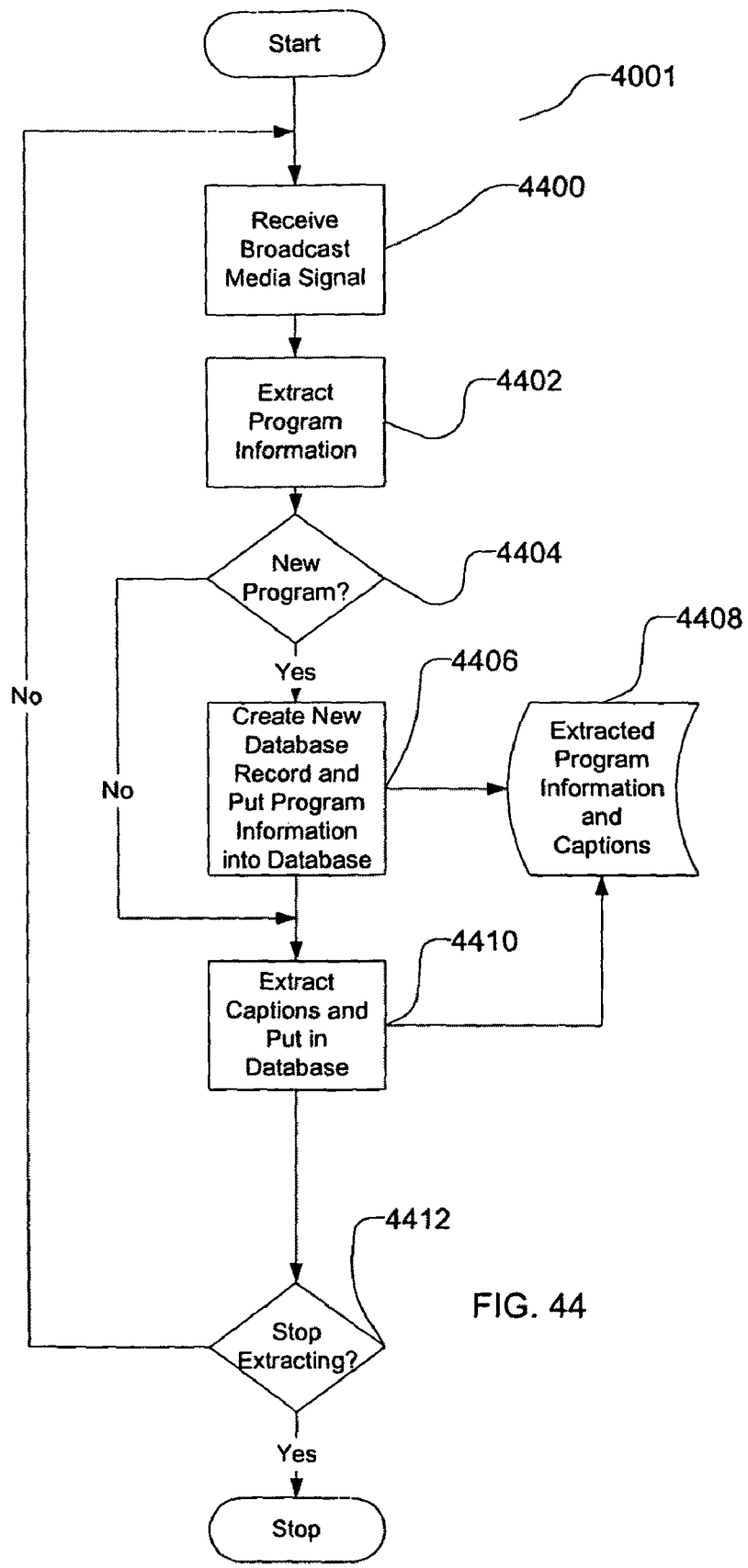
FIG. 44 is a process flow diagram of a program information and caption extraction process in accordance with an exemplary embodiment of the present invention.

FIG. 44 is a process flow diagram of a program information and caption extraction process in accordance with an exemplary embodiment of the present invention. A program information and caption extraction process 4001 is hosted by a previously described program information and caption extractor 4000 (of FIG. 40). The program information and caption extraction process receives (4400) a broadcast media signal having captions and program information as previously described. The program information and caption extraction process extracts (4402) the program information from the broadcast media signal and determines (4404) if the program information indicates that a new program is being broadcast. If so, the program information and caption extraction process creates (4406) a new database record (4408) for extracted captions using the program information and puts the program information into the new database record. The program information and caption extraction process then extracts (4410) the captions from the broadcast media signal and stores the captions in the new database record. The program information and caption extraction process determines (4412) it should stop extracting captions. If not, the program information and caption extraction process continues receiving (4400) the broadcast media signal looking for programs and new captions to archive.

Figure 41:
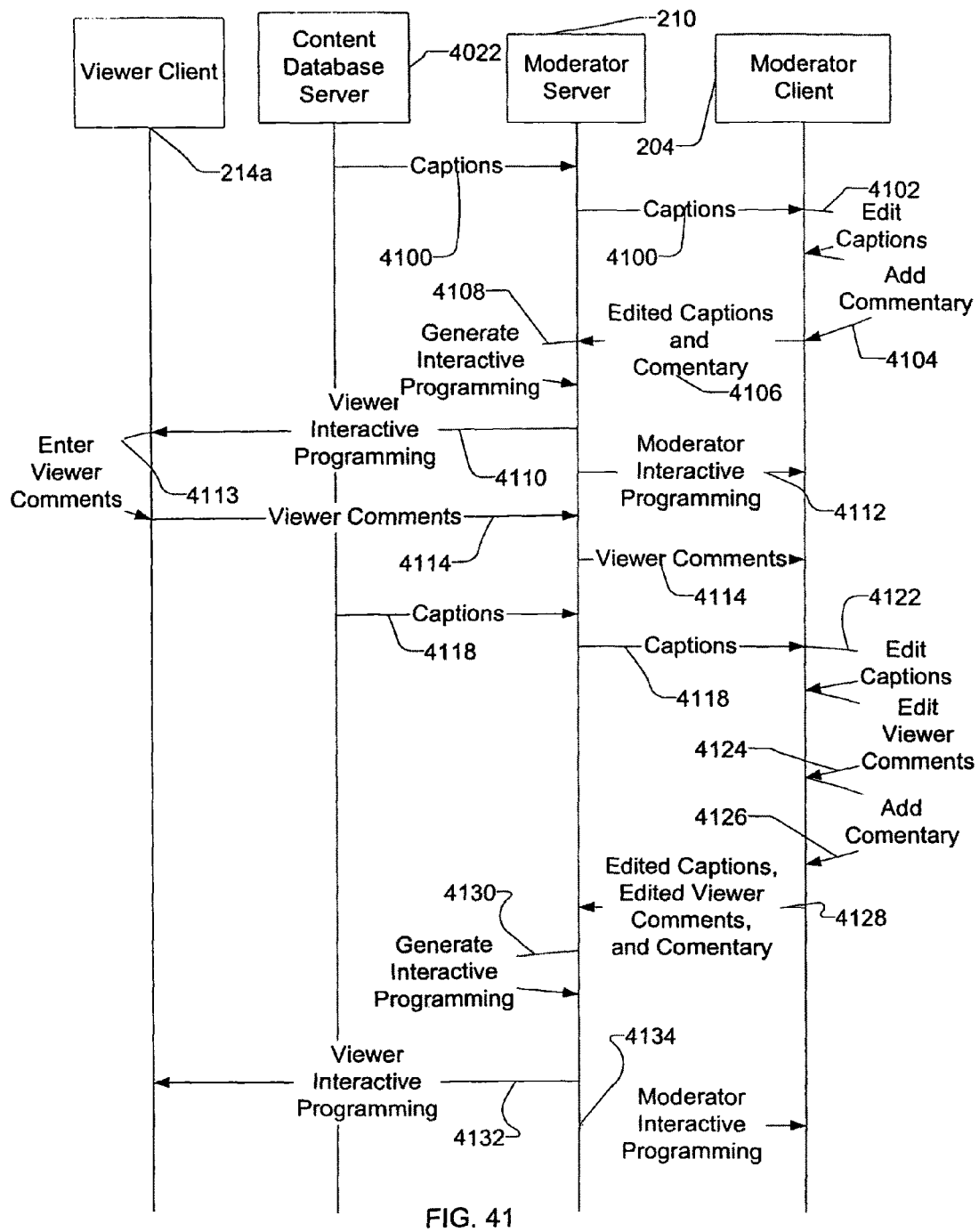
FIG. 41 is a sequence diagram of an interactive programming system in accordance with an exemplary embodiment of the present invention.

FIG. 41 is a sequence diagram of an interactive programming system in accordance with an exemplary embodiment of the present invention. A moderator uses a moderator client 204 to request and receive captions 4100 from a content database server 4022 via a moderator server 210. The moderator uses the moderator client to edit (4102) the captions and add (4104) commentary. The edited captions and commentary 4106 are transmitted to the moderator server where they are used generate (4108) interactive programming for both a viewer 4110 and the moderator 4112. A viewer interacts with the viewer interactive program by entering (4113) viewer comments 4114 using the viewer client. The viewer comments are transmitted by the viewer client the moderator server that retransmits the viewer comments to the moderator client. The moderator client requests and receives additional captions 4118 from the content database server via the moderator server. The moderator then edits (4122) the captions, edits (4124) the viewer comments, and adds (4126) commentary to create new edited captions, viewer comments, and commentary 4128 that are transmitted to the moderator server. The moderator server uses the edited captions, viewer comments, and commentary to generate (4130) new viewer interactive programming 4132 and moderator interactive programming 4134 for transmission to the viewer client and the moderator client respectively. The process of combining viewer comments, new captions, and moderator commentary to generate interactive programming is continuously repeated to generate a continuous stream of interactive programming.

In one interactive programming system in accordance with an exemplary embodiment of the present invention, the captioning information is compressed as previously described. In addition, the interactive programming for both commentator and the viewer is compressed before transmission.

Referring again to FIG. 40, in one interactive programming system in accordance with an exemplary embodiment of the present invention, broadcast interactive programming 4018 is encoded for broadcast transmission in the VBI of a television signal. Textual components of an interactive program are generated as previously described and placed into a television VBI signal as captioning information. The television signal may include a video signal for a television program that the commentator and the viewers want to discuss. The television signal including the interactive programming is transmitted to the viewers and the viewers' television, as exemplified by broadcast interactive programming receiver 4020, decodes and displays the textual components of the interactive programming. Viewers interact with the interactive programming using a back channel 4022, such as through a communications network 202, or a previously described telephony link.

Links to other resources are encoded in the television signal in the form of Uniform Resource Locators (URLs) which are string representations of locations for use in identifying abstract or physical resources on the Internet. URLs can be transmitted in the T-2 service encoded in line 21 of the VBI, and may be used by receiving devices to permit the linking of television programs with related content on the Internet so that the content from these Internet services may be combined, mixed or shared by the receiving device.

URLs are transmitted in T-2 by using the following general format:

<url>[attr1:val1][attr2:val2] . . . [attrn:valn][checksum]

The URL is enclosed in angle brackets, followed by zero or more pairs of attributes and values in square brackets, which are then followed by a checksum in square brackets. Four attributes are defined in this standard: "type", "name", "expires", and "script". The "type" attribute indicates what sort of content the URL is associated with (for example, content related to the current television program or with the broadcast network). The type can be any one of the values in table 4:

TABLE 4

| Value | URL is associated with |
| --- | --- |
| PROGRAM | the current program |
| NETWORK | the broadcast network |
| STATION | the local station |
| SPONSOR | a commercial sponsor or advertiser for the current program |
| OPERATOR | the service (e.g., cable or satellite) operator |

The "name" attribute indicates a human-readable title for the resource and can be any string of characters between 20 h and 7 Eh except square brackets (5 Bh and 5 Dh) and angle brackets (3 Ch and 3 Eh). The "expires" attribute enables an author to specify the last date the URL is valid, after which the URL should be ignored by the receiving device. The "script" attribute enables the triggering of specific actions within the content referenced by the URL. The value specifies a script fragment that is to be sent to the page and executed; the scripting language is compatible with ECMA-262 (for example, "JavaScript™" or "JScript™"). The script is executed when the content referenced by the URL is displayed on the receiving device. If that content is currently being displayed, the script fragment is immediately executed. The context for the script is the root document corresponding to the URL specified.

Figure 42:
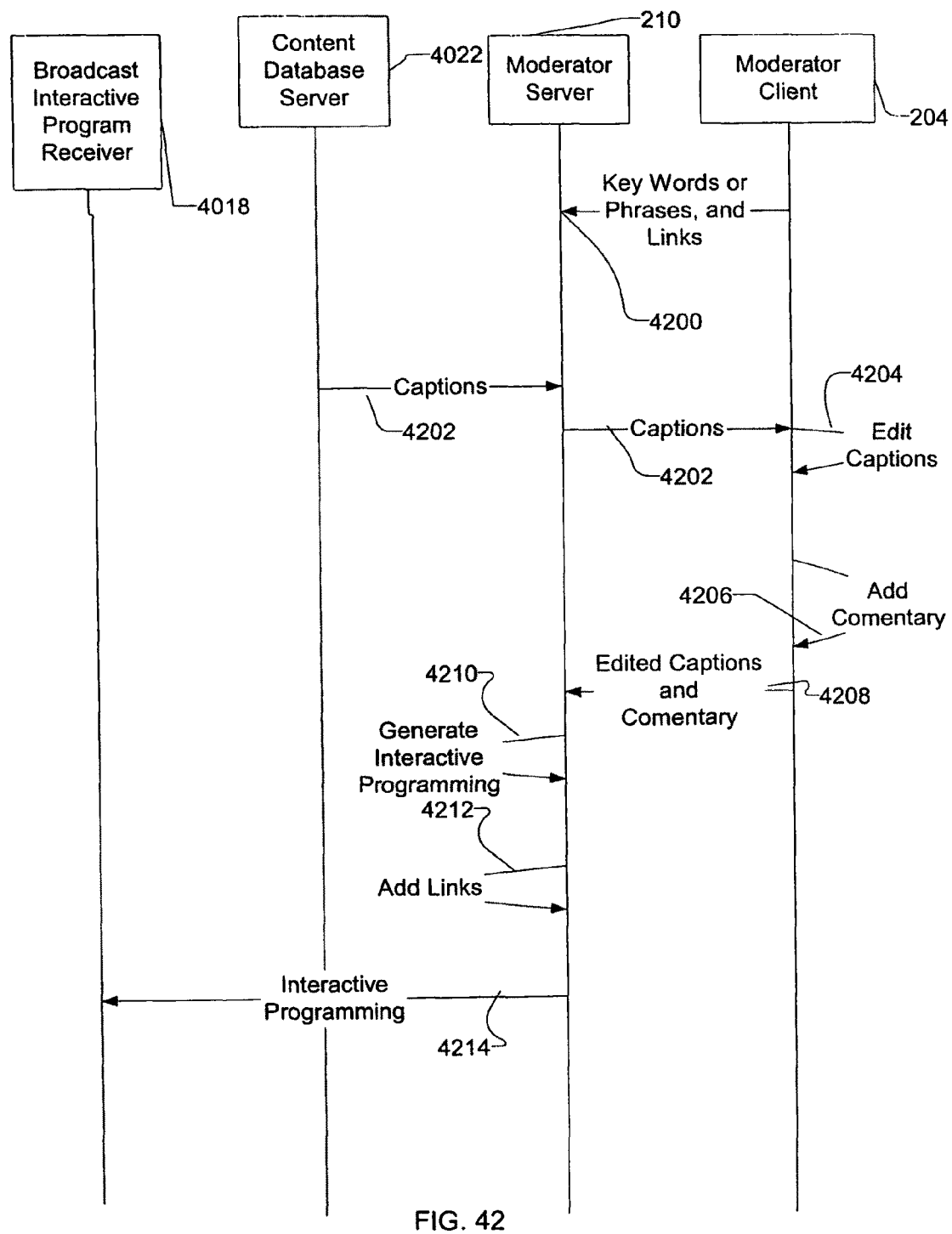
FIG. 42 is a sequence diagram of a key word or phrase to link conversion system in accordance with an exemplary embodiment of the present invention.

FIG. 42 is a sequence diagram of an interactive programming generation process wherein the interactive programming includes links to other resources in accordance with an exemplary embodiment of the present invention. Links may be added to an interactive program for use by a viewer for a variety of purposes. A link may provide access to a tCommerce site where viewers use their televisions and set-top boxes to browse products for sale. Another use of a link is to provide additional information for a viewer while watching an interactive program. For example, if the interactive program has a talkshow format, the links may be used to direct a viewer to a Web site where additional information about a talkshow topic is located. As another example, a link may provide access to other related interactive programming. A moderator uses a moderator client 204 to transmit key words or phrases associated to links 4200 to the moderator server. The key words or phrases will be used to search the captions by the moderator server. When a key word or phrase is found, the moderator server generates a link for inclusion in a VBI. The moderator server receives captions 4202 from a content database server 4022 and retransmits the captions to the moderator client. The moderator edits (4204) the captions and adds (4206) commentary to the captions. The edited captions and commentary 4208 are transmitted by the moderator client to the moderator server. The moderator server generates 4210 an interactive program from the edited captions and moderator commentary. The moderator server then adds 4212 links to the interactive programming 4214 using the key words or phrases and associated links before the interactive programming is transmitted to a viewer's broadcast interactive program receiver 4020.

Figure 43:
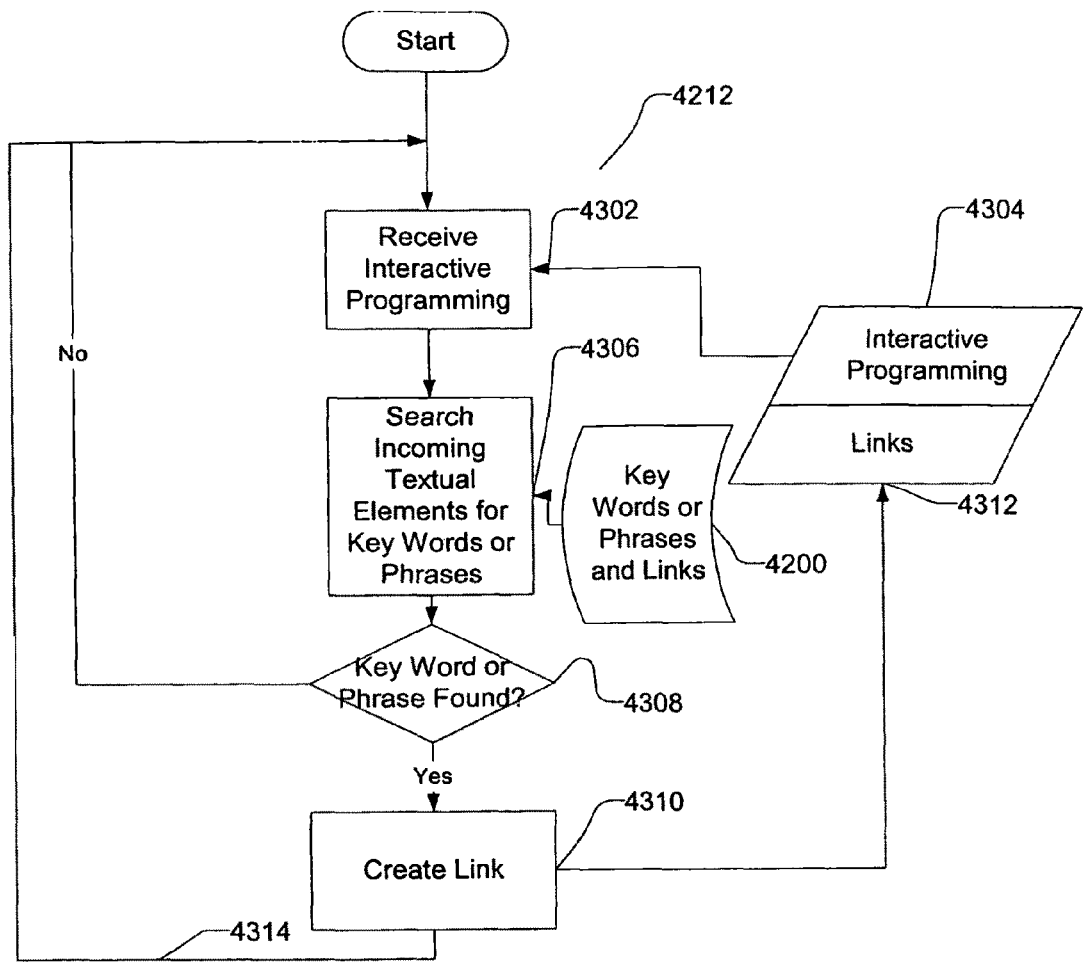
FIG. 43 is a process flow diagram of a key word or phrase to link conversion process in accordance with an exemplary embodiment of the present invention.

FIG. 43 is a process flow diagram of a dynamic link creation process in accordance with an exemplary embodiment of the present invention. Links are added to an interactive program dynamically without direct intervention or editing by the moderator. The moderator supplies key words or phrases that are associated with links as the contextual framework associating textual information in the interactive program with other resources. A dynamic link creation process 4212 receives (4302) input interactive programming 4304 including textual components. The dynamic link creation process searches (4306) the textual components of the interactive programming for key words or phrases 4200 supplied by a commentator. If a key word or phrase is found (4308), the dynamic link creation process creates (4310) a link and adds the link (4312) to the interactive programming for transmission to a viewer. The dynamic link creation process continues processing (4314) new interactive programming as the interactive programming is created.

Figure 27:
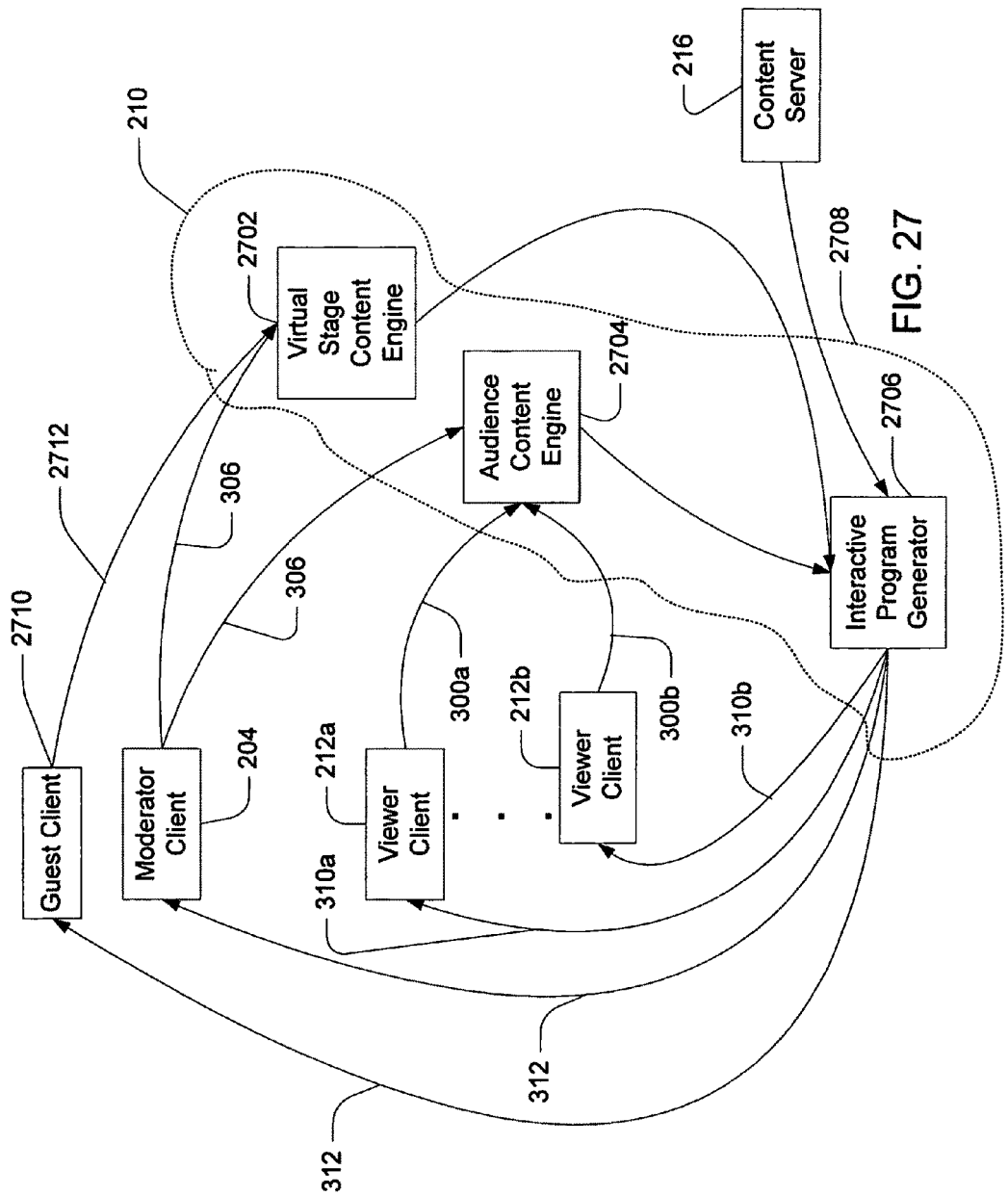
FIG. 27 is a collaboration diagram depicting an interactive programming generation process in accordance with an exemplary embodiment of the present invention.

FIG. 27 is a collaboration diagram depicting an interactive programming generation process in accordance with an exemplary embodiment of the present invention. A moderator server 210 includes a virtual stage content engine 2702 and an audience content engine 2704. These content engines generate content, such as the content for a chat room, and transmit the content to an interactive program generator 2706 included in the moderator server. The virtual stage content engine receives previously described moderator comments and edited participant comments 306 from the previously described moderator client. The virtual stage content engine uses the moderator's comments and edited participant comments to generate moderator content for a to-be-described stage section or area in an interactive program. The audience content engine receives previously described participant comments, 300a and 300b, from the previously described viewer clients, 212a and 212b, edited participant comments and moderator comments 306 from the moderator client, and uses the participant comments, edited participant comments, and moderator comments to generate audience content for a to-be-described audience section or area in an interactive program.

The interactive program generator receives the moderator content and the audience content and uses the content to generate enhanced interactive programming. The interactive programming includes viewer interactive programming 310a and 310b that is transmitted to the viewer clients for display and use of the viewers. The interactive programming further includes moderator interactive programming 312 transmitted to the moderator for viewing and use by the moderator. The cycle of receiving participant, moderator and edited participant comments and using the comments to generate interactive programming for transmission to the moderator and viewer is repeated indefinitely to create a continuous interactive program.

In an interactive program creation system in accordance with an exemplary embodiment of the present invention, content 2708 from a previously described content server 216 is received by the interactive program generator and the content is included in the generated interactive programming. In an interactive program creation system in accordance with another exemplary embodiment of the present invention, a virtual guest client 2710 transmits virtual guest comments 2712 to the virtual stage content engine for inclusion in the virtual stage content generated by the virtual content engine.

In an interactive program creation system in accordance with another exemplary embodiment of the present invention, the moderator, participant, and guest interactive messages are chat messages and the virtual stage and audience content engines are chat engines. The text-based output from the chat engines is used by the interactive program generator generate interactive programming including electronic documents, such as transcripts, composed in a document markup language such as HTML or XML.

Figure 30:
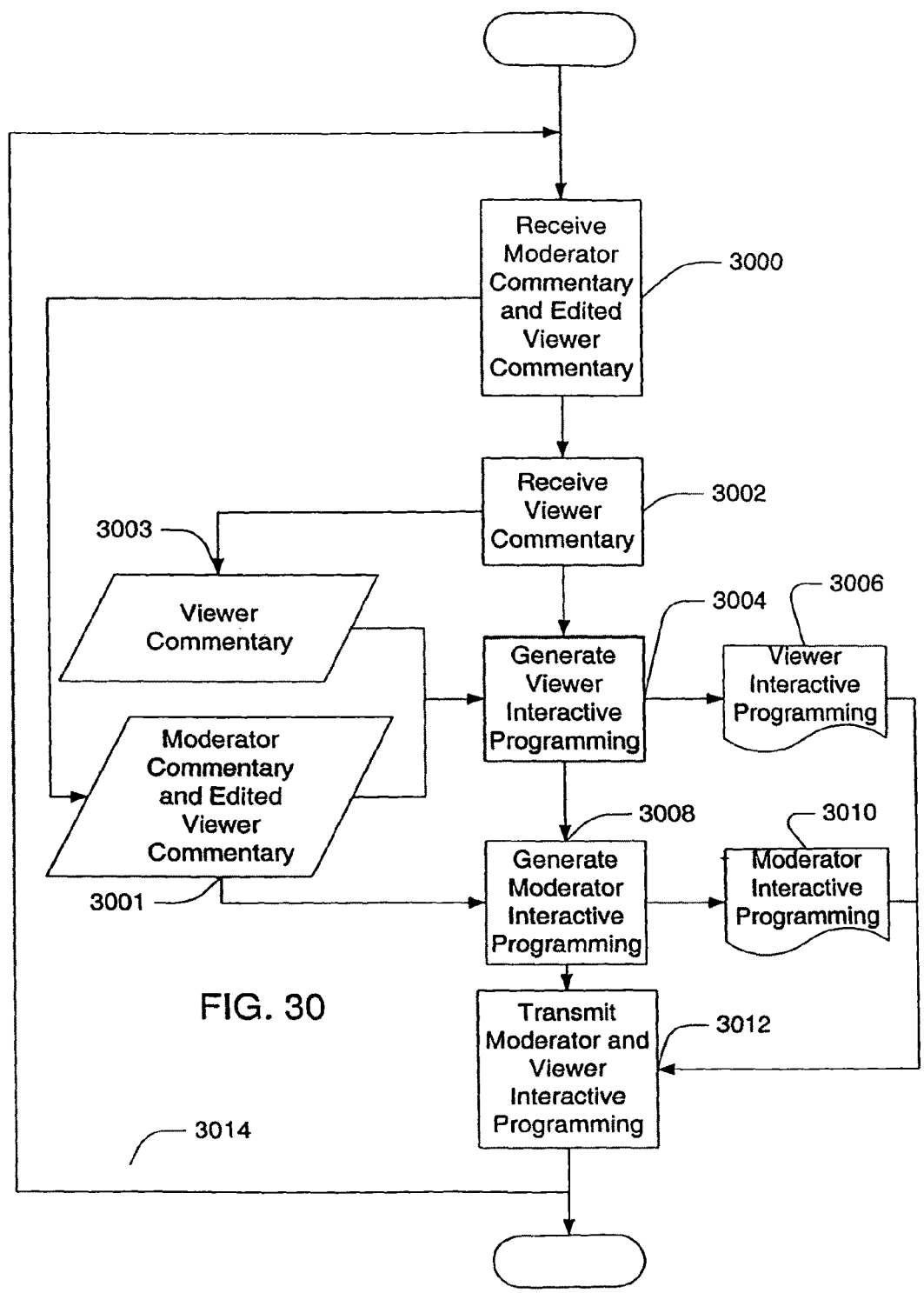
FIG. 30 is a process flow diagram of an interactive program generation process in accordance with an exemplary embodiment of the present invention.

FIG. 30 is a process flow diagram of an interactive program generation process in accordance with an exemplary embodiment of the present invention. A moderator server receives (3000) moderator commentary and edited participant commentary 3001 from a moderator. The moderator server receives (3002) participant commentary 3003 from viewers in an audience. The moderator server uses the participant commentary, the moderator commentary, and the edited participant commentary to generate (3004) viewer interactive programming 3006 for transmission to viewers in the audience. The moderator server uses the moderator commentary and the edited participant commentary to generate (3008) moderator interactive programming 3010 for transmission to the moderator. The moderator then transmits (3012) the moderator interactive programming to the moderator and the viewer interactive programming to the viewers in an audience. The process is repeated (3014) continuously to generate an interactive program.

Figure 4:
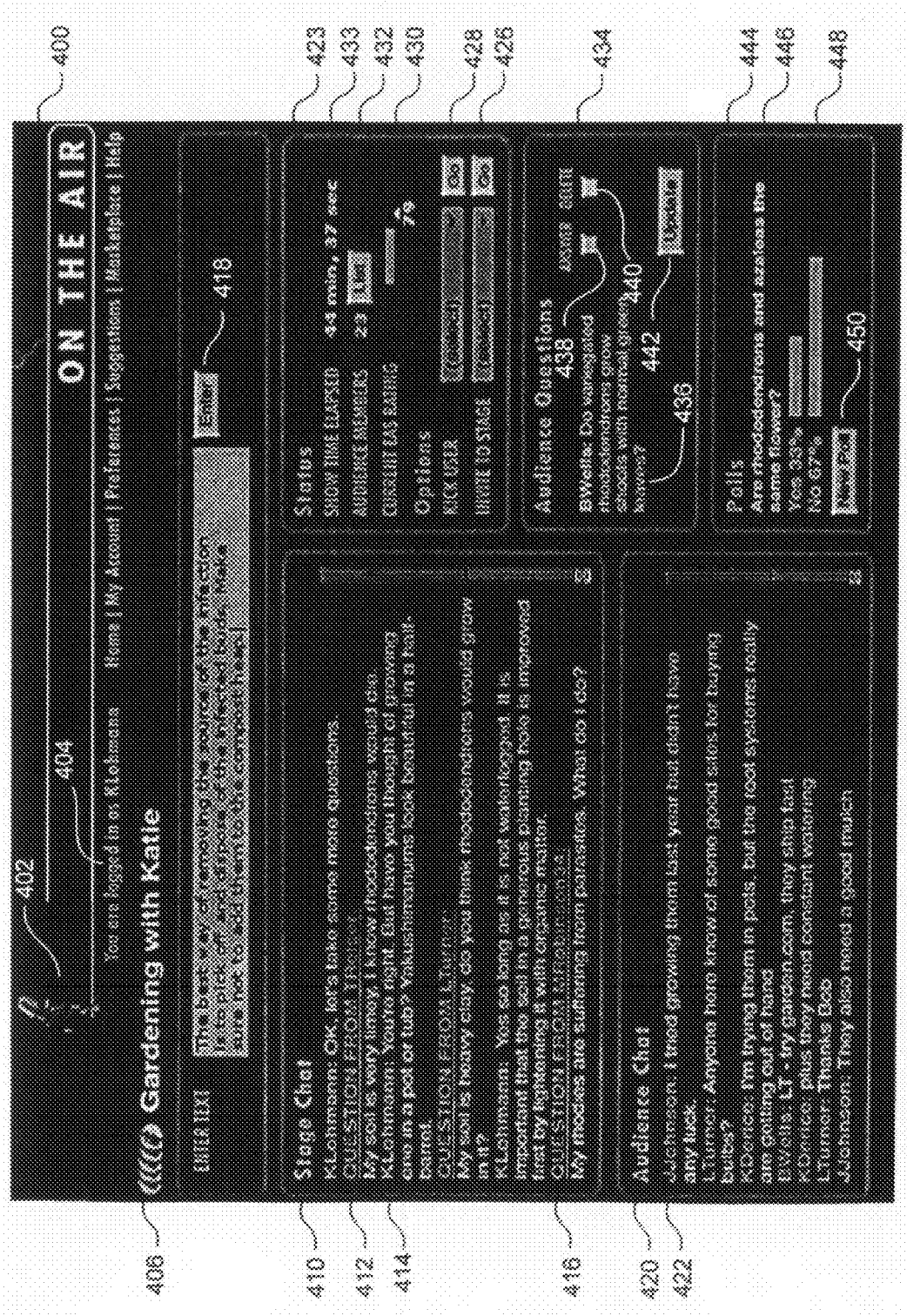
FIG. 4 is a screen capture of a moderator's interface used to control generation of an interactive program in accordance with an exemplary embodiment of the present invention.

FIG. 4 is a screen capture of a moderator interface used to control generation of an interactive program in accordance with an exemplary embodiment of the present invention. A moderator's interface 400 includes a trademark field 402 for display of a moderator server operator's trademark, in this screen capture, talkshow.com$^{SM}$ is a service mark of Lakeview Capital Trust, a Pennsylvania Trust. The moderator interface has a moderator identification field 404 for the display of the moderator's identification and an interactive program identifier field 406 for identification of the interactive program being produced by the moderator.

In one embodiment of a moderator server in accordance with the present invention, the moderator server is operated in an application service provider (ASP) mode. In this mode, the moderator server is used to create a "private label" interactive program creation system. In this mode, the moderator server provides services that an operator can embed into another system such that a viewer perceives the interactive program creation system as owned by individual operators. In some instances an indicia of source, such as a "powered by" notice, is included in the interactive program creation system.

The moderator's interface is broken up into several operational sections. A "stage interaction" section 410 displays the moderator's direct interaction with a virtual guest on a virtual stage. The stage interaction section includes a plurality of fields for display of virtual guests' previous questions as exemplified by previous question field 412. For each answered virtual guest question, a moderator response field, as exemplified by moderator response field 414, displays the moderator's response to the virtual guest's previous question. The stage interaction section further includes a current question field 416 for display of a virtual guest's current question. A moderator uses a moderator text entry section 418 to enter responses to the current virtual guest question.

An audience interaction section 420 displays audience comments. The audience interaction comments are comments made by participants to other participants in the audience.

A moderator uses a status section 423 to monitor the progress of the interactive program. The moderator invites audience members to the virtual stage to be virtual guests using an "invite to stage" selector 426. The moderator can select a viewer to invite onto the virtual stage by using a pull down menu of viewer names and selecting a viewer to invite. Once a viewer is invited to the virtual stage, the viewer's interactive messages are displayed in the stage interaction section and not in the audience interaction section. The moderator can also exclude a participant by selecting a participant from a "kick user out" pull down menu 428. Once excluded, the moderator server removes the excluded participant's comment signals from the plurality of participant comment signals edited by the moderator and used by the moderator server to generate the interactive program. In this way, the moderator exercises direct control over the participants participating in the interactive program.

In another interactive program creation system, the participant's exchange video clips and files directly with each other in a peer-to-peer relationship. In this mode, the moderator server is not directly involved in the message exchanges occurring between audience members interacting with each other.

The status section further includes an audience approval system indicator 430 for indicating to the moderator how the audience feels about the progress of the show. Viewer responses are aggregated in a to-be-described process and displayed to the moderator as a colored indicator and as a numerical value. A moderator uses the audience member counter field 432 and pull down menu to determine the number and identification of the viewers receiving the transmitted interactive program. The status section further includes an elapsed time field 433 for display of the elapsed time of the interactive program.

An audience question section 434 displays an audience question 436 that the moderator may answer by selecting an answer question button 438 or delete by selecting a delete question button 440. The moderator can get a new audience question by selecting the update button 442.

A polls section 444 includes a poll question display field 446 for display of a current poll question and a poll results display field 448 for display of viewers' responses to the poll. The moderator selects a new poll button 450 to enter a new poll question whenever the moderator feels that a new poll should be created.

Figure 34:
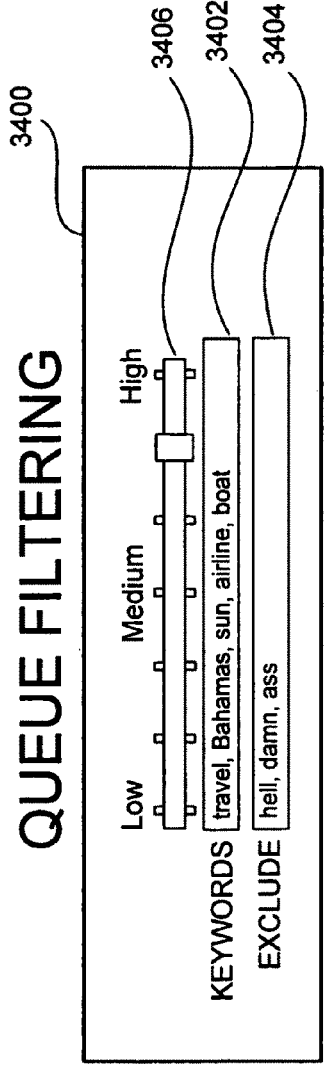
FIG. 34 is a participant question filtering moderator interface in accordance with an exemplary embodiment of the present invention.

FIG. 34 is a participant question filtering moderator interface in accordance with an exemplary embodiment of the present invention. A participant question filtering interface 3400 includes a keyword entry field 3402 for entry of keywords that the moderator would like to have included by viewers in questions sent to the moderator. Questions with the entered keywords will be given higher relevance, and thus priority, than questions without the keywords. The participant question filtering interface further includes an "exclude" entry field 3404 for words which the moderator does not want to see in questions, such as expletives or vulgarities. Any participant question having an excluded word will be deleted from a participant question queue managed by the moderator. The participant question filtering interface further includes a facility for setting a relevance threshold 3406. A moderator uses the relevance threshold setting facility to establish a threshold relevance value that a question should have before the question will be added to the question queue.

Figure 35:
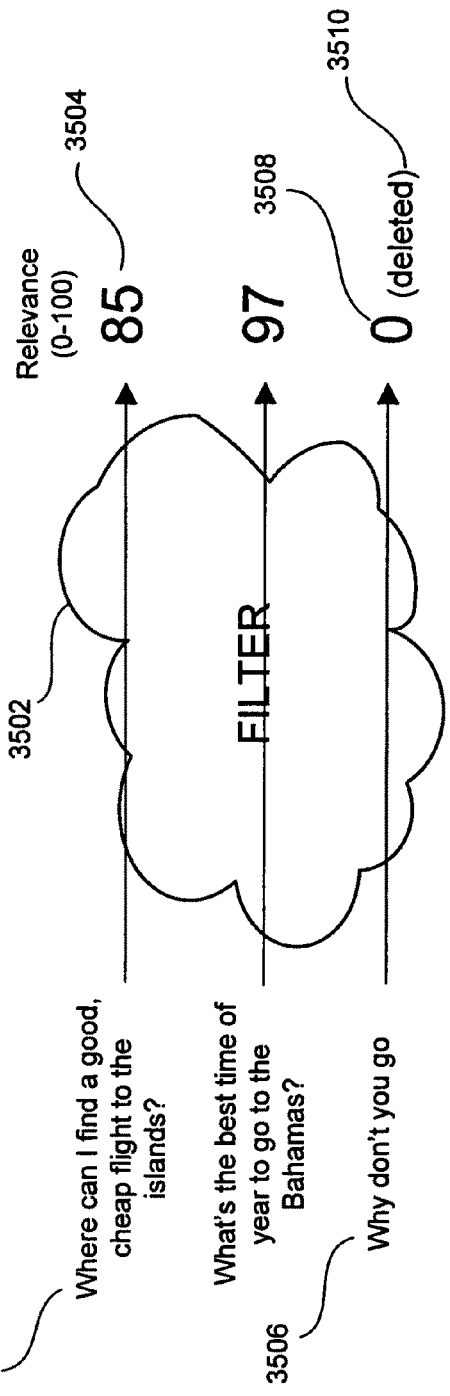
FIG. 35 is an illustration of the operation of a participant question filtering facility in accordance with an exemplary embodiment of the present invention.

FIG. 35 is an illustration of the operation of a participant question filtering facility in accordance with an exemplary embodiment of the present invention. A participant question 3500 is processed in a participant question filter 3502 and assigned a relevance value 3504. A moderator uses the relevance value to determine which participant questions the moderator would like to answer. If a participant question 3506 has an excluded word, then the relevance of the participant question is assigned a value 3508 of 0 and deleted 3510 from a participant question queue. In one embodiment of a participant question filter in accordance with the present invention, the participant question is deleted if the participant question's relevance value does not exceed the threshold relevance value set by the moderator. A moderator uses the participant question filtering facility in order to process large numbers of participant questions without becoming overwhelmed and to filter out offensive participant questions. This allows the moderator to automatically moderate an interactive program having a large number of participants, thus facilitating scalability from few participants to many participants.

Figure 36:
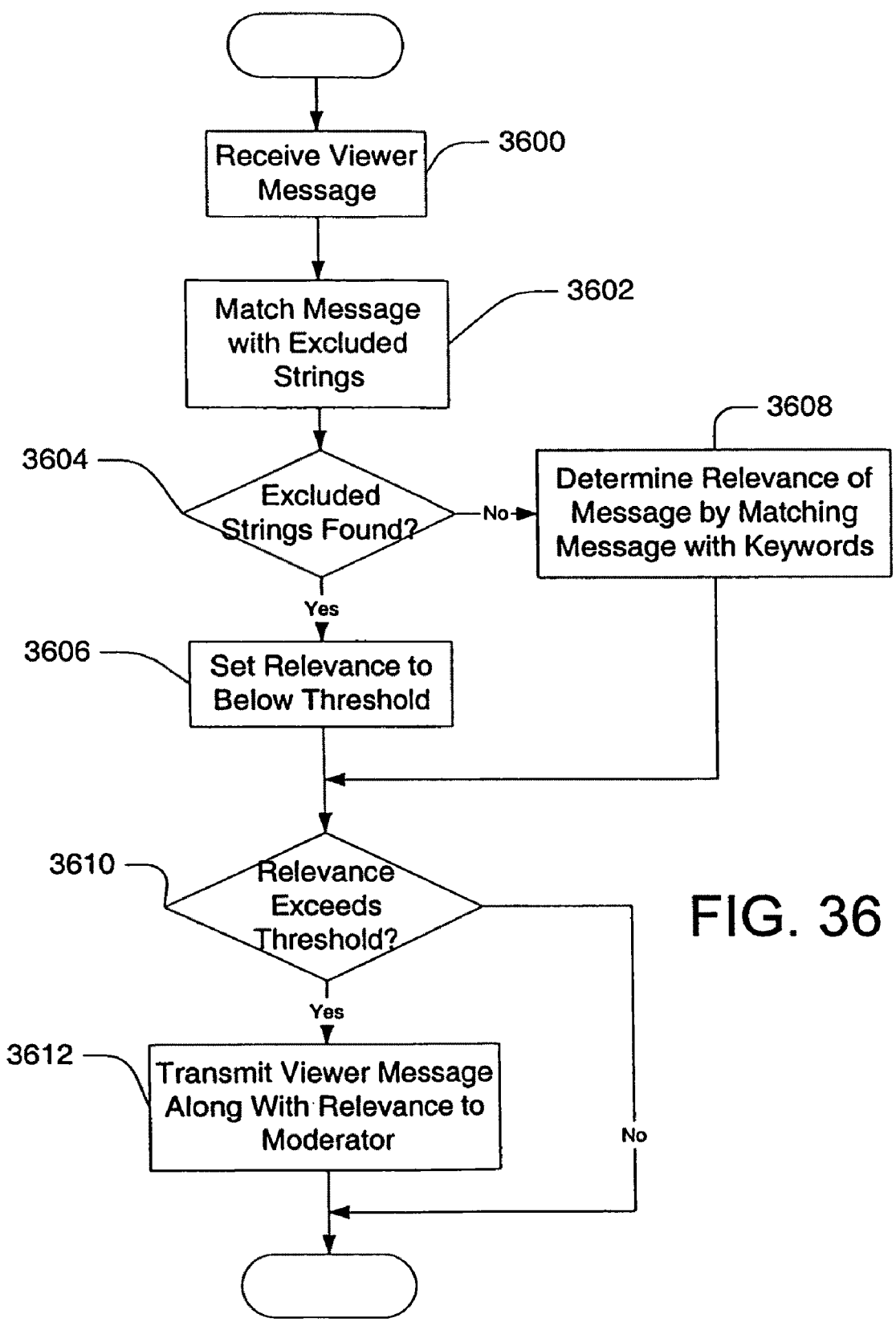
FIG. 36 is a process flow diagram of a participant question filter process in accordance with an embodiment of the present invention.

FIG. 36 is a process flow diagram of a participant question filter process in accordance with an embodiment of the present invention. The filter process receives (3600) a participant question 3601. The filter process attempts to match (3602) words in the participant question with the moderator's excluded words 3603. If it is determined (3604) that an excluded word is in the question, the relevance of the participant question is set (3606) to a value below the moderator's previously described threshold relevance value 3607.

If no excluded words are found in the participant question, the filter process determines (3608) the relevance of the participant question by matching the moderator's keywords 3609 to the words in the participant question. If it is determined (3610) that the relevance of the participant question exceeds the threshold relevance value, then the participant question is added (3612) to a participant question queue 3614.

In an embodiment of a filtering process in accordance with the present invention, keywords and excluded words are matched to the participant question using approximate string matching techniques in order to determine the relevance value of a participant question including misspelled keywords or excluded words.

Figure 5:
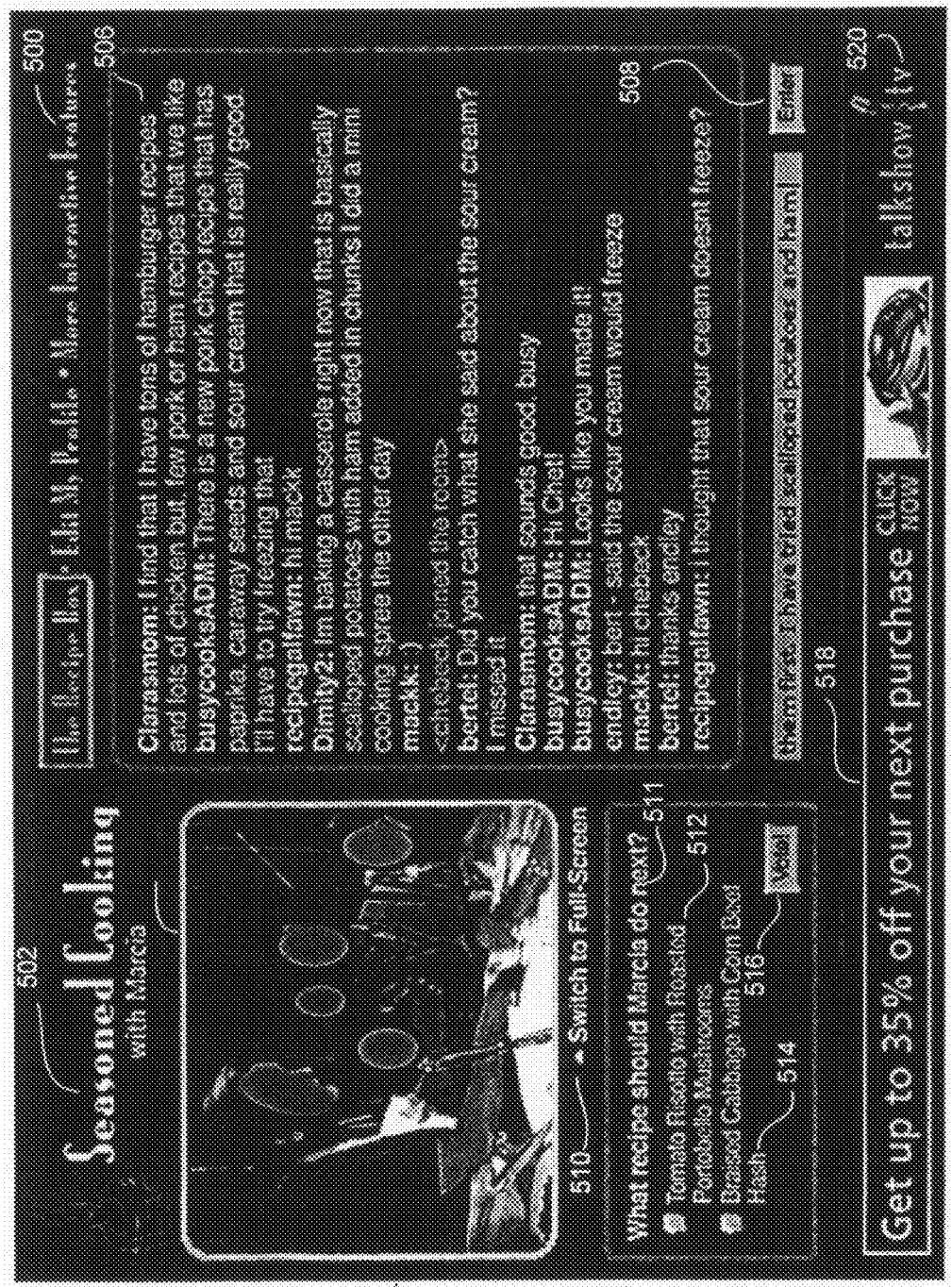
FIG. 5 is a screen capture of a viewer's interface used to view and interact with an interactive program in accordance with an exemplary embodiment of the present invention.

FIG. 5 is a screen capture of a viewer interface used to view and interact with an interactive program in accordance with an exemplary embodiment of the present invention. The viewer interface 500 includes an interactive program identifier field 502 for display of the name of the interactive program being viewed by the viewer. A content display section 504 is included for display of a content portion of the interactive program. The content of an interactive program may be text-based, audio-based, or video-based in any combination dependent on the capabilities and desires of the moderator. An audience interactive message section 506 is included for display of audience interactive messages that the audience is exchanging amongst themselves. An interactive message entry field 508 is used by the viewer to enter interactive messages for display in the audience interactive message section and to interact with the moderator when the moderator invites the viewer onto the virtual stage.

A poll section 510 displays a poll question 511 asked by the moderator of the viewers. The poll section includes a plurality of response buttons, exemplified by response buttons 512 and 514, selectable by the viewer to indicate the viewer's response to the poll. The viewer selects an answer to the poll question by selecting one of the response buttons and then selects the "Vote!" button 516 to register the viewer's poll answer with the moderator server. The viewer interface further includes sections for banner advertising 518 and for placement of a trademark or service mark 520 to identify the operator of the moderator server. By allowing banner adds, the moderator server allows a moderator to collect revenue from t-commerce interactions with the moderator's hosted interactive program.

In another embodiment of an interactive program creation system in accordance with the present invention, a poll is created using a plurality of participant questions for selection by participants. The participant question from the plurality of participant questions receiving the most participant selections is selected for submission to the moderator.

Figure 6:
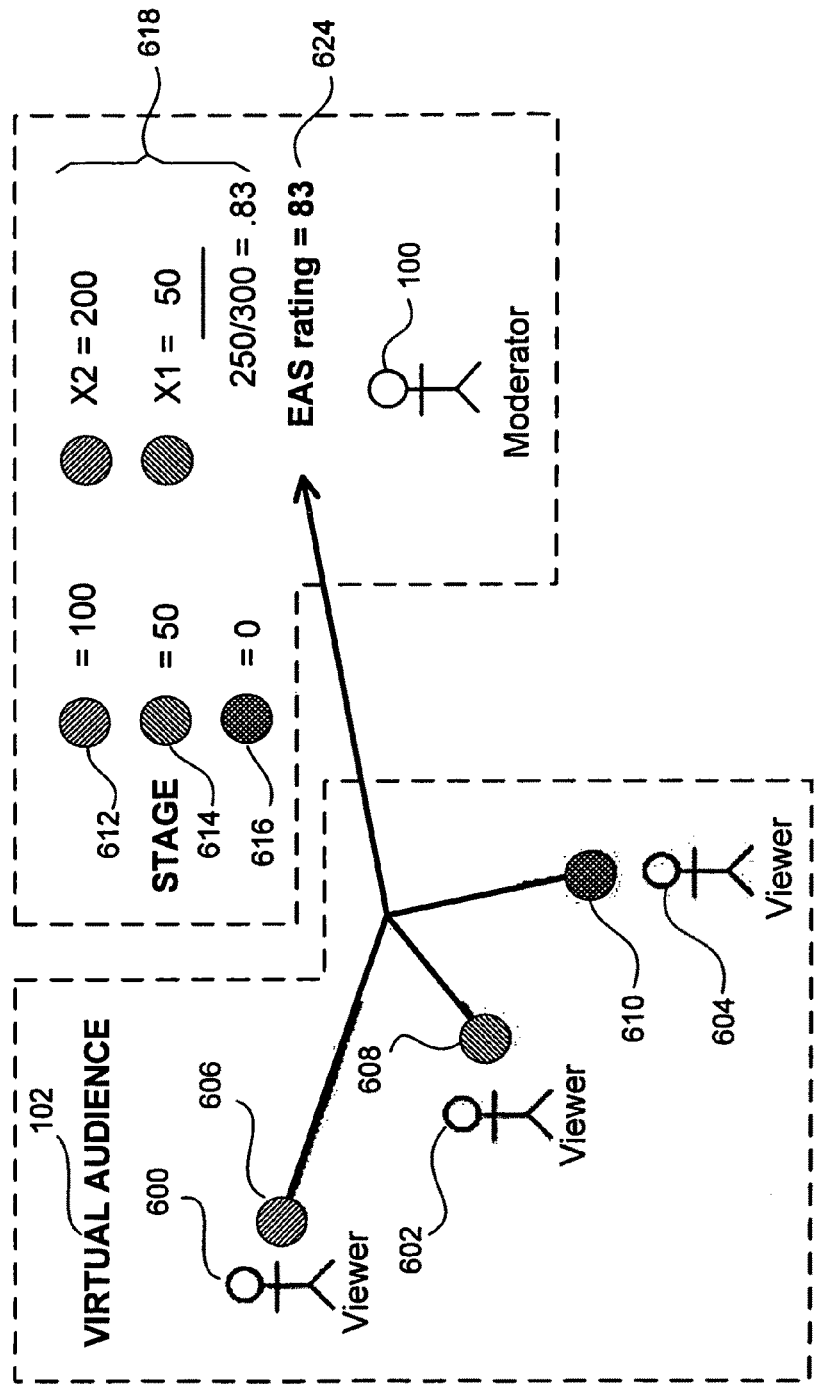
FIG. 6 is a diagram depicting a process for receiving viewer reactions to an interactive program and calculating an audience approval system rating for the interactive program in accordance with an exemplary embodiment of the present invention.

Referring again to FIG. 4, a current audience approval system rating field 430 is provided for the display of viewers' rating of an interactive program. Referring now to FIG. 6, a diagram depicting a process for receiving viewer reactions to the interactive program and calculating an audience approval system rating for an interactive program in accordance with an exemplary embodiment of the present invention is shown. A moderator 100 generates an interactive program and transmits the interactive program to an audience 102 as previously described. The audience includes a plurality of viewers, as exemplified by viewers 600, 602 and 603. Each viewer may have a different opinion of the quality of the interactive program; therefore, each viewer is provided with an individual audience approval system button as exemplified by audience approval system buttons 606, 608, and 610. Each viewer selects an audience approval system rating button corresponding to the viewer's subjective rating of the interactive program. The selection of an audience approval system button transmits a corresponding audience approval system signal to the moderator server (not shown) thus creating a plurality of audience approval system signals for evaluation by the moderator server. The moderator server receives the plurality of audience approval system signals and uses them to generate a single audience approval system rating signal and transmits the audience approval system rating signal for display on the moderator's interface (not shown).

In an audience approval system in accordance with an exemplary embodiment of the present invention, an audience approval system signal can take on three states, 612, 614, and 616, with each state representing a viewer's subjective opinion of the interactive program. In this embodiment, the three states are mapped to the corresponding numeric values of "100", "50", and "0", with "100" representing a viewer's complete satisfaction with the interactive program, "50" representing the viewer's partial satisfaction with the interactive program, and "0" representing the viewer's complete dissatisfaction with the interactive program. Each of the plurality of audience approval system signals are mapped to one of these numeric values. These numeric values are used to generate an arithmetic mean representing the audience approval system rating of the interactive program. In the illustrated example of FIG. 6, viewer 600 rates the interactive program at "100", viewer 602 rates the interactive program at "50", and viewer 604 rates the interactive program at "100". These values are used by the moderator server to generate (618) an arithmetic mean 624 of the plurality of mapped viewers' audience approval system signals. The arithmetic mean is presented to the moderator as the audience approval system rating of the moderator's interactive program. In one audience approval system in accordance with an exemplary embodiment of the present invention, the audience approval system rating is mapped to a color, with the numeric value of "100" being represented in green, the numeric value of "50" being represented in yellow, and the numeric value of "0" being represented in red.

Figure 7:
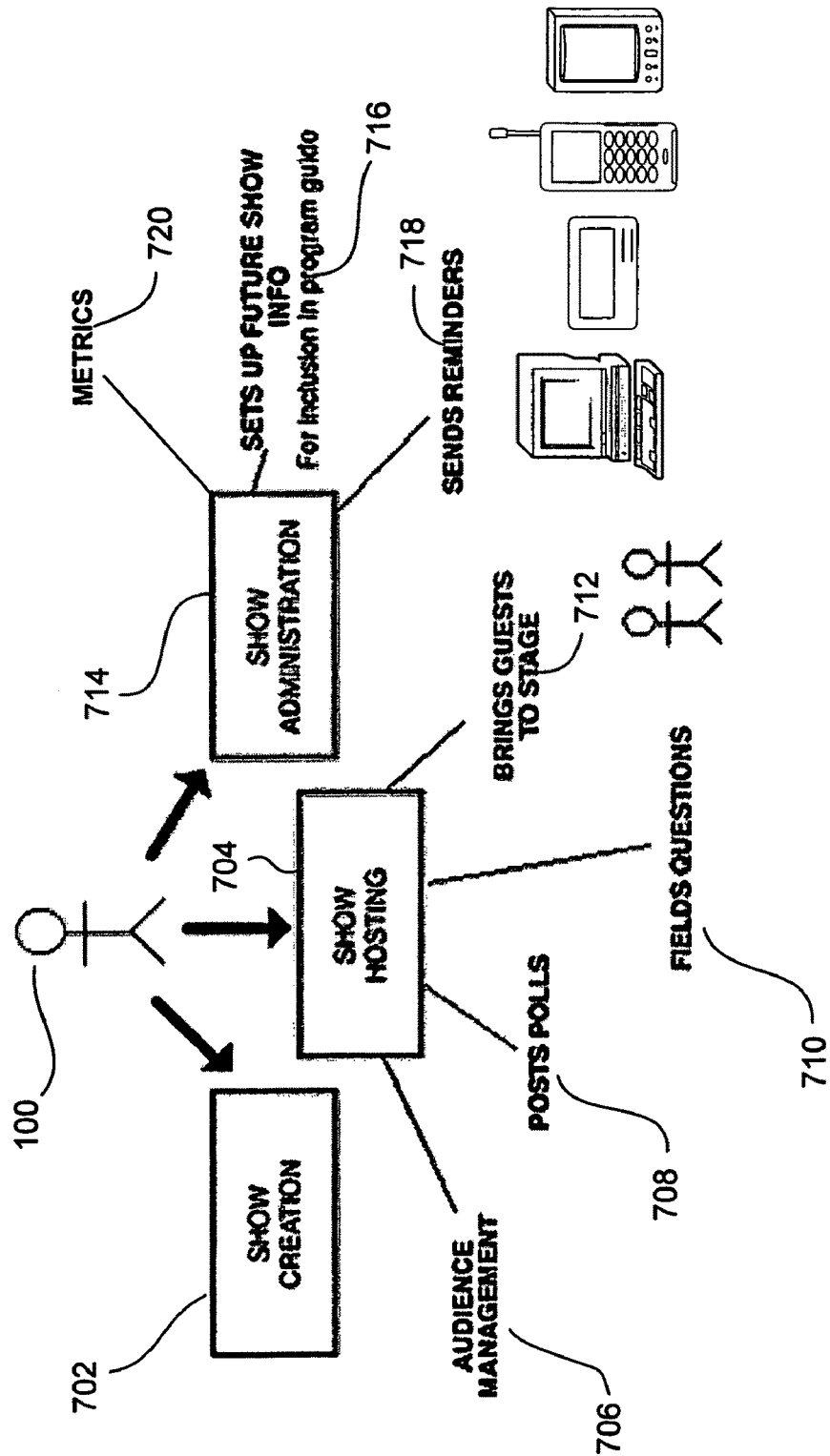
FIG. 7 is a diagram depicting the ways in which a moderator may interact with a system for creating an interactive program in accordance with an exemplary embodiment of the present invention.

FIG. 7 is a use case diagram depicting ways in which a moderator may interact with a system for creating an interactive program incorporating viewer interactions in accordance with an exemplary embodiment of the present invention. A moderator 100 accesses the system in order to create (702) an interactive program. In one system for creating an interactive program incorporating viewer interactions in accordance with an exemplary embodiment of the present invention, the moderator creates a talkshow that is a periodically broadcast interactive program. Creation of an interactive program may include selecting a theme for the talk show, establishing a broadcast time, and creating a brief description of the talk show. This interactive program information is stored in a moderator database 230 (FIG. 2). The moderator database is used by a moderator server 210 (FIG. 2) to generate a to-be-described programming guide.

The moderator also accesses the interactive program creation system to host (704) an interactive program. While the moderator is hosting an interactive program, the system provides facilities 706 for audience management allowing the moderator to restrict access to an interactive program. As previously described, the system provides facilities for the moderator to block interactive messages from viewers in the audience. The system also provides a facility 708 for posting polls during the interactive program. This allows a moderator to pose questions to the audience in order to receive and aggregate viewers' opinions about various subjects during an interactive program as previously described. The system further includes facilities 710 for answering questions presented by viewers to the moderator. As previously described, a moderator can receive questions from viewers and determine whether or not to answer them. Additionally, the system provides an invitation facility 712 for inviting viewers to participate in the interactive program as a virtual guest as previously described.

The moderator may also access the interactive program creation system to perform (714) administrative tasks associated with moderating a periodically presented interactive program. The interactive program creation system provides facilities 718 for sending scheduling reminders to viewers about upcoming interactive programs. Such scheduling reminders may be transmitted to a viewer by email, to a viewer's personal pager, to a viewer's wireless phone, or to a viewer's personal digital assistant. The interactive program creation system also includes facilities 720 for a moderator to review metrics collected by the system on a moderator's interactive program.

Figure 8:
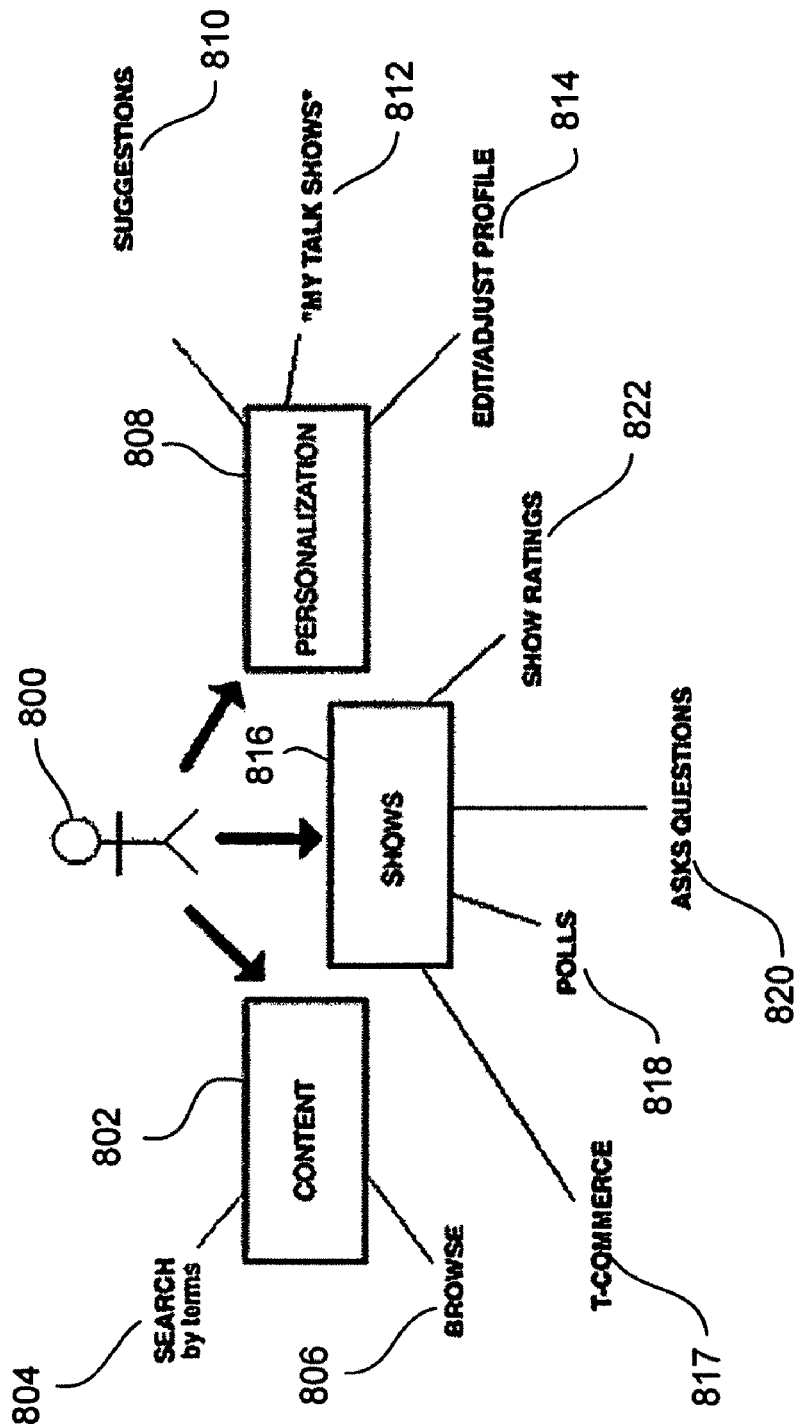
FIG. 8 is a use case diagram depicting ways in which a viewer may interact with a system for creating an interactive program in accordance with an exemplary embodiment of the present invention.

FIG. 8 is a use case diagram depicting ways in which a viewer may interact with a system for creating an interactive program incorporating viewer interactions in accordance with an exemplary embodiment of the present invention. A user accesses the interactive program creation system in order to search for (802) interactive programs. The interactive program creation system includes facilities 804 for searching the interactive program creation system for interactive programs on particular topics that the viewer may be interested in. The interactive program creation system also includes browsing facilities 806 allowing the viewer to examine an interactive program creation system directory of interactive programs in a hierarchal manner.

The viewer may also access the interactive program creation system to view 816 and become part of an interactive program. The interactive program creation system includes facilities 817 allowing a viewer to interact with embedded advertising. The interactive program creation system also includes facilities 818 allowing a moderator to poll viewers during an interactive program as previously described. The interactive program creation system also includes facilities 820 allowing a viewer to ask questions of the moderator and virtual guests as previously described. The interactive program creation system also includes facilities 822 allowing a viewer to rate an interactive program as previously described.

The viewer may also access the interactive program creation system to personalize (808) the viewer's experience with the interactive program creation system. The interactive program creation system includes facilities 810 for submitting suggestions by the interactive program creation system of interactive programs the viewer may be interested in based on viewer preferences as included in a viewer profile and previously viewed interactive programs. The interactive program creation system further includes facilities 812 for creation of a list of favorite interactive programs used by moderators to send scheduling reminders to the viewer about upcoming interactive programs as previously described. The interactive program creation system also includes facilities 814 allowing a viewer to create and edit a viewer profile including topics of interest to the viewer. In one embodiment of an interactive program creation system in accordance with the present invention, viewer profiles are stored in data files on the viewer client. In another embodiment of an interactive program creation system in accordance with the present invention, viewer profiles are stored on a central server and downloaded as XML documents to the viewer client as needed.

Figure 9:
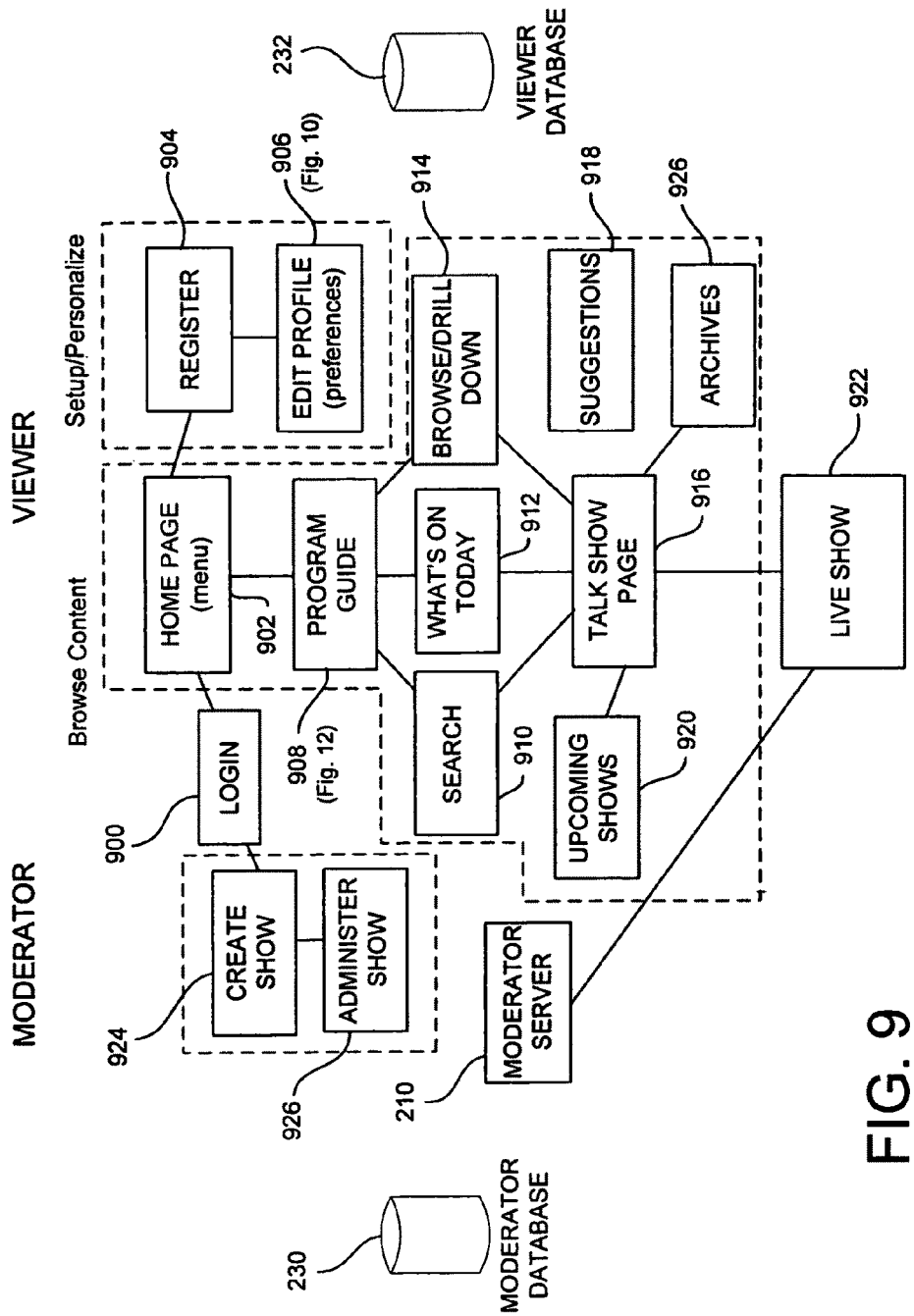
FIG. 9 is a Web site diagram of an interactive program creation system in accordance with an exemplary embodiment of the present invention.

FIG. 9 is a Web site diagram of an interactive program creation system in accordance with an exemplary embodiment of the present invention. As previously described, in one interactive program creation system in accordance with an exemplary embodiment of the present invention, a moderator server hosts a Web site for accessing interactive programs by both moderators and viewers. A user, such as a moderator or viewer, accesses the Web site via a log-in page 900.

Figure 29:
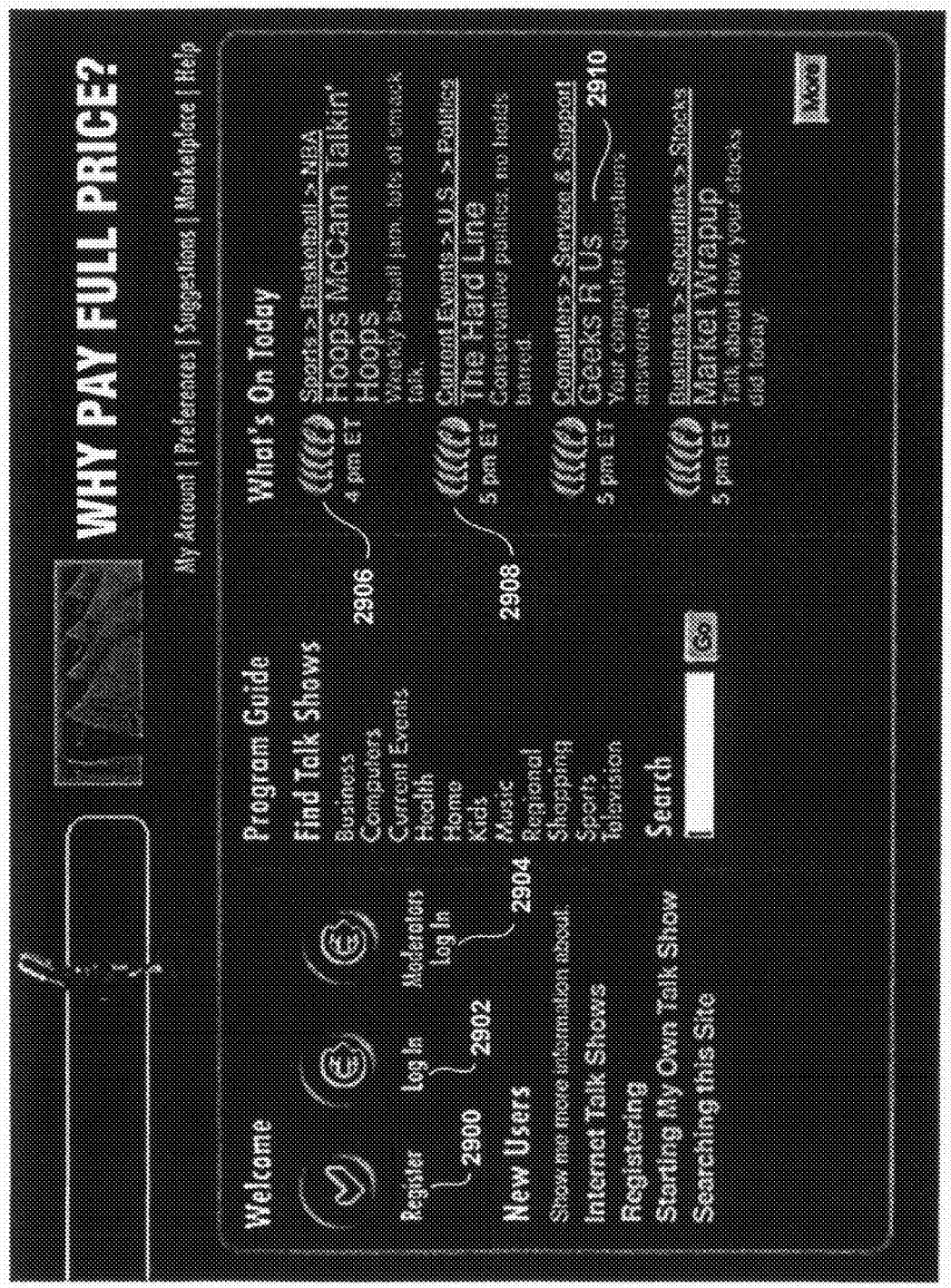
FIG. 29 is a screen capture of an interactive program system log-in interface in accordance with an exemplary embodiment of the present invention.

FIG. 29 is a screen capture of an interactive program creation system log-in interface in accordance with an exemplary embodiment of the present invention. A user selects a register button 2900 to register as either a viewer or a moderator. If the user is registering as a viewer, the user obtains a viewer identifier and a viewer password. If the user is registering as a moderator, the user obtains a moderator identifier and a moderator password. The identifiers and passwords are used by the user to access the interactive program creation system on future visits and can be stored in "cookies" on the client the user is using to access the interactive program creation system.

A user selects a log-in button 2902 to access the interactive program creation system as a viewer or selects a moderator log-in button 2904 to access the interactive program creation system as a moderator. The interactive program creation system log-in interface further includes an upcoming program guide section 2906 for display of interactive programs that are scheduled to be produced by their moderators in the next 24 hours. The listings in the upcoming program guide section include a previously described "mic" viewer rating 2908 and a category link 2910 to a viewer interface where a viewer can find more interactive programs similar to the listed interactive program.

Referring again to FIG. 9, if the user logs in as a viewer, the viewer is directed to a viewer home page 902. From the viewer home page, the viewer may access a registration process 904. Once registered, the viewer can access an edit profile process 906.

Figure 10:
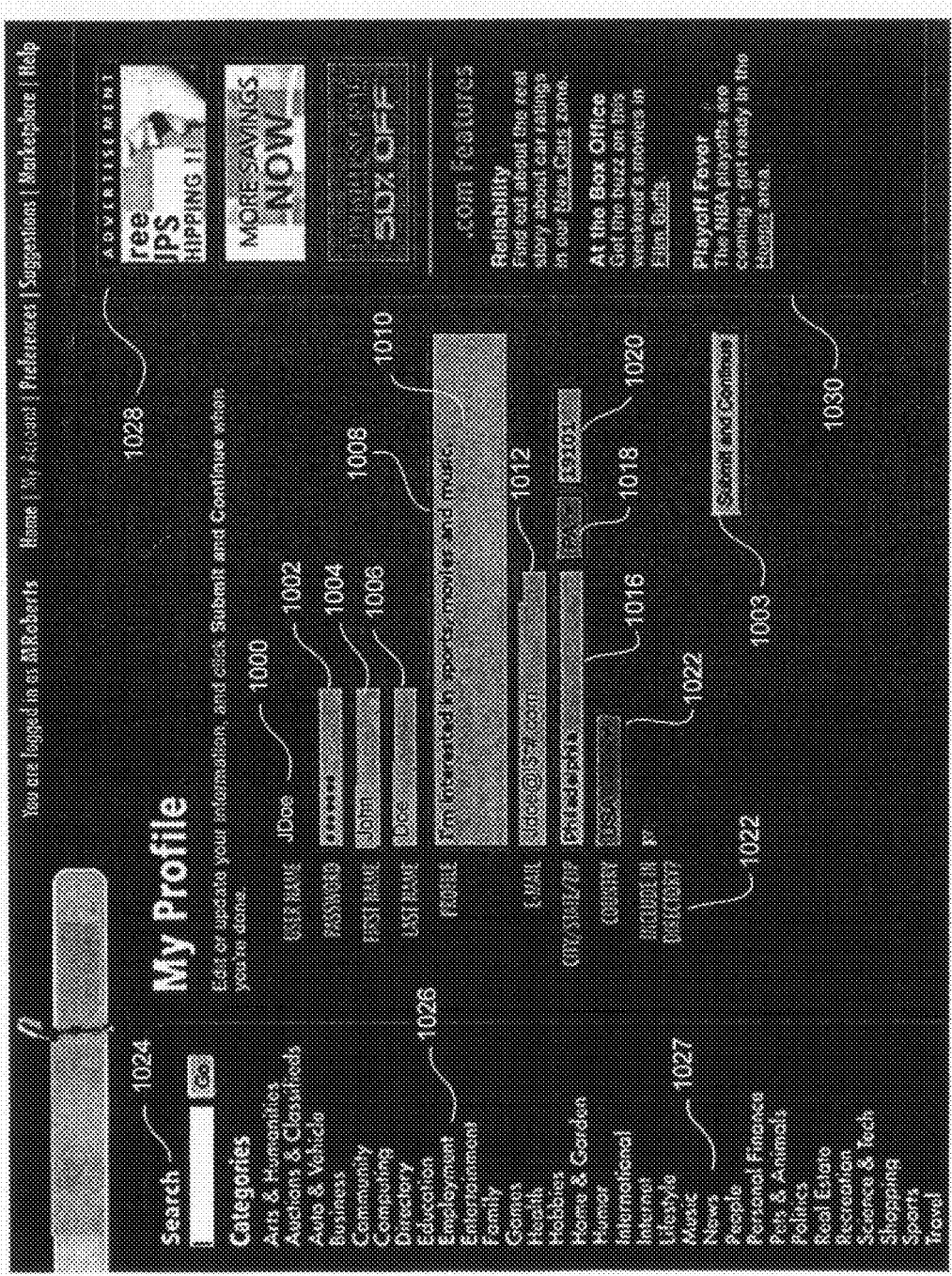
FIG. 10 is a screen capture of an edit profile viewer interface in accordance with an exemplary embodiment of the present invention.

FIG. 10 is a screen capture of an edit profile viewer interface in accordance with an exemplary embodiment of the present invention. The edit profile viewer interface is used by a viewer to edit the viewer's personal information stored in the viewer's profile. The edit profile viewer interface includes a viewer identification field 1000 for display of the viewer's identification and a password entry field for entry of the viewer's password. In operation, a user enters a new password into the password entry field and selects a "Submit and Continue" button 1003 to change the viewer's password. The viewer's identification and password are associated together in the user database 232 (FIG. 9) for use by the viewer as the viewer accesses different facilities of the interactive program creation system.

The edit profile viewer interface further includes personal information entry fields, such as a first name entry field 1004 and a last name entry field 1006. Alternatively, the viewer may enter an anonymous viewer name rather than the viewer's real name in order to hide the viewer's identity. In operation, a viewer enters their personal information and selects the "Submit and Continue" button to store the viewer's personal information in the viewer's database. The personal information is used by the interactive program creation system to personalize the viewer's experience while using the interactive program creation system.

The edit profile viewer interface further includes a viewer profile entry field 1008. In operation, the viewer enters the viewer's interests into the viewer profile entry field. The entered viewer profile is stored in the viewer database for use by the interactive program creation system to make suggestions of interactive programs that the viewer may want to participate in. To make suggestions, the viewer profile is queried and key terms are identified. For example, the illustrated viewer profile 1010 includes the key terms "sports", "movies", and "music". The interactive program creation system compares these key terms to key terms included in the moderator database 230 (FIG. 9) by moderators who have created interactive program profiles. If a match is found, the interactive program creation system suggests the matching interactive program to the viewer.

In an embodiment of an interactive program creation system in accordance with the present invention, interactive programs are suggested to the viewer in a "pay-for-placement" mode. For example, if a plurality of interactive programs match the viewer's profile, the first interactive program suggested to the viewer is the interactive program whose moderator has paid the interactive program creation system's operator the most for being placed first.

The edit profile viewer interface further includes a viewer email address entry field 1012, viewer city 1016, viewer state 1018, viewer zipcode 1020, and viewer country 1022 entry fields. In operation, the viewer enters their email and address location and selects the "Submit and Continue" button to store the viewer address information in the viewer database. Moderators using the interactive program creation system can use the viewer address information to notify a viewer when the moderator's interactive program is to be broadcast. Additionally, the viewer may optionally select an "Include in Directory" button 1022 in order to exclude the viewer's address information from view by the moderators.

The edit profile viewer interface further includes an interactive program search entry field 1024. A viewer uses the search entry field to enter a search term used to search the moderator database for interactive programs with terms matching the search term. The edit profile viewer interface further includes a category or hub selection field 1026. A viewer may select an individual category, such as "News" 1027 to be taken to a hub process for accessing interactive programs related to the selected category.

The edit profile viewer interface further includes an advertising section for display of "click-through" style banner ads. A user selects one of the banner ads to be transferred to an advertiser's or retailer's Web site. The edit profile viewer interface further includes a feature section 1030 for display of links to featured hubs. By selecting a featured hub link, a viewer can quickly access a hub process for accessing interactive programs related to the selected feature category.

Figure 11:
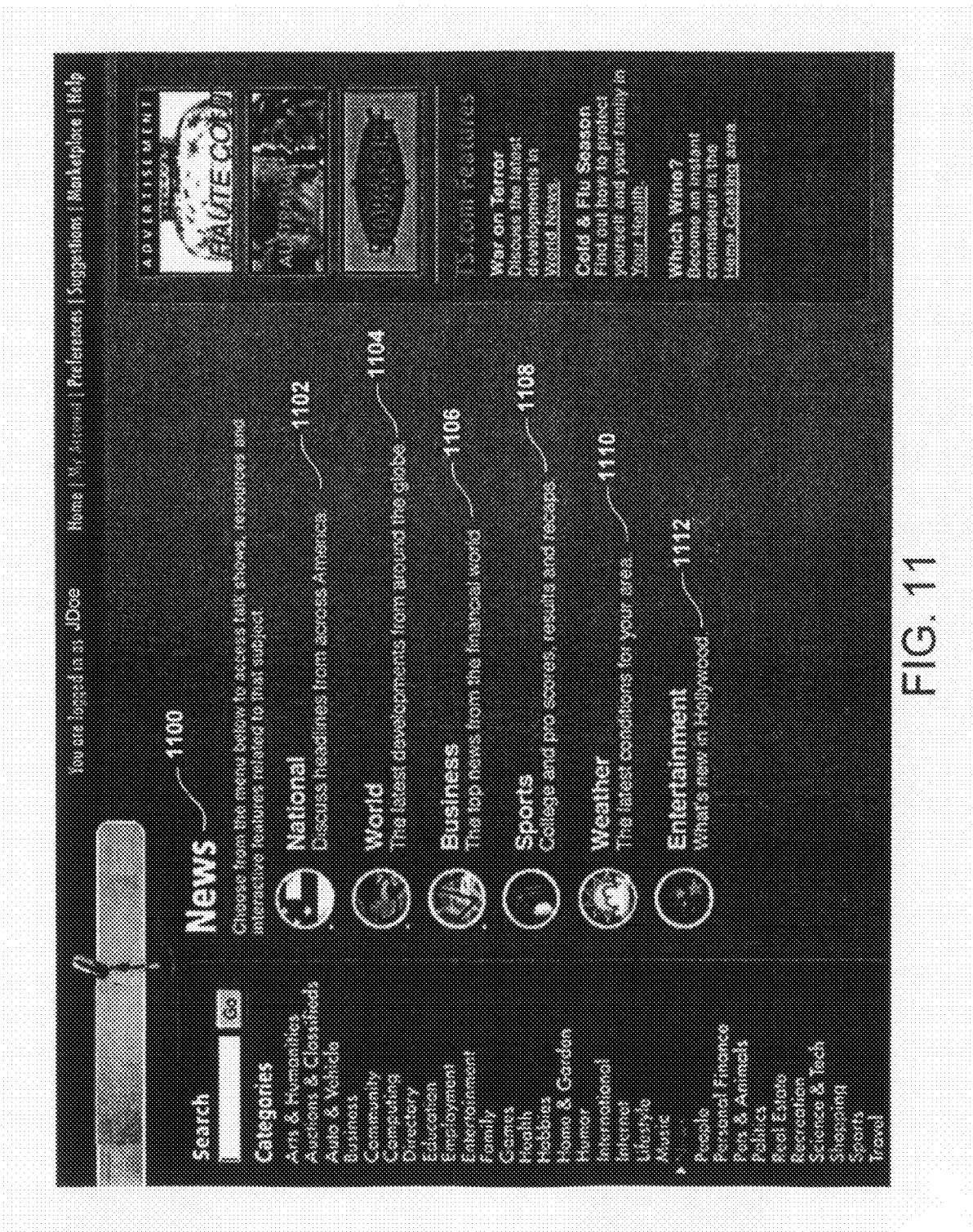
FIG. 11 is a screen capture of a hub viewer interface in accordance with an exemplary embodiment of the present invention.

FIG. 11 is a screen capture of a hub viewer interface in accordance with an exemplary embodiment of the present invention. The screen capture is of an exemplary "News" 1100 hub. Other hubs may be created for other subjects such as "home improvement" and the like. The hub includes links for accessing by the viewer, interactive programs whose themes are national news 1102, world news 1104, business news 1106, sports news 1108, weather news 1110, and entertainment news 1112. In operation, a viewer selects one of the links to access a specialized program guide including links to interactive programs with a theme corresponding to the link title.

Referring again to FIG. 9, a viewer may access an interactive program electronic program guide process 908. A viewer uses the program guide process to add upcoming interactive programs to a viewer's interactive program list that is stored in the viewer database 232.

Figure 12:
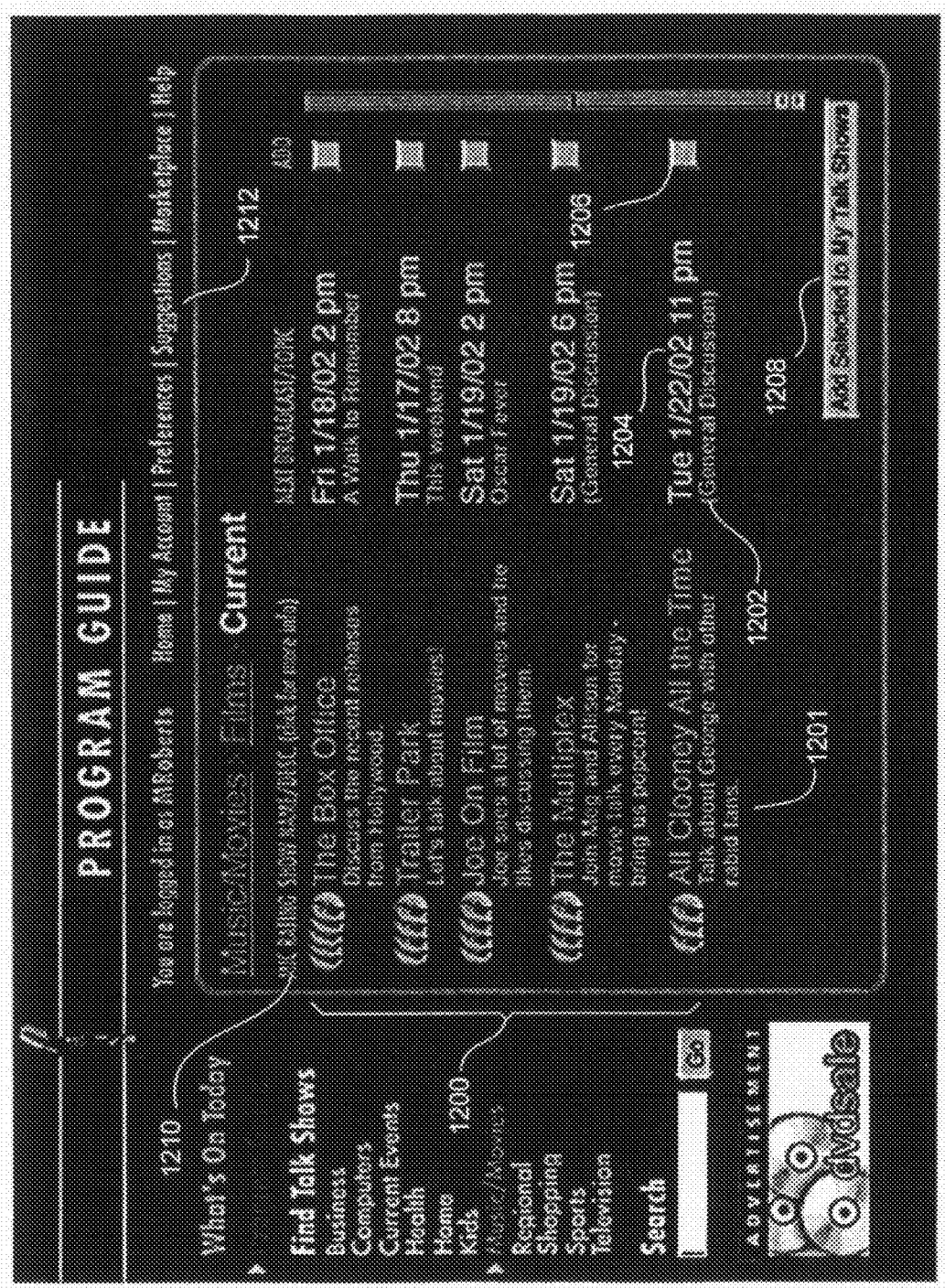
FIG. 12 is a screen capture of a program guide viewer interface in accordance with an exemplary embodiment of the present invention.

FIG. 12 is a screen capture of a program guide viewer interface in accordance with an exemplary embodiment of the present invention. The program guide includes a plurality of listings for interactive programs available for viewing 1200. Each of the listings includes a title and brief description field 1201, a current subject field 1202, a time field 1204, and a listing selection button 1206. In operation, a viewer reads the listing title and brief description to determine if the viewer wants to participate in the interactive program. The viewer reads the time field to determine when the next interactive program will be available, and reads the current subject field to determine what the next subject to be discussed during the interactive program will be. The viewer then selects the listing selection button and the "Add Selected to My Talk Shows" button 1208 to add the listing to a viewer's list of interactive programs that the viewer wants to participate in. The list is maintained in the viewer's database 232 (FIG. 9).

The program guide viewer interface further includes an interactive program rating 1210 display. The interactive program rating is a viewer rating determined from viewer responses to the interactive program. In a program guide in accordance with an exemplary embodiment of the present invention, the viewer rating is expressed in terms of "mics" (short for "microphone"). The greater the number of mics, the higher the viewer rating of the interactive program. For example, the maximum number of mics an interactive program may receive is five mics for a popular program. A minimally popular interactive program may only receive only one mic.

The program guide viewer interface further includes a link to an interactive program suggestion 1210 process. As previously described, the interactive program creation system uses a viewer's profile stored in the viewer database and interactive program descriptions stored in the moderator database to suggest interactive programs that the viewer may be interested in.

In another program guide viewer interface in accordance with an embodiment of the present invention, the viewer may also access archived programs in an "on-demand" mode. In an on-demand mode, the program guide includes previously broadcast and archived interactive programs.

Referring again to FIG. 9, a viewer may access the previously described search facilities 910 of the interactive program creation system from the program guide. Additionally, the program guide provides a link to an immediate program guide 912 for listing interactive programs that are scheduled to be broadcast within the next day. A viewer may also access a browsing facility 914. Using the browsing facility, a viewer can view a hierarchal list of interactive programs from which the viewer can select an interactive program to participate in.

The viewer may access a specific interactive program's home page 916 in a variety of ways, such as: selecting a link to an interactive program from the previously described search facility 910; immediate program guide 912; browsing facility 920; and suggestion facility 918. Additionally, included in a moderator database 230 is a schedule of upcoming interactive program broadcasts. The schedule of upcoming interactive program broadcasts may be accessed by the viewer using an upcoming interactive program facility 920. From an interactive program's home page, a viewer may join a previously described actual interactive program 922. Each interactive program is hosted by a previously described moderator server 210.

Figure 28:
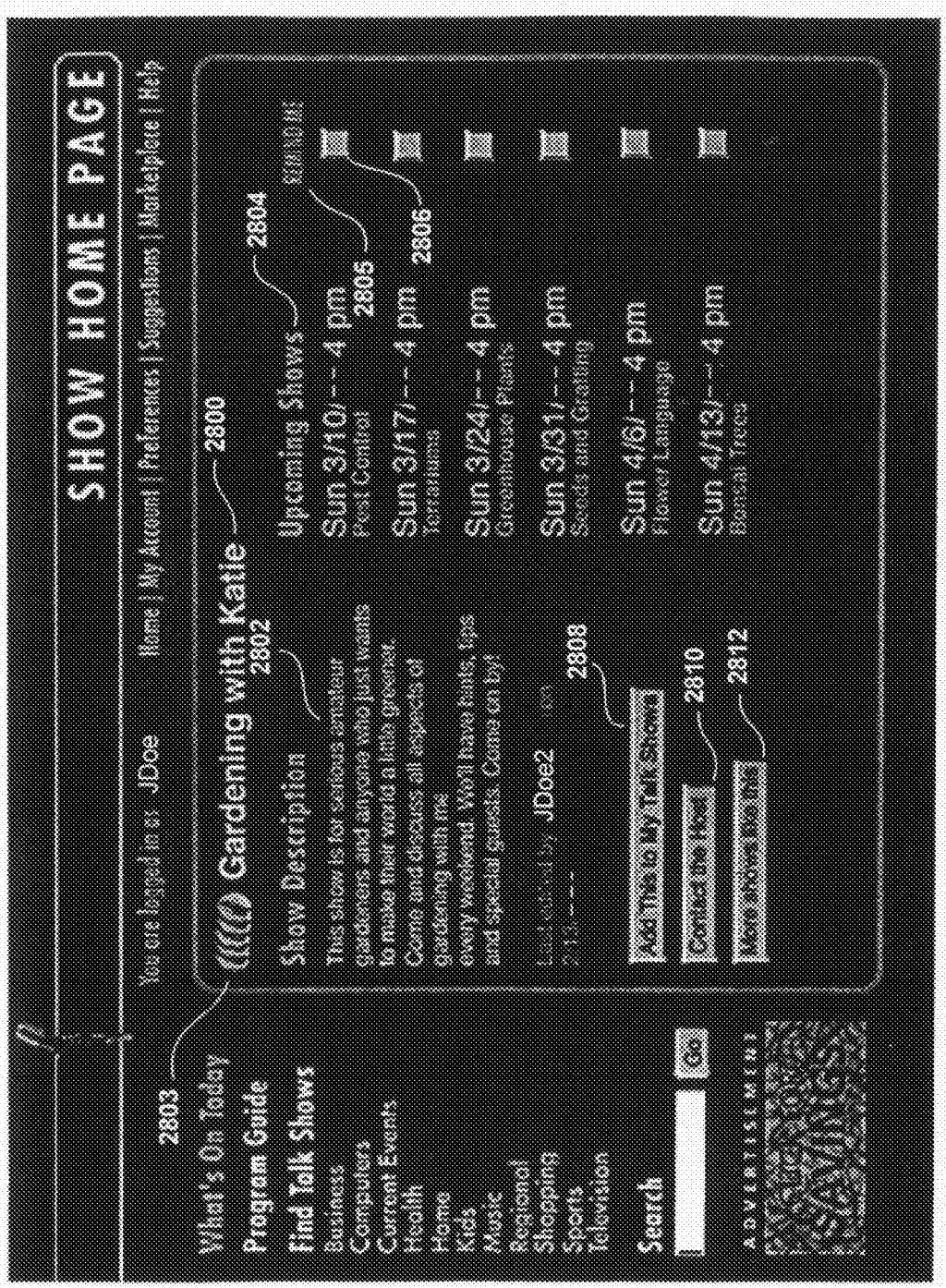
FIG. 28 is a screen capture of an interactive program home viewer interface in accordance with an exemplary embodiment of the present invention.

FIG. 28 is a screen capture of an interactive program home viewer interface in accordance with an exemplary embodiment of the present invention. An interactive program home viewer interface is generated by a moderator server using information entered by a moderator and stored in the moderator database. The interactive program home viewer interface includes an identifier field 2800 for display of an interactive program's identifier. An interactive program description field is used to display a brief description of the interactive program as described by the moderator.

The interactive program home viewer interface further includes a schedule section 2804 where the schedules of upcoming transmissions of the interactive program are listed. An upcoming listing 2805 includes a reminder button 2806. In operation, a viewer selects the reminder button for a listing and an entry is made by the interactive program creation system to the previously described viewer profile. The entry is used to transmit notifications to the viewer when the interactive program is about to be transmitted.

The interactive program home viewer interface further includes a preference addition button 2808 that the viewer selects to have the interactive program added to the previously described viewer's list of interactive program preferences. A contact button 2810 is provided for use by a viewer in sending an email message to a moderator. A search button 2812 is provided for the viewer to search for additional interactive programs that are related thematically to the interactive program represented in the interactive program home viewer interface.

The interactive program creation system further includes a facility 926 for retrieving archived previously broadcast interactive programs for viewing. A viewer uses the archive facility to view transcripts and enhanced content of interactive programs that the viewer may have missed or wants to view again. In one facility for retrieving archived interactive programs for viewing in accordance with an exemplary embodiment of the present invention, the archived interactive programs can be viewed on an "on-demand" or "pay-for-view" basis.

In another facility for retrieving interactive programs for viewing in accordance with an exemplary embodiment of the present invention, the archived interactive programs may be accessed for presentation in conjunction with other content such as in a syndication mode. For example, an archived interactive program whose theme was discussion about a particular product can be linked to an advertisement for that product on a separate Website. As another example, an interactive program with a topical theme may be syndicated by a live news Website.

Figure 13:
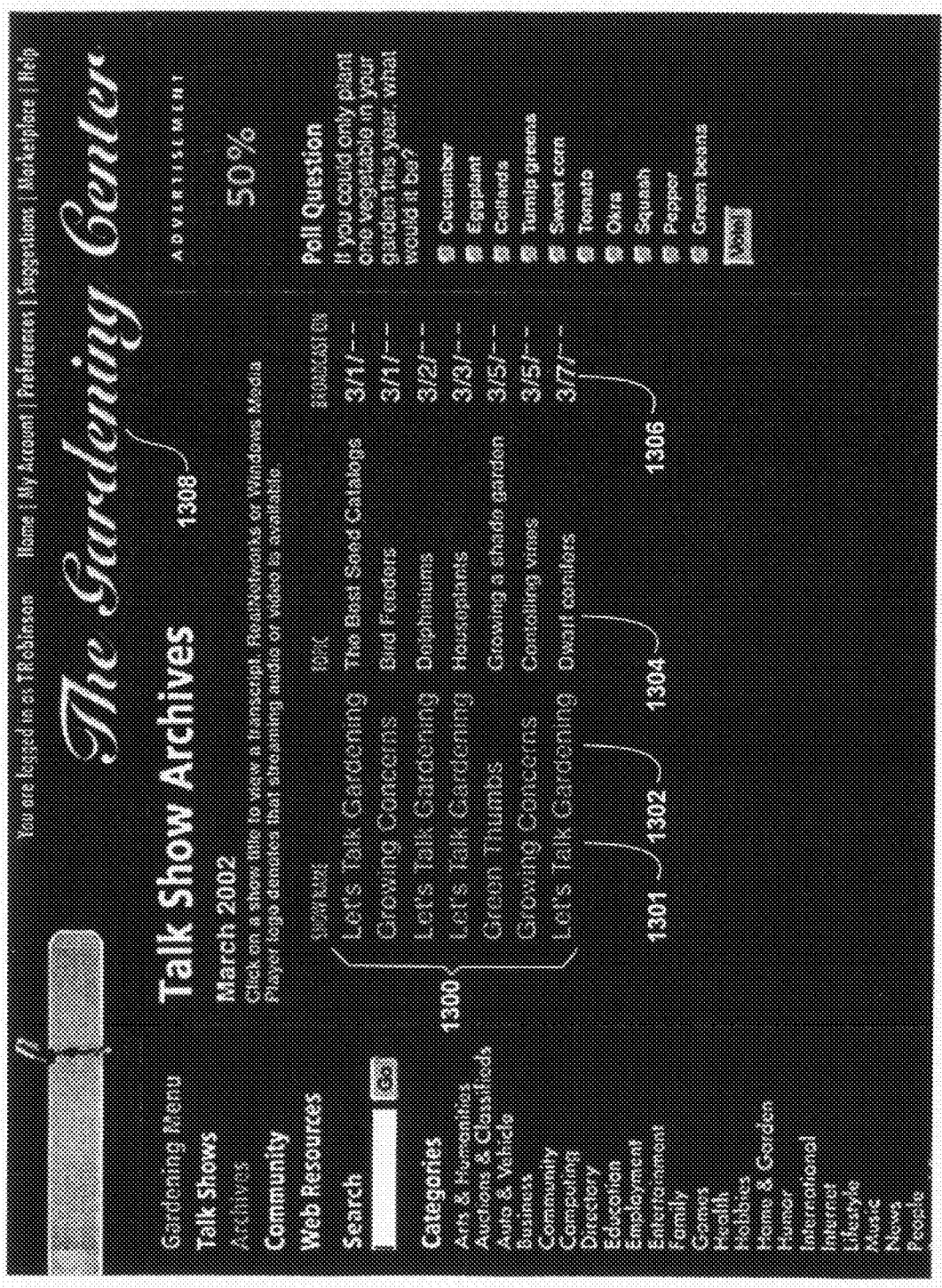
FIG. 13 is a screen capture of an interactive program archive viewer interface in accordance with an exemplary embodiment of the present invention.

FIG. 13 is a screen capture of an interactive program archive viewer interface in accordance with an exemplary embodiment of the present invention. An archive viewer interface includes a plurality of archive listings of previously broadcast and archived interactive programs 1300 with each archive listing 1301 including a title field 1302, a subject field 1304, and a date field 1306. In operation, a viewer reviews the plurality of archive listings and selects the archive listing corresponding to an archived interactive program the viewer wants to view. After selecting the archive listing of the archived interactive program, the viewer views a replay of the archived interactive program corresponding to the archive listing. In an interactive program archive viewer interface in accordance with an exemplary embodiment of the present invention, archived listings are organized by themes, such as the illustrated "The Gardening Center" 1308 that is an archive with a gardening theme. In other interactive program archive viewer interfaces in accordance with an exemplary embodiment of the present invention, an entity, such as a corporation, sponsors the archive as a form of advertising. For example, a brokerage may sponsor an archive with a financial theme or a hardware retailer may sponsor an archive with a "do-it-yourself" theme.

Referring again to FIG. 9, the interactive program creation system further includes facilities 924 for a moderator to create an interactive program. A moderator uses the facility to create an interactive program by entering information about the interactive program and the information is stored in the moderator database 230.

Figure 14:
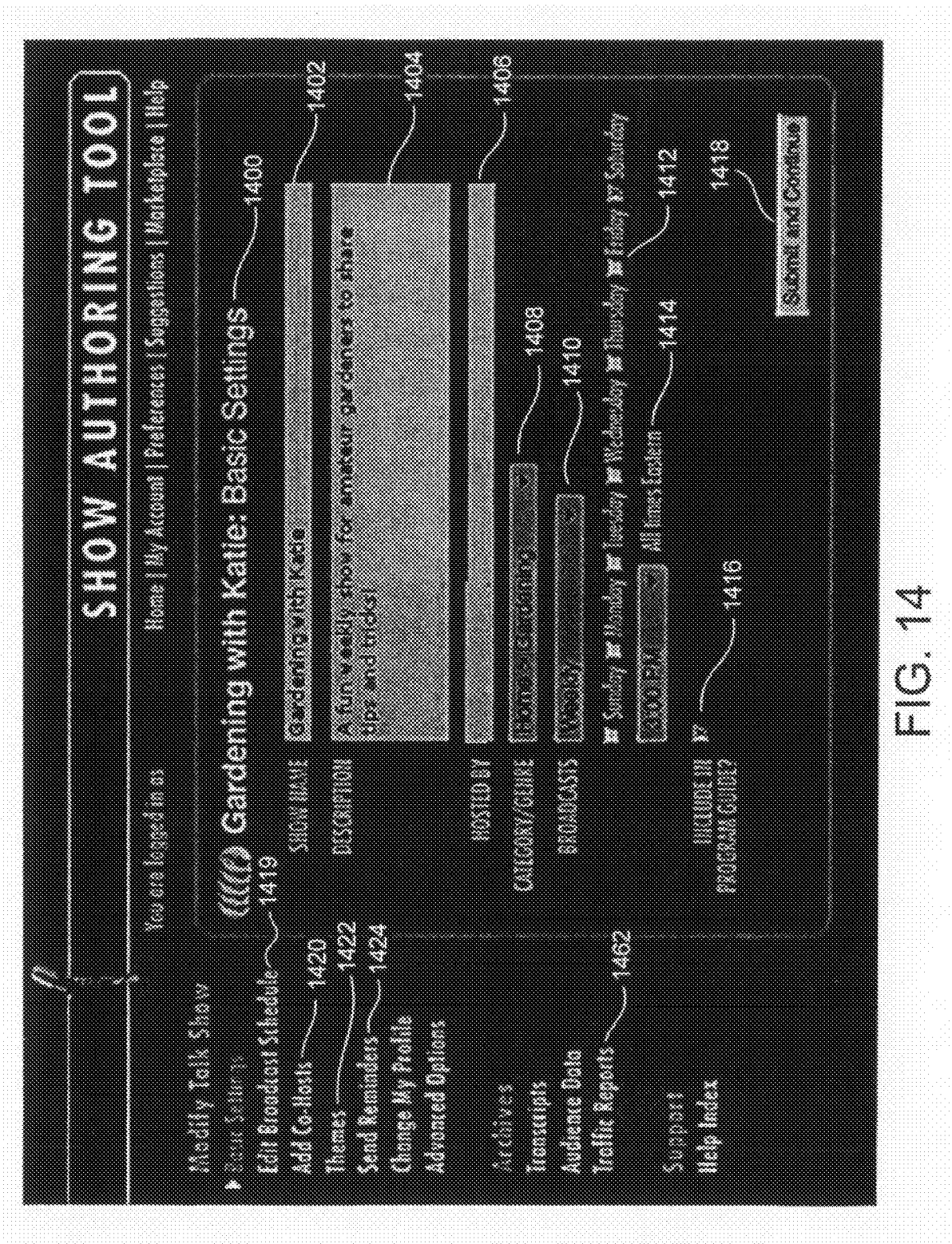
FIG. 14 is a screen capture of a moderator interface for an interactive program authoring tool in accordance with an exemplary embodiment of the present invention.

FIG. 14 is a screen capture of a moderator interface for an interactive program authoring tool in accordance with an exemplary embodiment of the present invention. The interactive program creation moderator interface includes an interactive program identifier display field 1400 for displaying the interactive program's name. A moderator uses an interactive program identifier entry field 1402 to enter the name of the interactive program. The interactive program creation moderator interface further includes a description entry field 1404 for entry by the moderator of a brief description of the interactive program and a category/genre selection menu 1408 for selection by the moderator of a category under which the interactive program will be placed. The interactive program creation moderator interface further includes a host name entry field 1406 for entry of the moderator's name. The interactive program creation moderator interface further includes a broadcast scheduling selection menu 1410, day selection buttons 1412, and a time selection menu 1414 for selection of the broadcast time of the interactive program. In operation, a moderator enters in an interactive program name, interactive program description, and host name. The moderator selects a category, a broadcast schedule, the days of the week the interactive program will be broadcast, the time the interactive program will be broadcast, and selects a "Submit and Continue" button 1418 to store the entered and selected interactive broadcast information in the moderator database 230 (FIG. 9). The moderator can also select an "Include in Program Guide" button 1416 to include the interactive program information in the previously described program guide.

Figure 39:
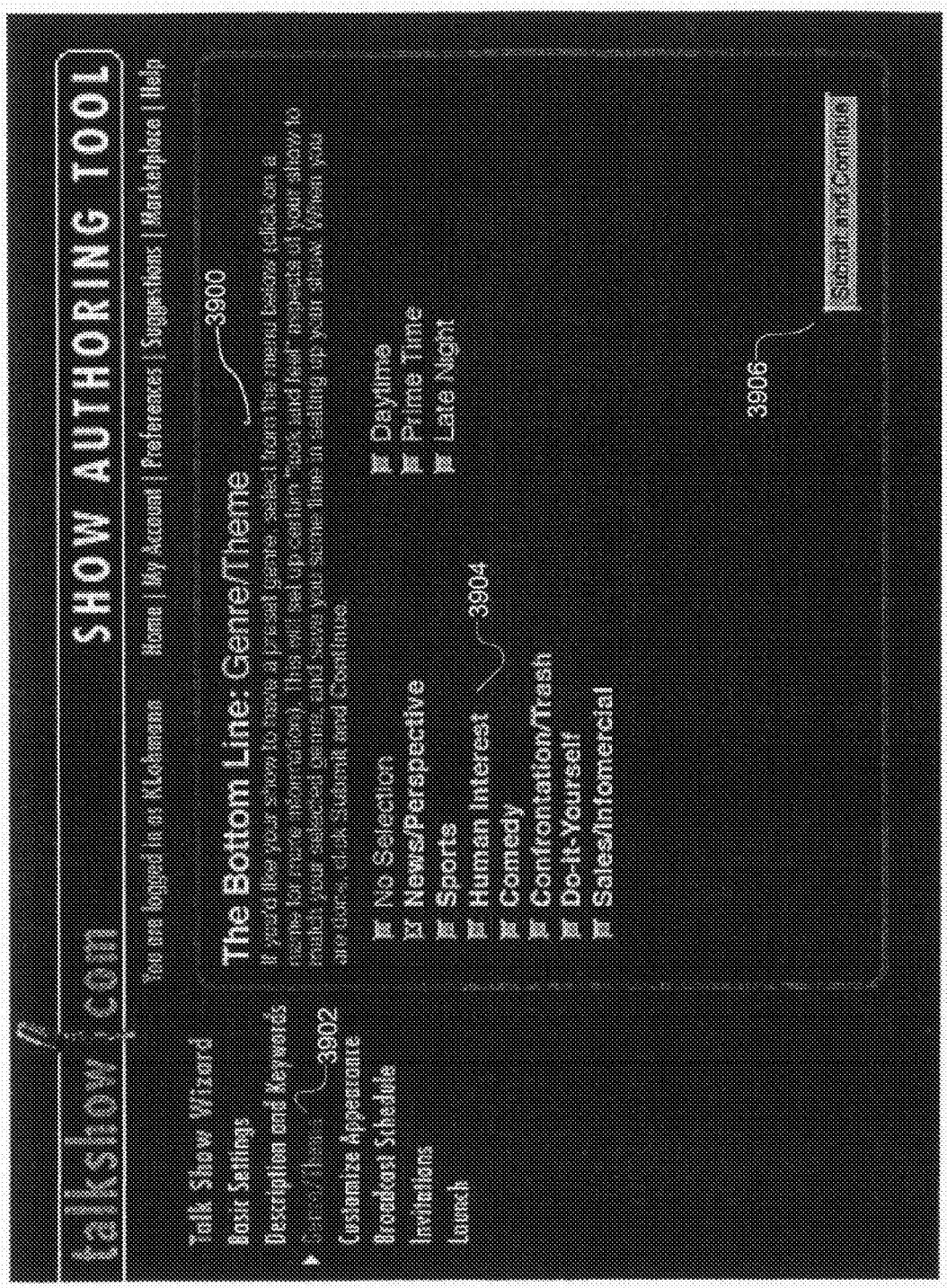
FIG. 39 is a screen capture of an interactive program authoring wizard in accordance with an exemplary embodiment of the present invention.

FIG. 39 is a screen capture of an interactive program authoring wizard in accordance with an exemplary embodiment of the present invention. Within the interactive program authorizing tool is a "wizard" which allows a host/moderator to easily set up a new interactive program. A "wizard" is a software tool that guides a user through the configuration of a software application. A wizard typically includes a set of selectable configuration templates for use by a user and a dialog that guides the user through the configuration process.

The interactive program authoring wizard can operate as a standalone application and may be used through a Web browser. The interactive program authoring wizard features beginner, intermediate, and expert levels and offers the ease of use of other mass market authoring tools making it easy for potential moderators to get started hosting their own interactive programs. During a setup process, the moderator selects from several preset genres allowing the moderator to quickly set the look and feel of their interactive programs. For example, these presets may include formats for defining interactive programs such as a news and perspective program, a sports program, a business program, a human interest program, a do-it-yourself program, etc. The interactive program authoring tool 3900 has a "genre/theme" link 3902 selectable by the moderator to bring up a list of themes 3904 that the moderator selects from. By selecting a theme, the moderator selects a configuration for the interactive program establishing backgrounds, layouts, and interactive areas for an interactive program. The moderator selects a theme and the selects a "submit and continue" button 3906 to configure the interactive program using a themed interactive program template.

The interactive program creation moderator interface further includes a link to a broadcast schedule editing facility 1418. A moderator uses this link to access a more detailed interactive program scheduling entry facility. The interactive program creation moderator interface further includes a link to an add co-hosts facility 1420. A moderator uses this link to access a facility for adding a co-host or additional, but subordinate moderator, such as a side-kick, a panel of experts, or a special guest to the interactive program.

The interactive program creation moderator interface further includes a link to a theme facility 1422. A moderator uses this link to access a facility for assigning the interactive program to a thematic category for easier classification of interactive programs for browsing by a viewer.

The interactive program creation moderator interface further includes a link to a send reminders facility 1420. A moderator uses this link to access a facility for transmitting reminders to viewers. The interactive program creation system uses the previously described viewer's lists of interactive programs to send notifications to each of the viewers who have added the moderator's interactive program to their list of interactive programs. Reminders may be sent by various communication links such as email, voice mail, and pager as agreed to by the viewer.

Figure 32:
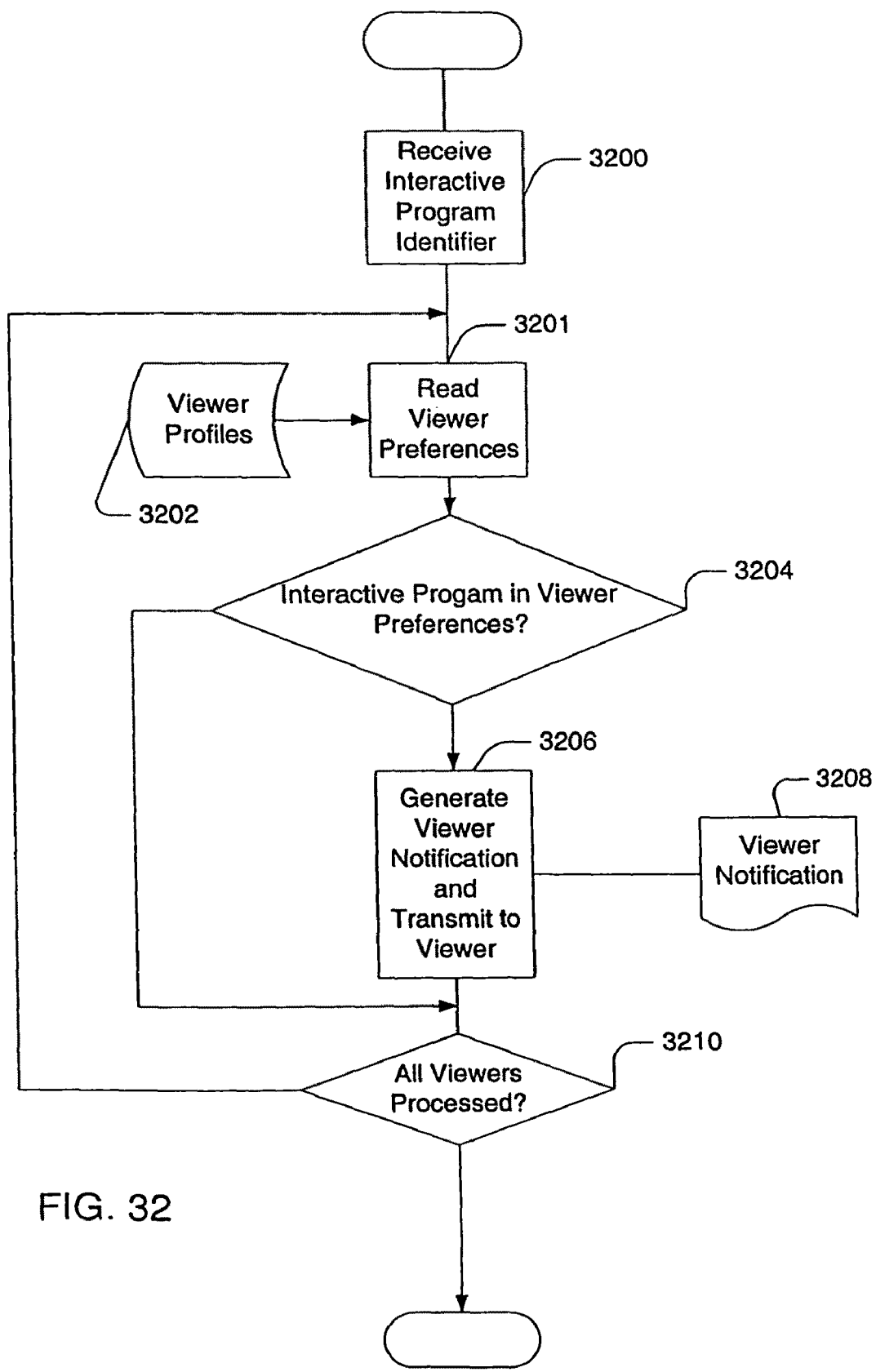
FIG. 32 is a process flow diagram of a viewer notification process in accordance with an exemplary embodiment of the present invention.

FIG. 32 is a process flow diagram of a viewer notification process in accordance with an exemplary embodiment of the present invention. A moderator server receives (3200) an interactive program identifier from a moderator for which the moderator would like to transmit reminders to viewers. The moderator server reads (3201) viewer preferences from previously described viewer profiles 3202. Included in a viewer's profile is a list of interactive programs for which the viewer wants to be reminded of upcoming transmissions. If the moderator server determines (3204) that a viewer wants to receive notifications for the identified interactive program, the moderator server generates (3206) a viewer notification 3208 and transmits the viewer notification to the viewer. The moderator server then determines (3210) if all viewers have been processed. If not, the moderator server continues searching for viewers wishing to receive notifications. The moderator server continues processing until all viewers wishing to receive notifications of the transmission of the interactive program have been notified.

In one viewer notification process in accordance with an exemplary embodiment of the present invention, a viewer notification is transmitted as an email message to the viewer. The viewer may retrieve the email message by any suitable device or client such as a personal digital assistant, a personal computer, etc. In another viewer notification process in accordance with an exemplary embodiment of the present invention, the viewer notification is in the form of an audio reminder transmitted to a viewer's voice mail system or directly to a viewer's telephone. In another viewer notification process in accordance with an exemplary embodiment of the present invention, the viewer notification is in the form of an instant message that is transmitted to a viewer if the viewer is currently on a system that is accessible to the moderator server.

Referring again to FIG. 14, the interactive program creation moderator interface further includes a link to a traffic report facility 1426. A moderator uses this link to access a facility for generating reports describing the user interactions with an interactive program broadcast by the moderator.

Figure 15:
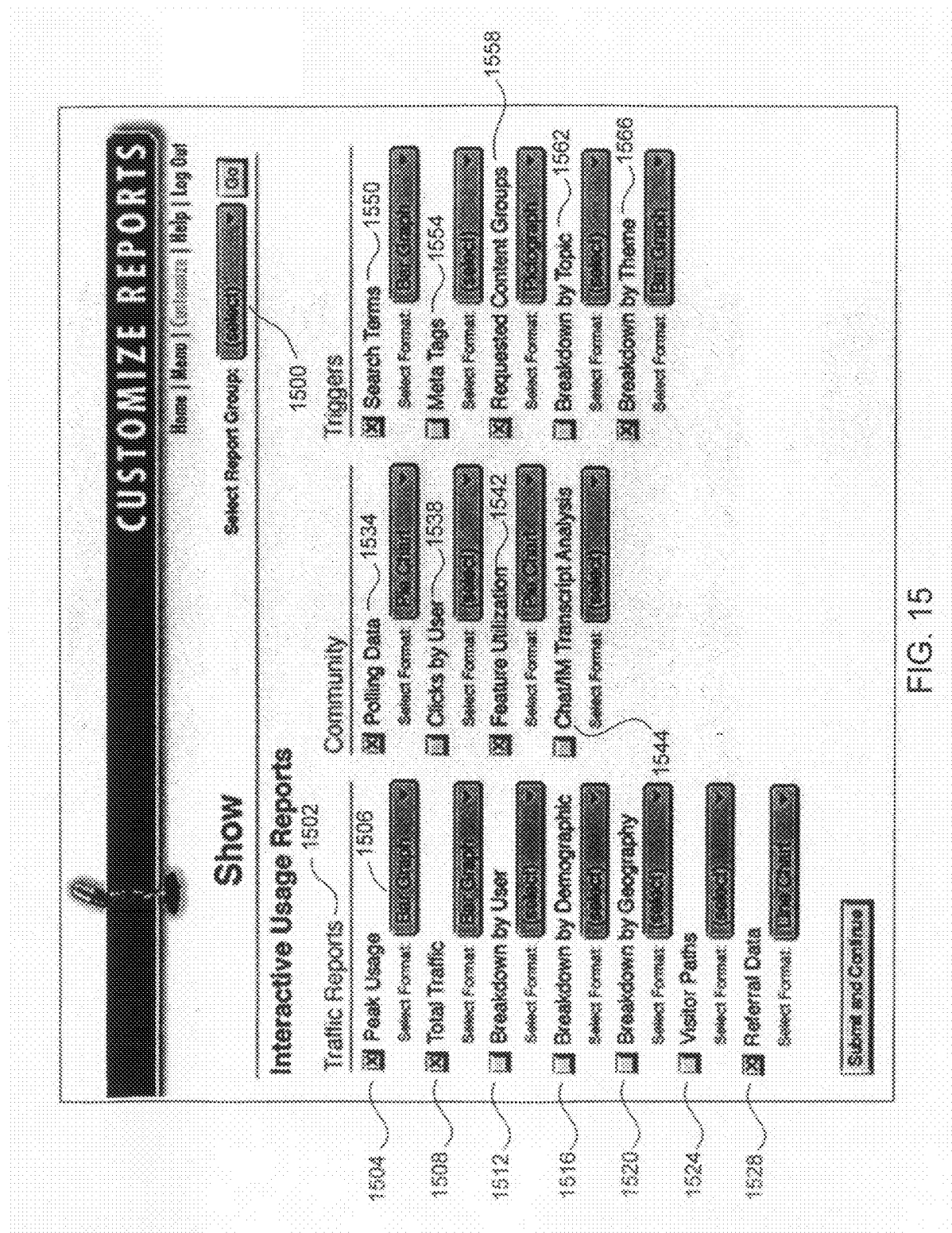
FIG. 15 is a screen capture of a moderator interface for an interactive program reporting tool in accordance with an exemplary embodiment of the present invention.

FIG. 15 is a screen capture of a moderator interface for an interactive program reporting tool in accordance with an exemplary embodiment of the present invention. In general, a moderator uses an interactive program reporting tool to specify reports generated using data recorded about viewer interaction with an interactive program broadcast and stored in the moderator database as previously described. Additionally, the interactive program reporting tool is used by a moderator to generate a report regarding viewer access of archived interactive programs so that the moderator can determine the popularity of old content that was previously broadcast. The moderator can specify reports to analyze the data in a variety of ways using a variety of data mining techniques to yield customizable, comprehensive, and flexible reports. Additionally, viewer identifications associated with the viewer interaction data can be combined with the previously described viewer profile data to generate reports on the demographics and geographic locations of the viewers participating in an interactive program. In this mode, a viewer's privacy may be protected by aggregating the viewer data or stripping viewer identifiers from any data viewable by a moderator. The reporting tool moderator interface includes a select group report menu 1500 for selecting a specific set of reports to view.

The reporting tool moderator interface further includes entry fields for selection of types and formats of viewer interaction reports. Each of these sections is typified by a selection button 1504 and a format selection pull-down menu 1506. A moderator selects a selection button to include the specific type of report in a viewer interaction report and uses the format pull-down menu to select the format of the specific report. The types of reports the moderator can include in a viewer interaction report include a peak usage report 1504. A peak usage report is a report indicating the peak usage of the interactive program by the viewers.

A moderator can select a total traffic report 1508. A total traffic report is a report depicting the total number of viewers and viewer interactions with the interactive program over the broadcast time of the interactive program.

A moderator can select a breakdown by user report 1512. A breakdown by user report is reported depicting the interactions of single viewers.

A moderator can select a breakdown by demographic report 1516. A breakdown by demographic report is a report depicting viewer interactions by viewers fitting certain demographic descriptions.

A moderator can select a breakdown by geography report 1520. A breakdown by geography report is a report depicting where viewers participating in an interactive program are physically located.

A moderator can select a visitor path report 1524. A visitor path report is a report depicting where viewers are located on a network.

A moderator can select a referral report 1528. A referral report is a report depicting from which locations viewers have been referred from such as an external Web site, etc.

A moderator can select a polling data report 1534. A polling data report is a report depicting the results of polls taken by a moderator during an interactive program.

A moderator can select a "clicks by a viewer" report 1538. A clicks by a viewer report is a report depicting how many selections viewers make during an interactive program.

A moderator can select a feature utilization report 1542. A feature utilization report is a report depicting how many different features viewers are using during an interactive program.

A moderator can select a chat or interactive messaging report 1538. A chat or interactive messaging report is a report depicting how many interactive messages are being sent between the audience members during an interactive program.

Figure 16:
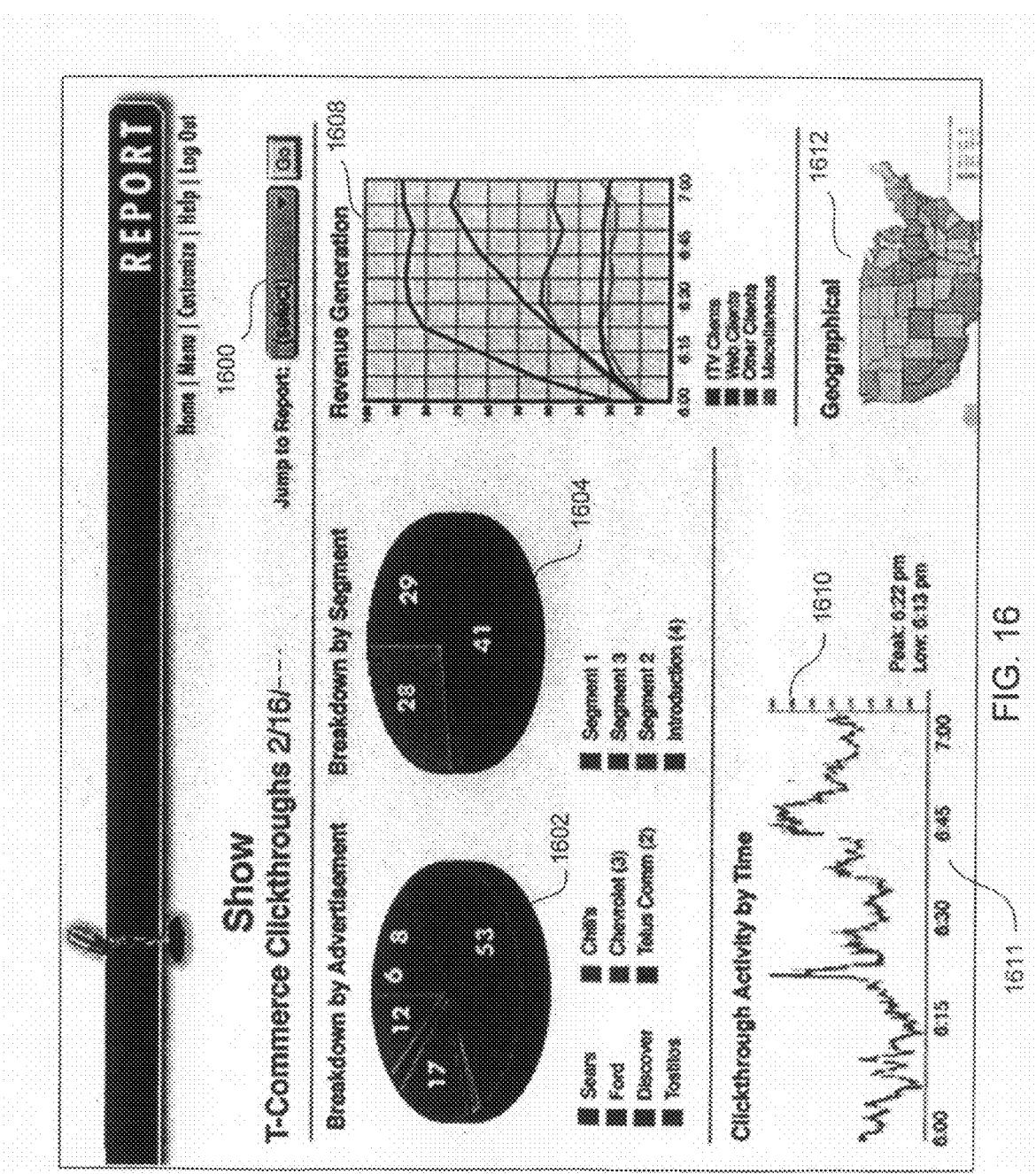
FIG. 16 is a screen capture of a moderator interface for a participant interaction report generated in accordance with an exemplary embodiment of the present invention.

FIG. 16 is a screen capture of a moderator interface for a viewer interaction report generated in accordance with an exemplary embodiment of the present invention. The report moderator interface includes a report selection pull down menu 1600 for immediately viewing sections of the report without having to scroll through each of the reports.

Graph 1610 is a graph of click-through activity versus time for an interactive program. During an interactive program, individual instances of viewers selecting advertising banners are recorded in the previously described moderator database associated with the time of the selection of the advertising banner. An interactive program creation system can use the recorded advertising selection events and their associated times to generate the click-through activity versus time graph.

Graph 1612 is a geographically based graph depicting the geographic location of viewers participating in an interactive program. The viewers participating in an interactive program are recorded in the previously described moderator database. Each recorded viewer's geographic location can be determined from the previously described viewer's profile or by mapping the viewer's IP address to a specific geographic location. An interactive program creation system can use the recorded viewer identifications and viewer geographic locations to generate a graphic illustrating the geographic locations of the viewers.

The viewer interactivity reports are used by a moderator to determine the effectiveness of an interactive program. For example, the moderator can use the demographic charts to determine if the interactive program is reaching an audience with the demographic profile desired by the moderator. As a further example, the moderator can determine the effectiveness of various portions of an interactive program by analyzing participant interaction with the interactive program over time. Spikes in interactive message transmissions from the participants may indicate portions of the interactive program that the participants find most engaging.

Figure 17:
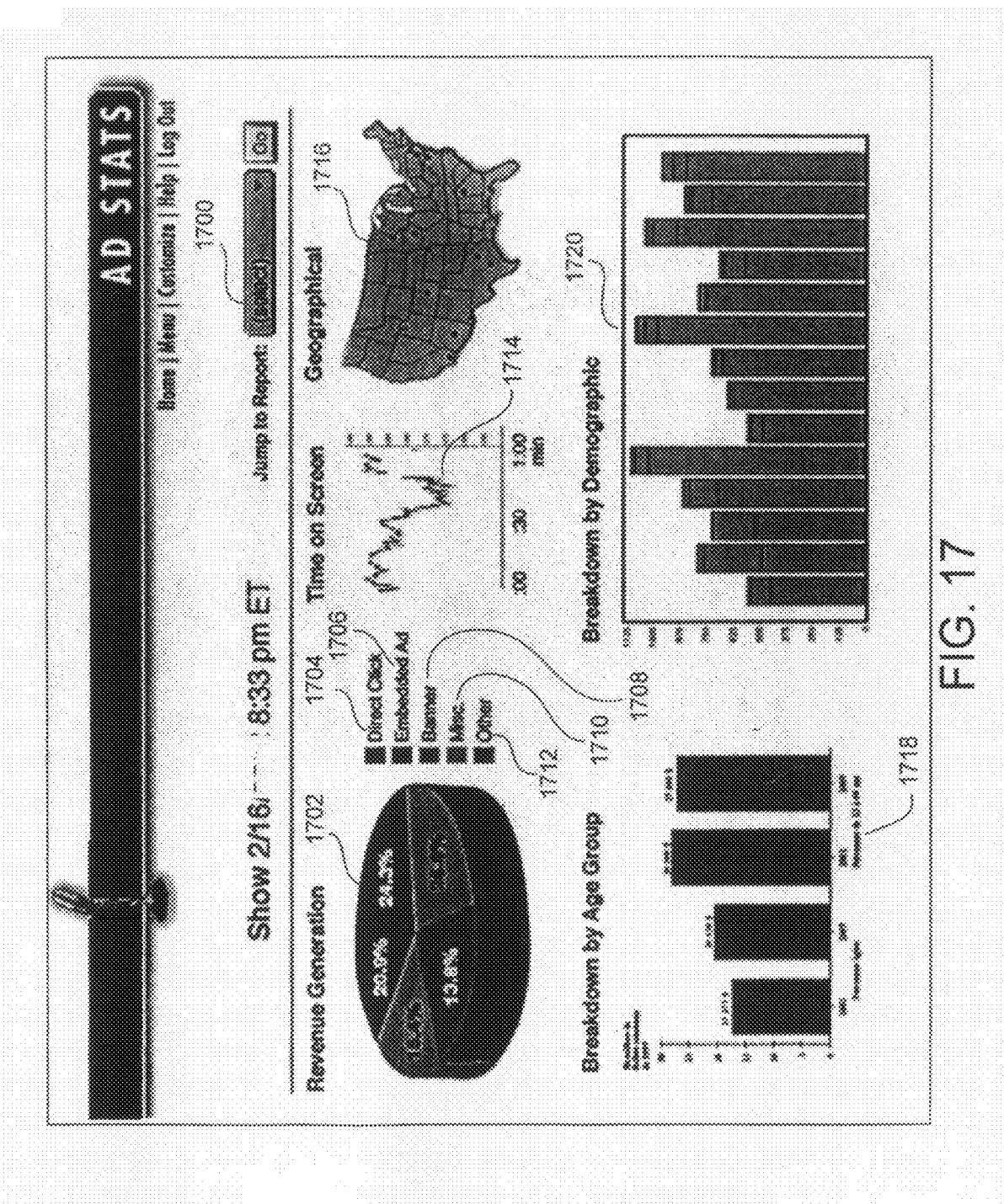
FIG. 17 is a screen capture of a moderator interface for an advertising report generated in accordance with an exemplary embodiment of the present invention.

FIG. 17 is a screen capture of a moderator interface for an advertising report generated in accordance with an exemplary embodiment of the present invention. A revenue generation graphic 1702 illustrates the relative amounts of revenue generated from the viewers participating in an interactive program. As the viewers participate in the interactive programs, the viewers' interactions with links and advertising banners included in the interactive program are recorded in the moderator database as previously described. An interactive program creation system can use the recorded viewer interactions to generate a graphic showing the relative contributions to total revenue by each of several possible viewer interaction modes. For example, in the illustrated graph, comparisons are made for selection of links 1704, selection of embedded ads 1706, selection of banner ads 1708, and selection of other types of ads 1710 and 1712, as a percentage of total revenue.

An advertising geographical graphic 1716 indicates the geographic viewer locations of viewers participating with the interactive program. As the viewers participate in the interactive programs, the viewers' interactions with links and advertising banners included in the interactive program are recorded in the moderator database as previously described. Additionally, a viewer identification for each viewer interaction is stored in the moderator database. Each viewer's geographic location can be determined from the previously described viewer's profile or by mapping the viewer's IP address to a specific geographic location. An interactive program creation system can use the recorded viewer interactions and viewer identifications to generate a graphic illustrating the geographic locations of advertising revenue generation. An interactive program creation system can use viewer interaction data, viewer identification data, and viewer profile data to generate a revenue by age graphic 1718 or a revenue by demographic description graphic 1720.

Figure 31:
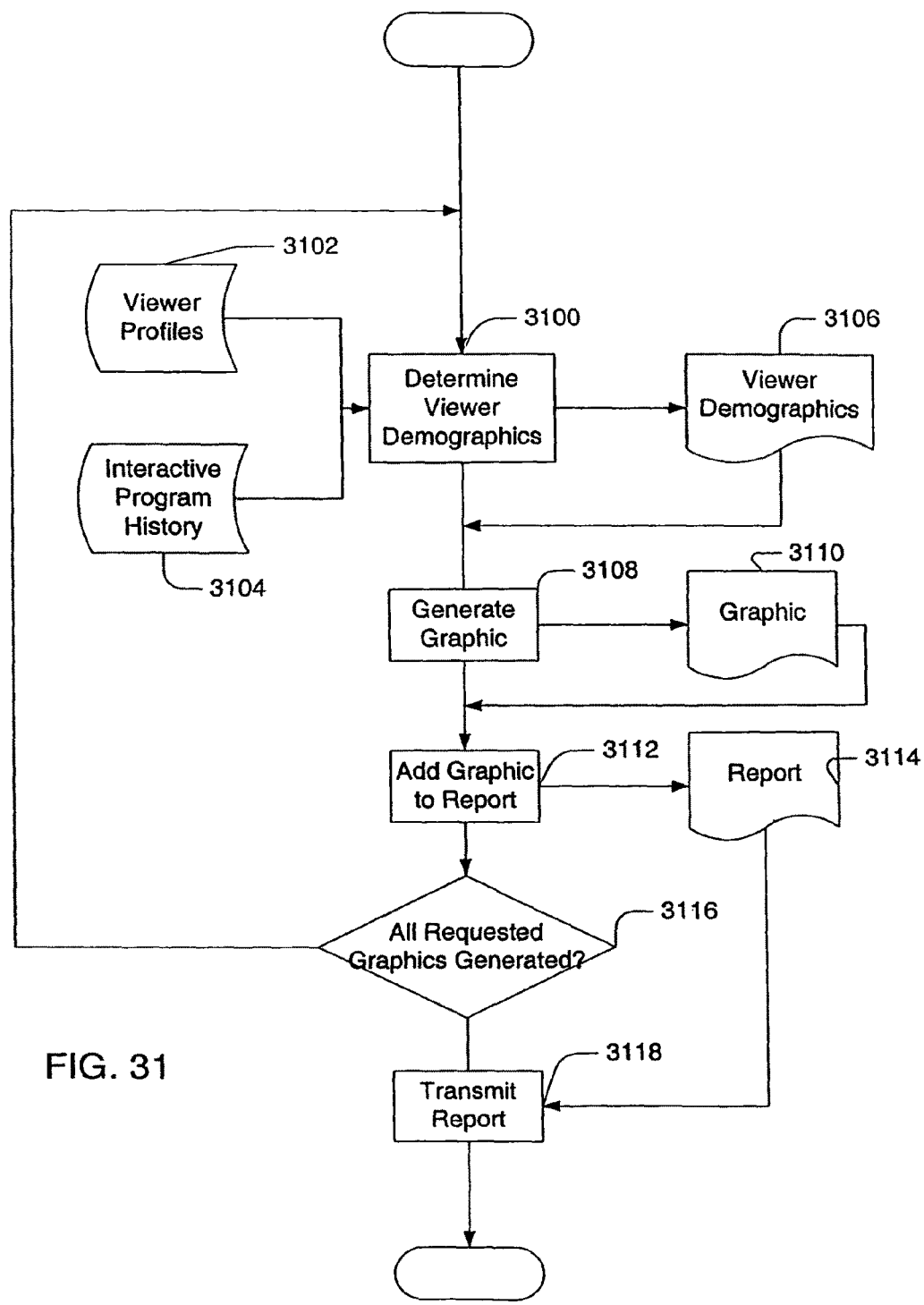
FIG. 31 is a process flow diagram of an interactive program report generation process in accordance with an exemplary embodiment of the present invention.

FIG. 31 is a process flow diagram of an interactive program report generation process in accordance with an exemplary embodiment of the present invention. A moderator server determines (3100) a set of viewer demographics for an interactive program's viewing audience by using the interactive program's history 3102 along with a set of viewer profiles 3104. For each viewer that participated in the interactive program when the interactive program was transmitted, the moderator server extracts the individual viewer's stored viewer profile. The moderator server aggregates the individual viewer profiles to generate viewer demographics 3106 for the interactive program transmission. The moderator server generates (3108) a graphical representation 3110 of the viewer demographics, for example a bar graph, and adds 3112 the graphical representation to a report 3114. The moderator server determines (3116) if all requested graphics have been generated. If not, the moderator selects the next graphic to generate and repeats the process thereby adding a new graphic to the report. Once all of the graphics have been added to the report, the moderator server transmits (3118) the report to the moderator requesting the report.

Figure 18:
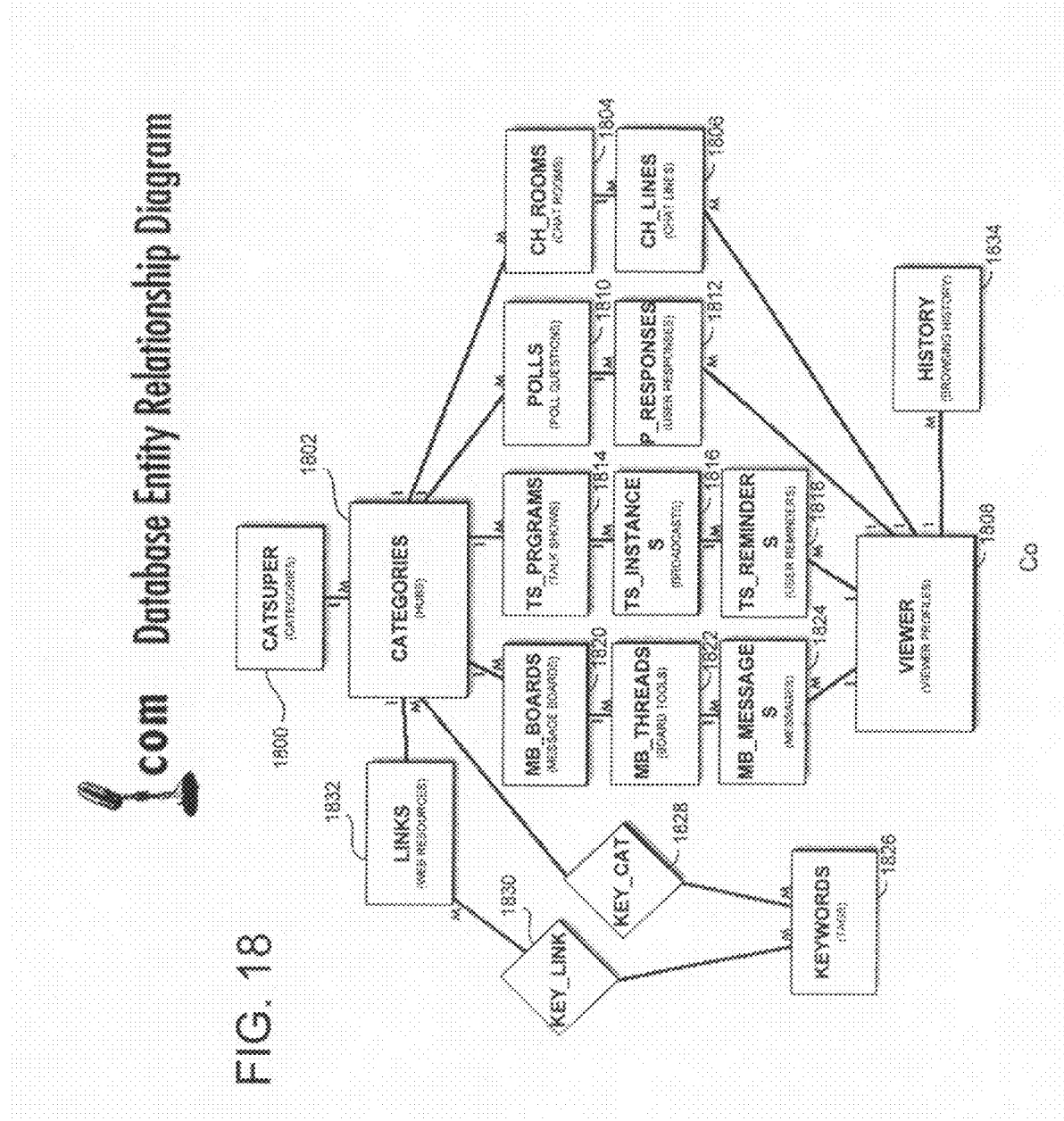
FIG. 18 is a database entity relation diagram for a moderator database in accordance with an exemplary embodiment of the present invention.

FIG. 18 is a database entity relation diagram for a moderator database in accordance with an exemplary embodiment of the present invention. The database entity relation diagram is an expression of meta data describing how the data in the viewer and moderator databases are related. The moderator database includes information used to organize interactive programs created and administered by moderators and histories of interactive programs including viewer interactions with the interactive programs. Interactive programs are organized within categories as previously described. Category information is used to create hubs of viewer interactions. A super category 1800 is associated with many categories 1802 but each category is only associated with one super category. A category or hub is associated with many interactive message rooms 1804 which is in turn associated with many interactive message lines. A viewer profile is associated with many interactive message lines. In operation, a plurality of viewers select a category and enter an interactive message room associated with the category. Viewer submissions within an interactive message room are used to generate individual interactive message lines that are viewed by the viewers as they exchange interactive messages.

A category is associated with a plurality of polls 1810 with each poll being associated with a plurality of poll responses 1812. A viewer profile is associated with a plurality of poll responses. In operation, viewers respond to a poll associated with a specific category and the viewers' responses are recorded in the moderator database for future analysis.

A category is associated with a plurality of interactive programs 1814 and each interactive program is associated with a plurality of interactive program broadcasts or instances 1816. Each interactive program broadcast is associated with a plurality of reminders 1818 with each reminder being associated with a single user profile. In operation, a moderator determines an interactive programming schedule of interactive program broadcasts and generates reminders that are transmitted to viewers who have expressed an interest in being reminded of the interactive program's broadcasts.

A category is associated with a plurality of message boards 1820 with each message board being associated with a plurality of message board threads 1822. Each message board thread is associated with a plurality of message board messages 1824 with each message board message being associated with a single viewer profile. A viewer profile may be associated with a plurality of message board messages. In operation, viewers leave messages grouped into message board threads on message boards maintained by moderators. The messages may be for the moderators or may be for other viewers.

Keywords 1826 are stored in the moderator database so that viewers can search for categories 1802 and links 1832 associated with the categories. Additionally, all user inputs can be indexed and tagged to become interactive triggers that are linked to interactive programs served by the moderator server. Category keywords 1828 are associated with a plurality of categories. In operation, a viewer enters a category keyword into a previously described search facility and a set of categories for use by the viewer are generated that are associated with the category keyword. Link keywords 1830 associated with links to off-site resources are also stored in the moderator database. In operation, a viewer enters a link keyword in the previously described search facility and a set of links associated with the link keyword is generated for use by the viewer.

Viewer profiles are associated with a plurality of viewer histories 1834. In operation, a viewer history is recorded of a viewer's interactions when accessing an interactive program creation system while not actually participating in an interactive program.

Figure 19:
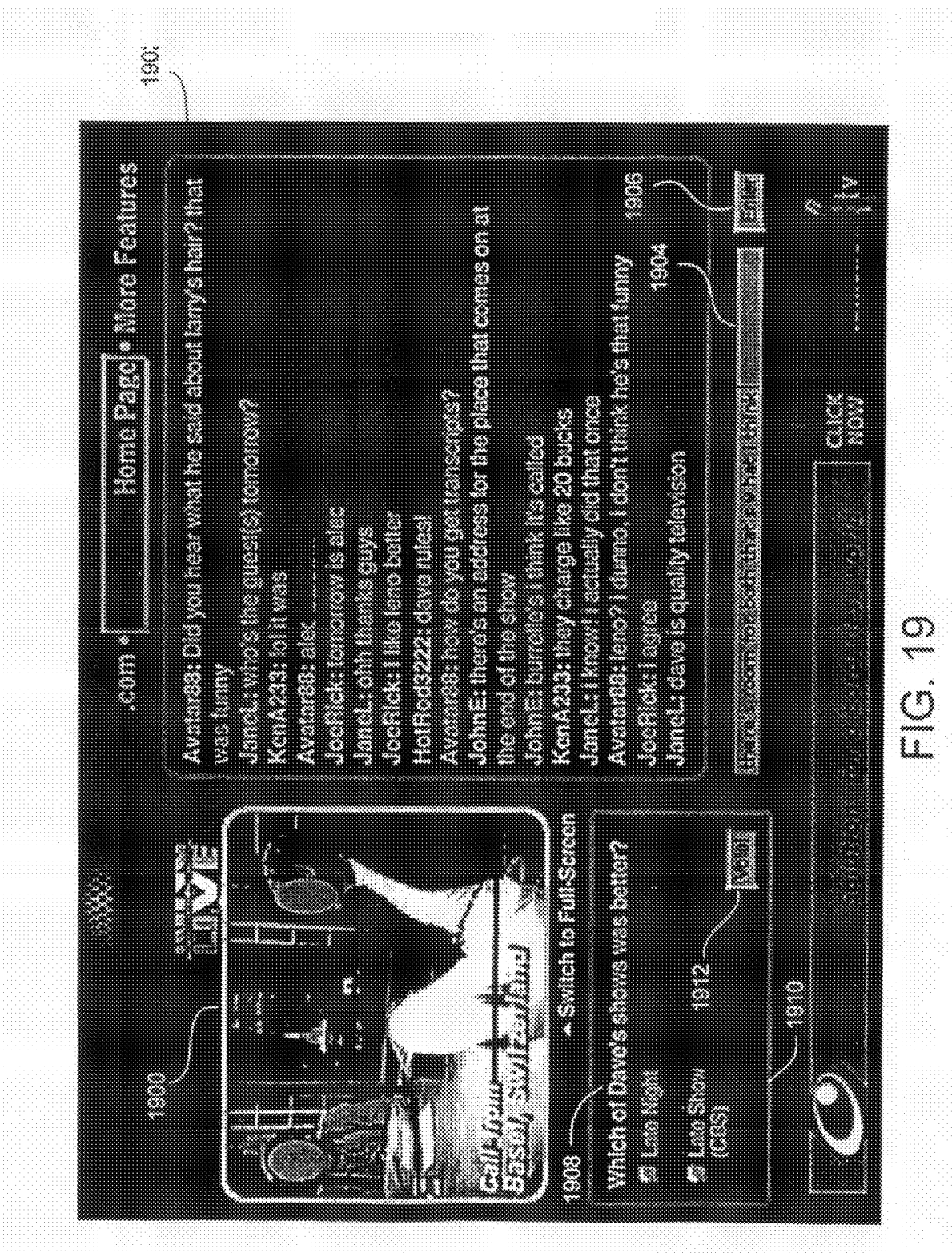
FIG. 19 is a screen capture of a viewer interface for a non-moderator based interactive program associated with a broadcast in accordance with an exemplary embodiment of the present invention.

FIG. 19 is a screen capture of a viewer interface for a non-moderator based interactive program associated with a broadcast in accordance with an exemplary embodiment of the present invention. As previously described, an interactive program can include broadcast content from a source not associated with the interactive program, such as a broadcast from a commercial broadcaster. In this case, an interactive program includes participant commentary but may not include moderator commentary. The viewer interface for a non-moderated interactive program includes a broadcast content section 1900 for display of non-interactive broadcast content. The viewer interface for a non-moderated interactive program further includes a viewer interactive message section 1902 for display of viewer interactive messages transmitted to a moderator server (not shown). The viewer interface for a non-moderated interactive program includes a viewer interactive message entry field for entry of viewer interactive messages. In operation, a viewer views the non-interactive broadcast content, enters interactive messages into the interactive message entry field and selects the "enter" button 1906 to submit the interactive message to the moderator server. The viewer's entered interactive message is then combined with other viewers' interactive messages to generate an interactive message display that is shown in the interactive message display section.

In an interactive program creation system in accordance with an embodiment of the present invention, the broadcast program is synchronized to the interactive program using synchronization signals included in the interactive program signals. In this way, an interactive program may be synchronized with an external broadcast.

Figure 20:
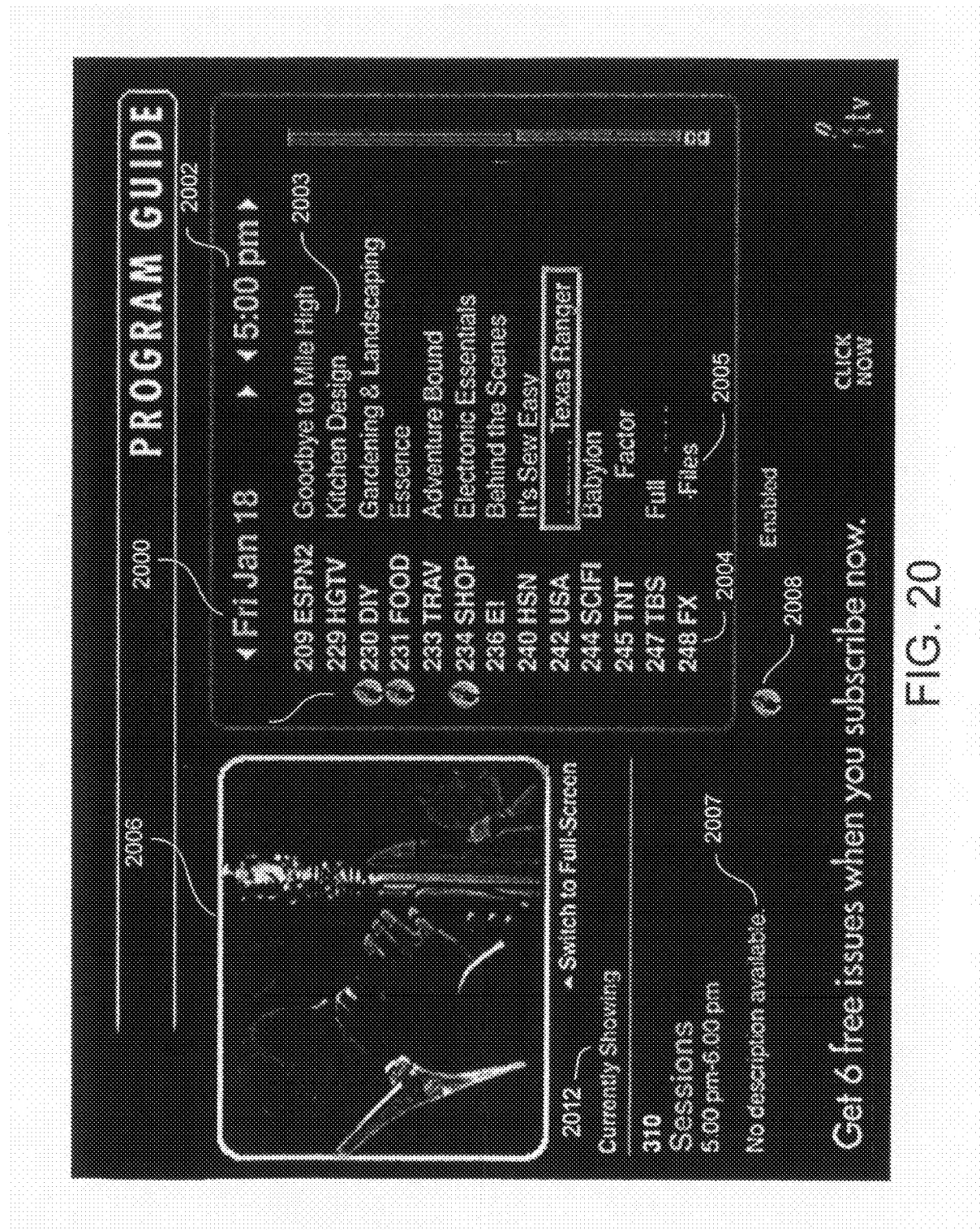
FIG. 20 is a screen capture of a viewer interface for a broadcast program guide in accordance with an exemplary embodiment of the present invention.

FIG. 20 is a screen capture of a viewer interface for a broadcast program guide in accordance with an exemplary embodiment of the present invention. The broadcast program guide viewer interface includes a date selection/display field 2000 and a time selection/display field 2002. A viewer uses the date selection/display field and time selection/display field to select and display a date and time for which the viewer wants to view scheduled broadcasts. Scheduled broadcasts for the selected date and time are shown in a listings section 2003. The listings section includes a broadcast channel column for display of the broadcast channel of a particular program, and a program information column 2005 for display of information about a scheduled program.

A current broadcast content section 2006 includes a display of broadcast content that is currently being broadcast on a selected broadcast channel. Information about the broadcast content is shown in a broadcast content information section 2007 formatted as a televised programming guide. The broadcast information includes a broadcast channel, a title, a broadcast time, and a description, if available, of the broadcast content. If a microphone indicator 2008 is shown next to a listing of a scheduled broadcast 2010, this indicates that the scheduled broadcast is available as an interactive program including broadcast content as previously described. In operation, a viewer can select an interactive program that is currently being broadcast and view the broadcast content in the current broadcast content section. A viewer selects a "switch to full screen" button 2012 to participate in a currently broadcast interactive program corresponding to the currently broadcast content displayed in the current broadcast content section.

Figure 21:
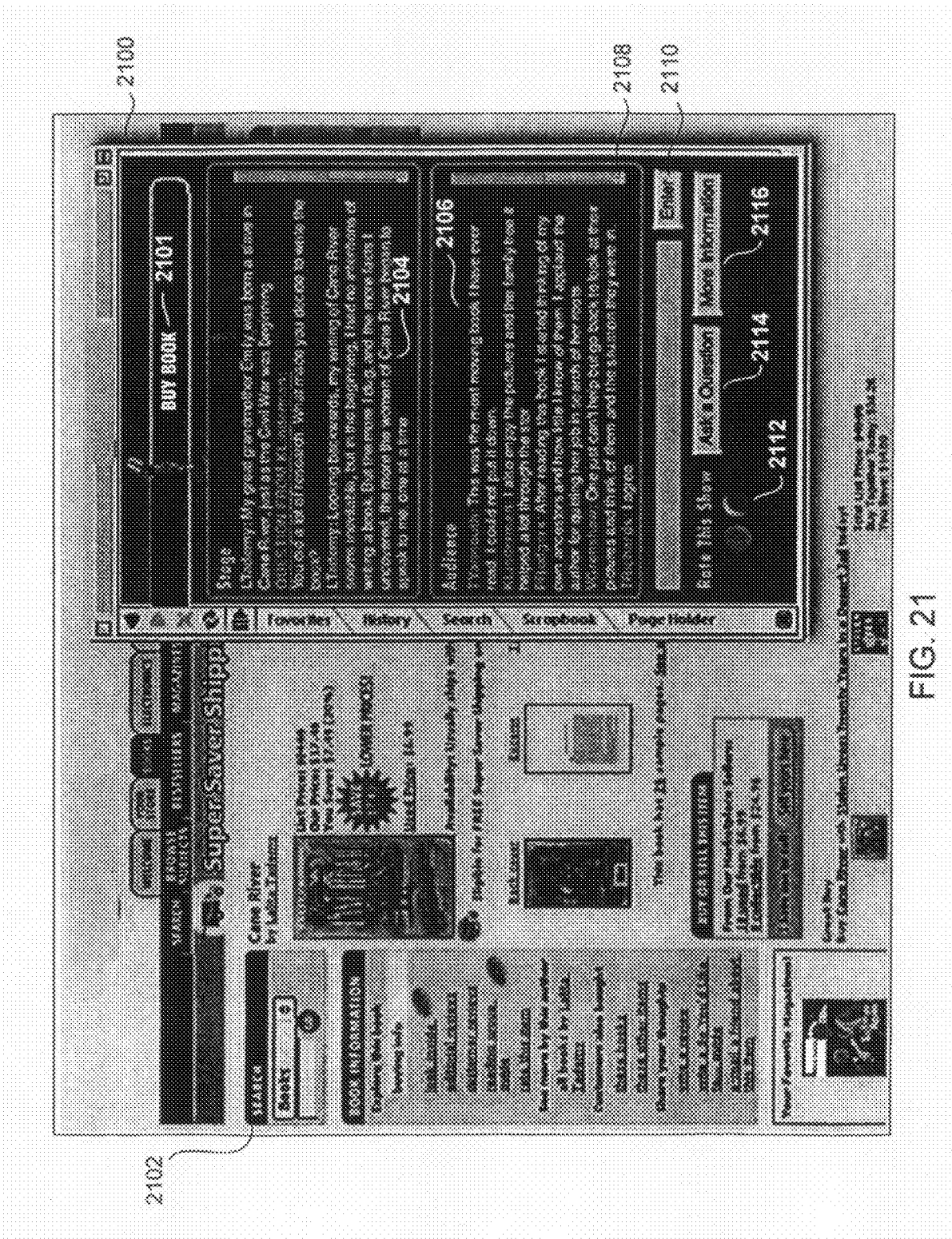
FIG. 21 is a screen capture of a viewer interface for an interactive program incorporating Web content in accordance with an exemplary embodiment of the present invention.

FIG. 21 is a screen capture of a viewer interface for an interactive program incorporating Web content in accordance with an exemplary embodiment of the present invention. A viewer initiates participation with an interactive program displayed in an interactive program reduced screen viewer interface 2100. The reduced screen viewer interface includes a link 2101 to a Web page 2102 that includes additional information about the interactive program's theme. For example, the link may be to an eCommerce Web site where a viewer may purchase a book that is currently being discussed by a moderator and viewers participating in the interactive program. The reduced screen viewer interface includes a stage interaction section 2104 for display of interactive messages exchanged between a moderator and a virtual guest or invited viewer as previously described. The reduced screen viewer interface further includes an audience interactive message display section 2106 for display of interactive messages exchanged between viewers as previously described. The reduced screen viewer interface further includes an interactive message entry field 2108. In operation, a viewer enters an interactive message into the interactive message entry field and selects the "Enter" button 2110 to transmit the interactive message to a moderator server (not shown) for inclusion in the stage or audience interaction display section.

The reduced screen viewer interface further includes interactive program rating buttons 2112 for viewer rating of an interactive program as previously described. In operation, a viewer selects one of the interactive program rating buttons to indicate the viewer's satisfaction with the interactive program. Viewer ratings from a plurality of viewers are aggregated together and displayed to the moderator as previously described.

A moderator uses a reduced screen viewer interface to create a contextual commerce application using an interactive program. The moderator uses the interactive program to build a community from an audience attracted to the subject matter of the interactive program, such as a product line or a series of books. The moderator then links the reduced screen viewer interface to a location where a viewer can make a purchase of a product or item related to the subject matter of an interactive program. In addition, archived interactive programs can be accessed in an "on-demand" mode to be linked to an e-commerce Website in order to have a continually available sales tool such as an "infomercial" or testimonial for a product or item.

Figure 22:
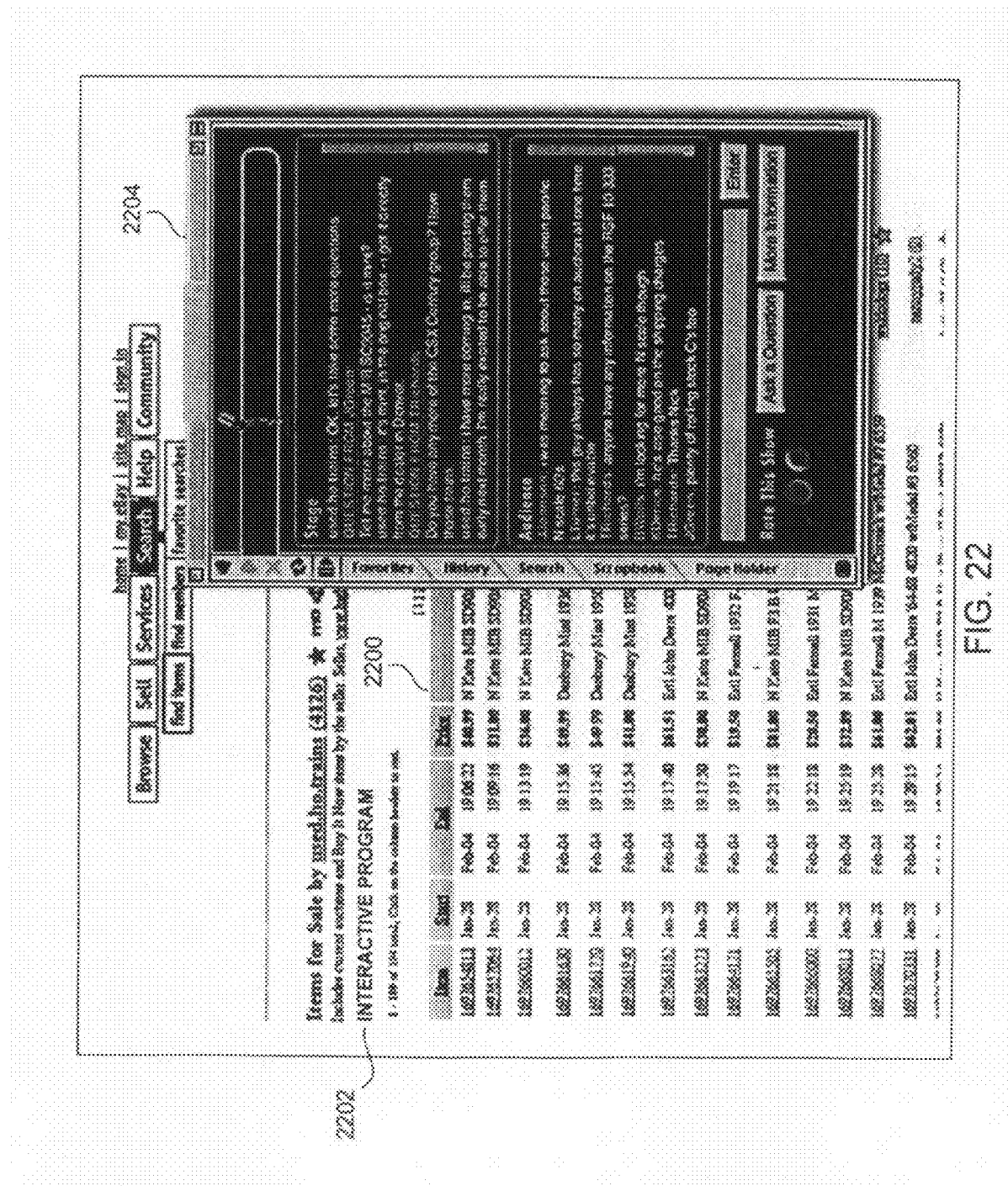
FIG. 22 is a screen capture of a viewer interface for an interactive program incorporating Web content in accordance with another exemplary embodiment of the present invention.

FIG. 22 is a screen capture of a viewer interface for an interactive program incorporating Web content in accordance with another exemplary embodiment of the present invention. A viewer initiates interaction with a previously described reduced screen viewer interface 2204 for an interactive program by selecting a link 2202 included in a Web page 2200. For example, a seller offering items on an auction site may be a moderator for an interactive program in order to discuss the offered items with participating viewers. In this case, the seller includes a link to an interactive program for which the seller serves as a moderator.

Figure 23:
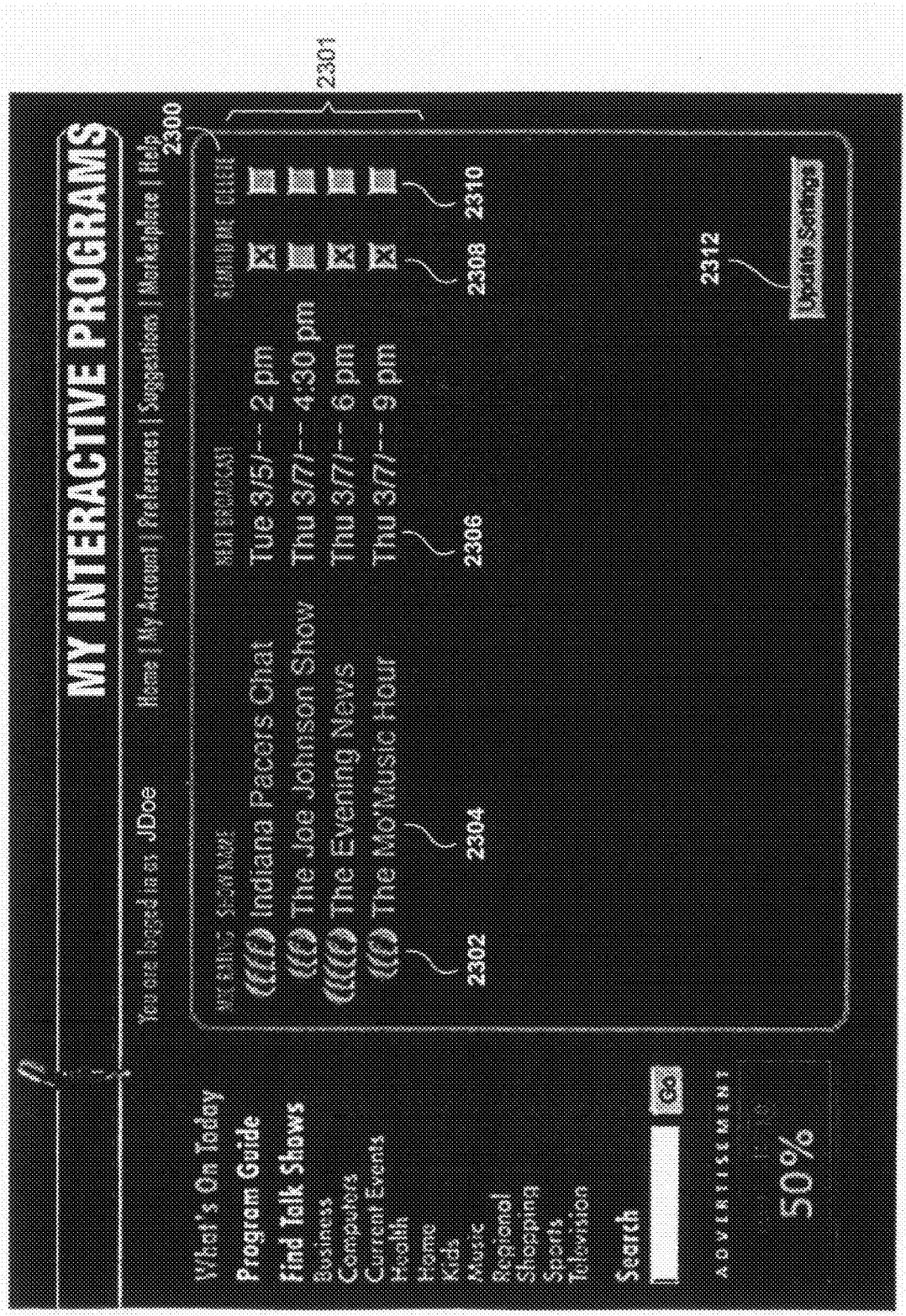
FIG. 23 is a screen capture of a viewer interface for a facility to manage a viewer's personal favorite interactive programs in accordance with an exemplary embodiment of the present invention.

FIG. 23 is a screen capture of a viewer interface for a facility to manage a viewer's personal favorite interactive programs in accordance with an exemplary embodiment of the present invention. The personal favorite viewer interface includes a listings display section 2300 for display of one or more listings 2301. Each listing includes a viewer rating field 2302 for display of previously described viewer ratings of an interactive program displayed in the listing. The listing further includes a name field 2304 for display of an interactive program's name, a next broadcast field 2306 for display of the interactive program's next broadcast, a reminder button 2308, and a delete button. In operation, a viewer selects the reminder button to receive previously described reminders from a listed interactive program's moderator and selects an "update settings" button to transmit the reminder request to a moderator server (not shown). To delete an interactive program from the viewer's personal favorite list, the viewer selects the delete button and selects the update settings button to delete a listed interactive program to delete the listed interactive program.

Figure 24:
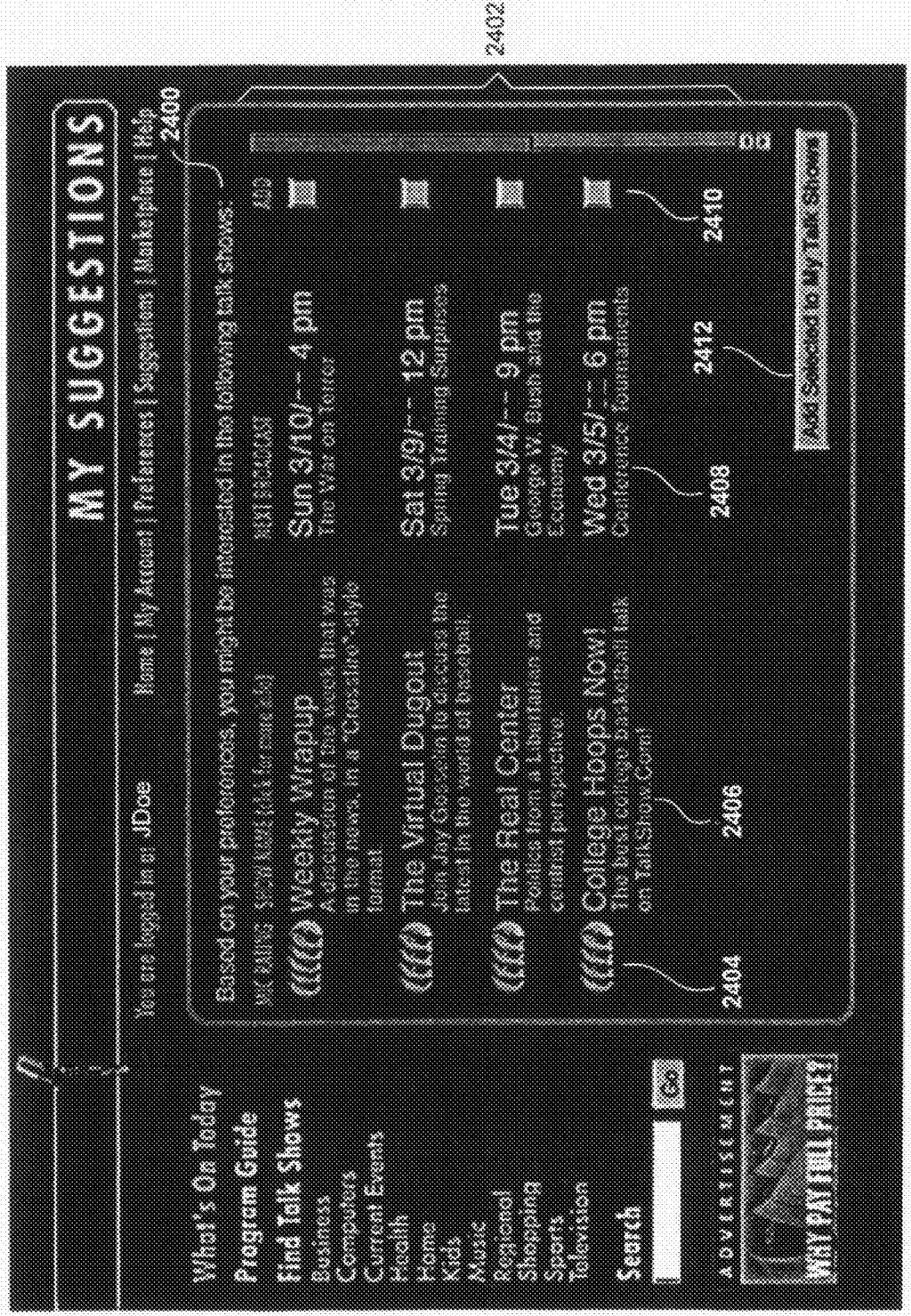
FIG. 24 is a screen capture of a viewer interface for a facility to suggest programs to a viewer in accordance with an exemplary embodiment of the present invention.

FIG. 24 is a screen capture of a viewer interface for a facility to suggest programs to a viewer in accordance with an exemplary embodiment of the present invention. The suggested program viewer interface includes a suggested interactive program listing section 2400. A suggested interactive program listing includes a field for display of a previously described viewer rating 2404, a field for display of an interactive program's name and brief description 2406, a next broadcast field 2408 for display of an interactive program's next display time, and an "add" button for adding a listed interactive program to the viewer's list of favorite interactive programs. In operation, a viewer selects the add button for a listed interactive program and selects an "Add Selected to My Interactive Programs" button 2412 to add a listed interactive program to the viewer's previously described favorite interactive program.

Figure 25:
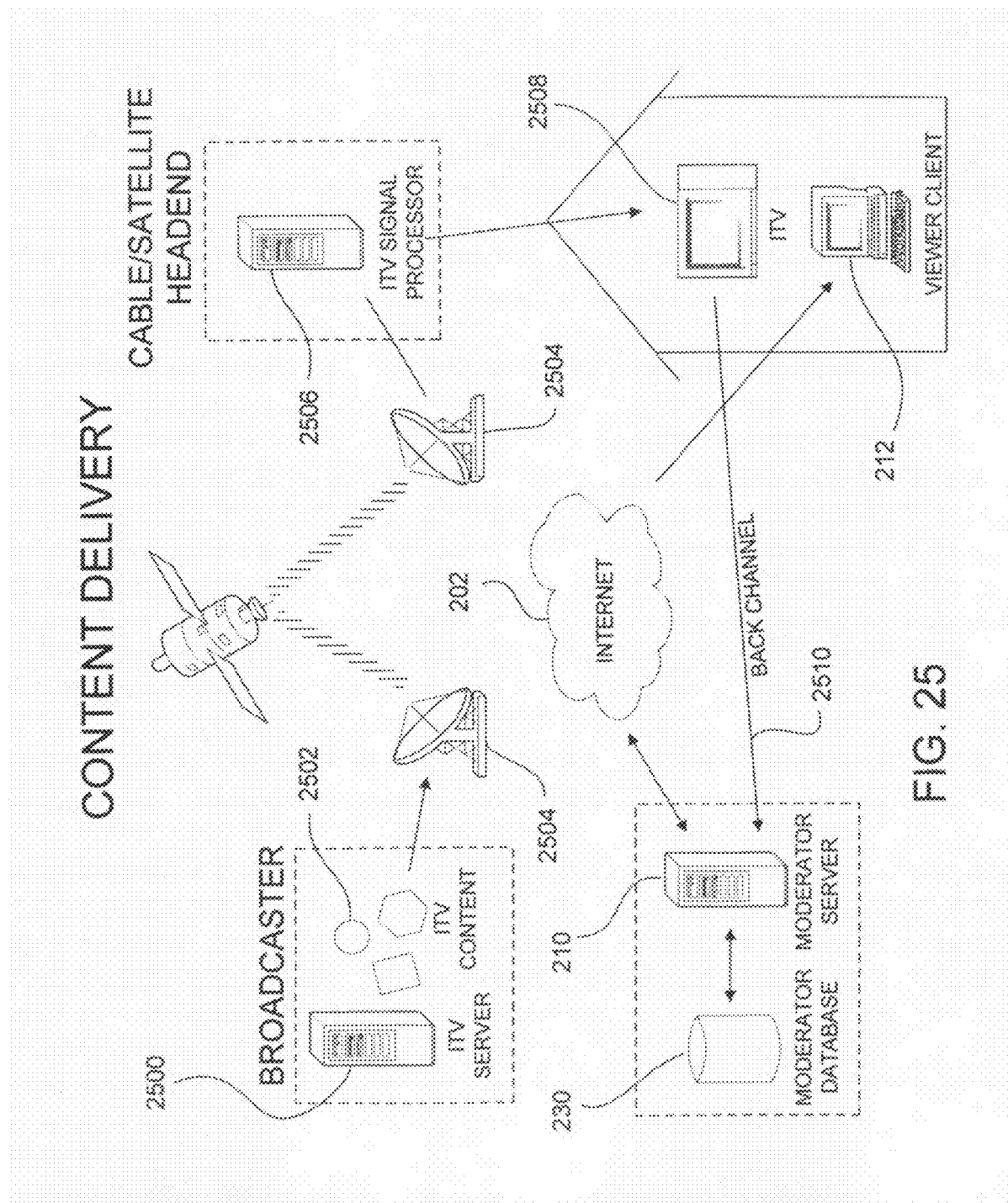
FIG. 25 is a deployment diagram of a process for conversion and delivery of interactive programs via an interactive television network in accordance with an exemplary embodiment of the present invention.

FIG. 25 is a deployment diagram of a process for conversion and delivery of interactive programs via an interactive television network in accordance with an exemplary embodiment of the present invention. A moderator server 210 receives participant comments and moderator content from an audience and a moderator and generates interactive program for transmission over the Internet 202 to a viewer client 212 as previously described.

The same interactive program can be transmitted over a conventional interactive television (iTV) network as well. The moderator server transmits the interactive program to an iTV server 2500 and the iTV server generates iTV content 2502 from the interactive program. The iTV content is transmitted via communications network 2504 to an iTV signal processor 2506. The iTV signal processor receives the iTV content and uses the iTV content to generate iTV signals for transmission to an iTV enabled television 2508 for viewing by a viewer. In this mode, triggers are generated from the interactive program signals and the viewer uses the triggers to participate in the interactive program, such as through the use of tags associated with the triggers included in the iTV signals' Vertical Blanking Interval (VBI), and the viewer's comments are transmitted via a back channel 2510 to the moderator server. In this way, a viewer can use either an iTV enabled television or a viewer client to participate in an interactive program as previously described.

Figure 33:
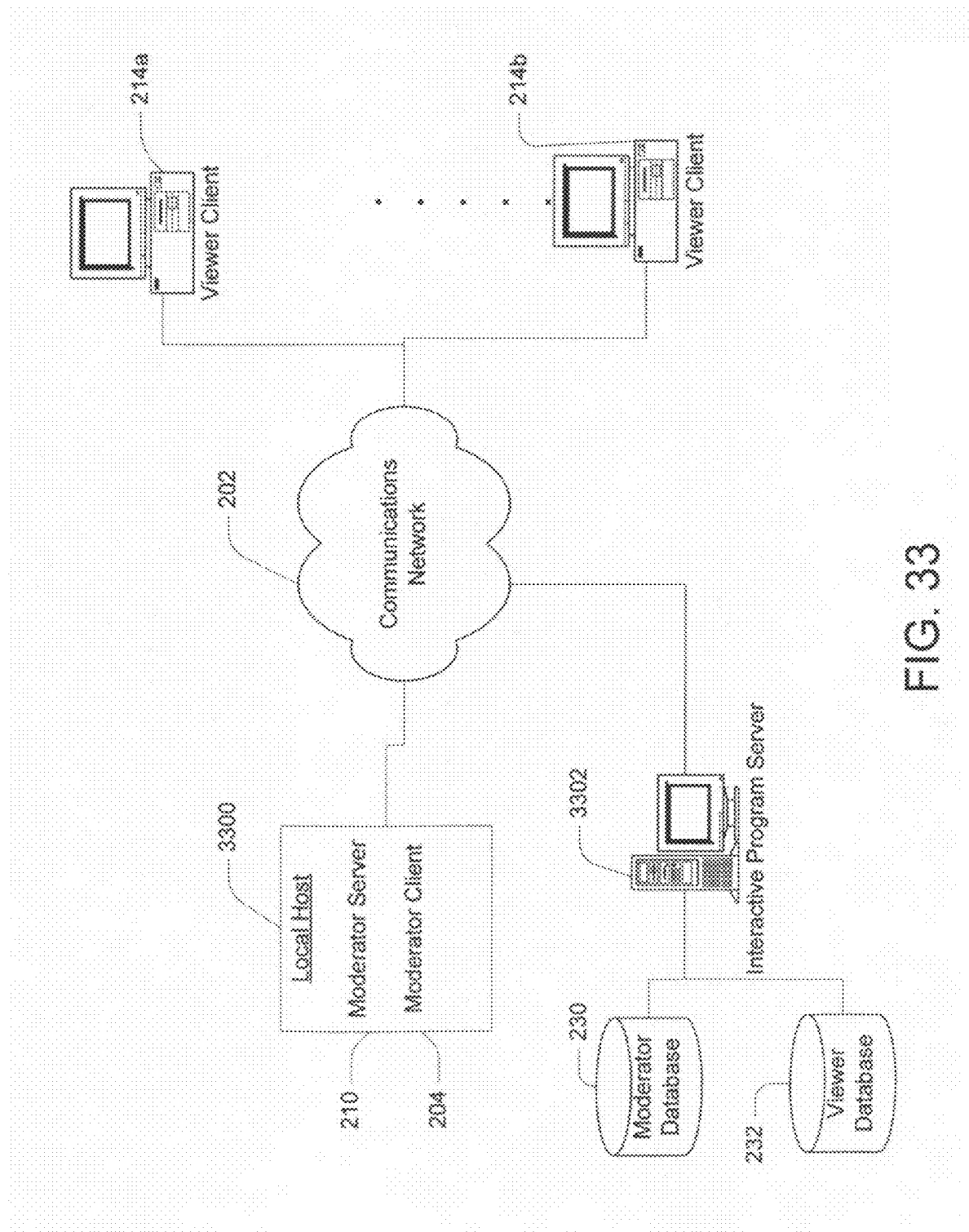
FIG. 33 is a deployment diagram of a locally hosted moderator server in accordance with an exemplary embodiment of the present invention.

FIG. 33 is a deployment diagram of a locally hosted moderator server in accordance with an exemplary embodiment of the present invention. A moderator server 210 implementing the previously described interactive program creation facilities is hosted by a local host 3300. The local host may also host the previously described moderator client 204. In this embodiment, the locally hosted moderator server is operably coupled to a plurality of previously described viewer clients, as exemplified by viewer clients 214a and 214a, via previously described communications network 202. The moderator server is further coupled to an interactive program server 3302 via the communications network. The interactive program server is operably coupled to the previously described moderator database 230 and viewer database 232.

In operation, the locally hosted moderator server is used by a moderator to create an interactive program for transmission to the viewer clients and moderator client as previously described. In this embodiment, viewer information is stored in the viewer database, moderator information is stored in the moderator database and the moderator server and the viewer clients access the information via the interactive program server. The local host may be any type of programmable device capable of bidirectional communication with other devices over a communications network. For example, the local host can be a game console, or a personal computer, or a set-top-box, etc.

Figure 26:
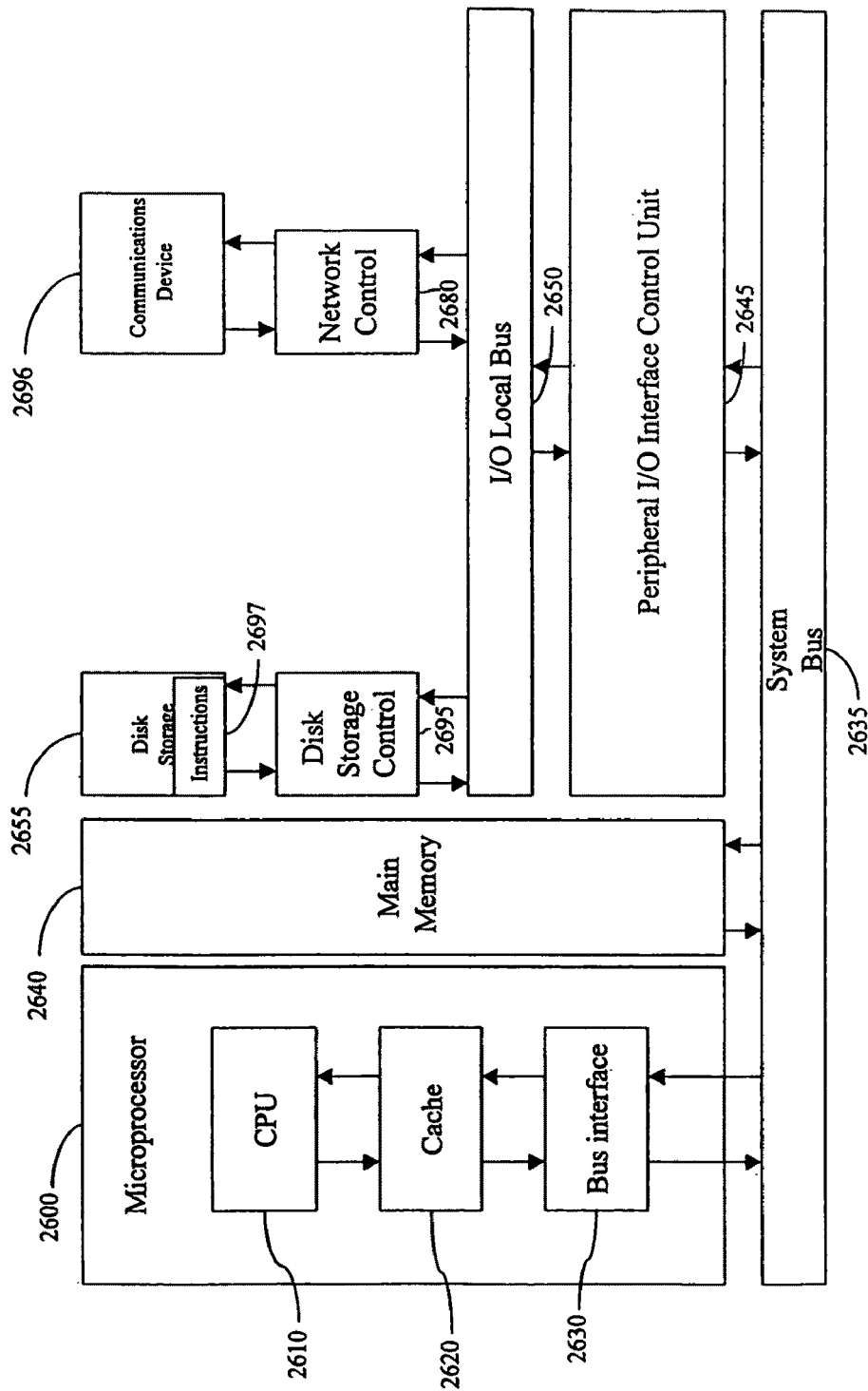
FIG. 26 is a hardware architecture diagram of a computing device suitable for use as a moderator server host in accordance with an exemplary embodiment of the present invention.

FIG. 26 is a hardware architecture diagram of a data processing system suitable for use as a moderator server host in accordance with an exemplary embodiment of the present invention. A microprocessor 2600, including a Central Processing Unit (CPU) 2610, a memory cache 2620, and a bus interface 2630, is operatively coupled via a system bus 2635 to a main memory 2640 and an I/O control unit 2645. The I/O interface control unit is operatively coupled via an I/O local bus 2650 to a disk storage controller 2695, and a network communications controller 2680. A communications device 2696 is operatively coupled to the network communications controller and is adapted to allow software objects hosted by the general purpose computer to communicate via a network with other software objects.

The disk storage controller is operatively coupled to a disk storage device 2655. Computer program instructions 2697 implementing a previously described moderator server are stored on the disk storage device until the microprocessor retrieves the computer program instructions and stores them in the main memory. The microprocessor then executes the computer program instructions stored in the main memory to implement the moderator server.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents.

What is claimed is:

1. A method for generating a user-generated interactive program hosted by a moderator for transmission over a communications network to a plurality of viewers, comprising:
    dynamically extracting captions and program information from a broadcast media content by an intelligent caption and program information extractor;
    dynamically organizing, semantic tagging, time coding and putting the captions and program information in a media content database by the intelligent caption and program information extractor;
    coupling a moderator server to the communications network and the media content database;
    coupling a moderator client for use by the moderator and a plurality of viewer clients for use by the plurality of viewers to the moderator server through the communications network;
    dynamically getting the organized, semantic tagged and time coded captions and program information by the moderator using the moderator client to retrieve the organized, semantic tagged and time coded captions and program information from the media content database via the moderator server;
    dynamically editing the captions by the moderator using the moderator client;
    dynamically generating moderator comments by the moderator using the moderator client;
    dynamically receiving viewer comments at the moderator server from the viewers using the viewer clients and transmitting the viewer comments from the moderator server to the moderator client;
    dynamically editing the viewer comments for viewing by the plurality of viewers by the moderator using the moderator client;
    dynamically transmitting the organized, semantic tagged and time coded edited captions and program information, moderator comments, and edited viewer comments from the moderator client to the moderator server;
    dynamically generating the user-generated interactive program by the moderator server utilizing the received moderator comments, the received, edited viewer comments, the organized, semantic tagged and time coded edited captions and program information, and the media content, wherein the dynamically generating the user-generated interactive program comprises:
        processing the received moderator comments, the received, edited viewer comments, the organized, semantic tagged and time coded edited captions and program information;
        generating viewer response and caption content based on a collaboration and interaction of the processed moderator comments, the processed viewer comments, the processed program information and the processed captions; and
        merging the viewer response and caption content based on the collaboration and interaction of the processed moderator comments, the processed viewer comments, the processed program information and the processed captions with the media content; and
    transmitting the user-generated interactive program by the moderator server to the viewer clients through the communications network, wherein the media content is a digital video signal, and the generating of the user-generated interactive program further comprises:
        encapsulating an interactive component in a first elementary stream of a digital video broadcast stream, and
        adding the media content to a second elementary stream of the video broadcast stream.

2. The method of claim 1, further comprising:
    receiving viewer comments by the moderator server from the viewer clients through the communications network; and
    transmitting the viewer comments by the moderator server to the moderator client through the communications network.

3. The method of claim 1 wherein the communications network is a virtual private network.

4. The method of claim 1 wherein the edited viewer comments further include an interactive program rating signal.

5. The method of claim 1, further comprising:
    receiving a viewer exclusion signal specifying a viewer client of the plurality of viewer clients by the moderator server from the moderator client through the communications network; and
    generating by the moderator server the user-generated interactive program utilizing the viewer exclusion signal to exclude viewer comments received from the specified viewer client.

6. The method of claim 1, further comprising:
    receiving a viewer invitation signal corresponding to a specific viewer client of the plurality of viewer clients by the moderator server from the moderator client through the communications network; and
    generating by the moderator server the user-generated interactive program utilizing the viewer invitation signal to include viewer comments from the specific viewer client in a virtual stage.

7. A method for generating a user-generated interactive program hosted by a moderator for transmission over a television broadcast network to a plurality of viewers, comprising:
    dynamically extracting captions and program information from a broadcast media content by an intelligent caption and program information extractor;
    dynamically organizing, semantic tagging, time coding, and putting the captions and program information in a media content database by the intelligent caption and program information extractor;
    coupling a moderator server to a communications network, a telephony network, the television broadcast network, and the media content database;

coupling a moderator client for use by the moderator to the moderator server through the communications network;

dynamically getting the organized, semantic tagged, and time coded captions and program information by the moderator using the moderator client to retrieve the organized, semantic tagged and time coded captions and program information from the media content database via the moderator server;

dynamically editing the captions by the moderator using the moderator client;

dynamically generating moderator comments by the moderator using the moderator client;

dynamically receiving viewer comments at the moderator server from the viewers and transmitting the viewer comments from the moderator server to the moderator client;

dynamically editing the viewer comments for viewing by the plurality of viewers by the moderator using the moderator client;

dynamically transmitting the organized, semantic tagged and time coded edited captions and program information, moderator comments, and edited viewer comments from the moderator client to the moderator server;

dynamically generating the user-generated interactive program by the moderator server utilizing the received moderator comments, the received, edited viewer comments, the organized, semantic tagged, and time coded edited captions and program information, and the media content, wherein the dynamically generating the user-generated interactive program comprises:

processing the received moderator comments, the received, edited viewer comments, the organized, semantic tagged, and time coded edited captions and program information;

generating viewer response and caption content based on a collaboration and interaction of the processed moderator comments, the processed viewer comments, the processed program information and the processed captions; and merging the viewer response and caption content based on the collaboration and interaction of the processed moderator comments, the processed viewer comments, the processed program information and the processed captions with the media content; and transmitting the user-generated interactive program by the moderator server to viewer televisions through the television broadcast network, wherein the media content is a digital video signal, and the generating of the user-generated interactive program further comprises:

encapsulating an interactive component in a first elementary stream of a digital video broadcast stream, and adding the media content to a second elementary stream of the video broadcast stream.

8. The method of claim 7, wherein viewers communicate with a moderator through the telephony network, the method further comprising:

coupling the moderator server to the telephony network;

receiving viewer comments by the moderator server from the viewers through the telephony network; and transmitting the viewer comments by the moderator server to the moderator client through the communications network.

9. An apparatus for creating, editing, and distributing a user-generated interactive program hosted by a moderator for transmission over a communications network to a plurality of viewers, comprising:

a media content database;

a caption and program information extractor coupled to a broadcast media signal source and the media content database for extracting captions and program information from a broadcast media content and dynamically organizing, semantic tagging, time coding, and putting the extracted captions and program information in the media content database;

a moderator server coupled to the media content database, the moderator server for coupling through the communications network to a plurality of viewer clients for use by the plurality of viewers and a moderator client for use by the moderator, the moderator server including:

a processor; and a memory operably coupled to the processor and having program instructions stored therein, the processor being operable to execute the program instructions, the program instructions including:

dynamically extracting the organized, semantic tagged, and time coded captions and program information from the media content database in response to requests by the moderator using the moderator client and transmitting the captions and program information to the moderator client;

dynamically receiving viewer comments from the viewers using the viewer clients and transmitting the viewer comments to the moderator client;

dynamically receiving the organized, semantic tagged and time coded captions and program information after editing by the moderator using the moderator client;

dynamically receiving moderator comments by the moderator using the moderator client;

dynamically receiving the viewer comments after editing for viewing by the plurality of viewers by the moderator using the moderator client;

dynamically generating the user-generated interactive program utilizing the received moderator comments, the received, edited viewer comments, the received organized, semantic tagged, and time coded edited captions and program information, and the media content, wherein the dynamically generating the user-generated interactive program comprises:

processing the received moderator comments, the received, edited viewer comments, the organized, semantic tagged, and time coded edited captions and program information;

generating viewer response and caption content based on a collaboration and interaction of the processed moderator comments, the processed viewer comments, the processed program information and the processed captions; and merging the viewer response and caption content based on the collaboration and interaction of the processed moderator comments, the processed viewer comments, the processed program information and the processed captions with the media content; and transmitting the user-generated interactive program to the viewer clients through the communications network, wherein the media content is a digital video signal, and the generating of the user-generated interactive program further comprises:

encapsulating an interactive component in a first elementary stream of a digital video broadcast stream, and adding the media content to a second elementary stream of the video broadcast stream.

10. The apparatus of claim 9, the program instructions further including:
receiving viewer comments from the viewer clients through the communications network; and
transmitting the viewer comments to the moderator client through the communications network.

11. The apparatus of claim 9, wherein the communications network is a virtual private network.

12. The apparatus of claim 9, wherein the edited viewer comments further include an interactive program rating signal.

13. The apparatus of claim 9, the program instructions further including:
receiving a viewer exclusion signal specifying a viewer client of the plurality of viewer clients from the moderator client through the communications network; and
generating the interactive program utilizing the viewer exclusion signal to exclude viewer comments received from the specified viewer client.

14. The apparatus of claim 9, the program instructions further including:
receiving a viewer invitation signal corresponding to a specific viewer client of the plurality of viewer clients from the moderator client through the communications network; and
generating the interactive program utilizing the viewer invitation signal to include viewer comments from the specific viewer client in a virtual stage.

* * * * *